United States Patent
Inoue

(10) Patent No.: US 9,674,422 B2
(45) Date of Patent: Jun. 6, 2017

(54) IMAGE PROCESSING DEVICE, IMAGING DEVICE, IMAGE PROCESSING METHOD AND COMPUTER READABLE MEDIUM

(71) Applicant: FUJIFILM Corporation, Tokyo (JP)

(72) Inventor: Kazuki Inoue, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/788,093

(22) Filed: Jun. 30, 2015

(65) Prior Publication Data

US 2015/0304547 A1 Oct. 22, 2015

Related U.S. Application Data

(63) Continuation of application No. PCT/JP2013/078629, filed on Oct. 22, 2013.

(30) Foreign Application Priority Data

Jan. 4, 2013 (JP) ................................ 2013-000043

(51) Int. Cl.
*H04N 5/232* (2006.01)
*G02B 7/34* (2006.01)
(Continued)

(52) U.S. Cl.
CPC ............ *H04N 5/23212* (2013.01); *G02B 7/34* (2013.01); *G02B 7/36* (2013.01); *G03B 13/36* (2013.01);
(Continued)

(58) Field of Classification Search
CPC ............. H04N 5/23212; H04N 5/3572; H04N 5/3696; H04N 5/23293; G03B 17/18; G03B 13/36; G02B 7/34; G02B 7/36
See application file for complete search history.

(56) References Cited

U.S. PATENT DOCUMENTS 7,221,805 B1 * 5/2007 Bachelder .............. G03B 13/36
348/208.12
8,279,318 B2 10/2012 Suzuki et al.
(Continued)

FOREIGN PATENT DOCUMENTS

JP 2005-222036 A 8/2005
JP 2008-216503 A 9/2008
(Continued)

OTHER PUBLICATIONS

Written Opinion of the International Searching Authority with an English translation thereof (Form PCT/ISA/237), dated Jan. 21, 2014, for International Application No. PCT/JP2013/078629.
(Continued)

*Primary Examiner* — Padma Haliyur
(74) *Attorney, Agent, or Firm* — Birch, Stewart, Kolasch & Birch, LLP

(57) ABSTRACT

An generation section generates a first display image based on an image signal output from an image pick-up device including first and second pixel groups on which respective images are formed by a pupil-divided subject-image, and generates a second display image for use in focus verification from first and second images based on an image signal output from the first and second pixel groups. A display controller performs control to display the first display image on a display section, and to display the second display image on the display section within a display region of the first display image. An automatic focus section, in cases in which a predetermined instruction has been input, performs automatic focusing in a focus region having at least a portion that overlaps with at least a portion of a display region of the second display image.

6 Claims, 41 Drawing Sheets

(51) Int. Cl.
    *G02B 7/36*     (2006.01)
    *G03B 13/36*     (2006.01)
    *H04N 5/369*     (2011.01)
    *G03B 17/18*     (2006.01)
    *H04N 5/357*     (2011.01)

(52) U.S. Cl.
    CPC ......... *G03B 17/18* (2013.01); *H04N 5/23293* (2013.01); *H04N 5/3572* (2013.01); *H04N 5/3696* (2013.01)

(56) References Cited

U.S. PATENT DOCUMENTS

2009/0153720 A1     6/2009   Suzuki et al.
2011/0128432 A1*   6/2011   Shiohara ............ H04N 5/23212
                                                    348/333.02

FOREIGN PATENT DOCUMENTS

| JP | 2009-163220 A | 7/2009 |
| --- | --- | --- |
| JP | 2009-237214 A | 10/2009 |
| JP | 2009-276426 A | 11/2009 |

OTHER PUBLICATIONS

International Search Report issued in PCT/JP2013/078629, mailed on Jan. 21, 2014.
Writtern Opinion of the International Search Authority, PCT/ISA/237—Issued in PCT/JP2013/078629, mailed on Jan. 21, 2014.
Chinese Office Action and Chinese Search Report, issued Jul. 28, 2016, for Chinese Application No. 201380069085.2, along with an English machine translation of the Chinese Office Action.

\* cited by examiner

FIG.4

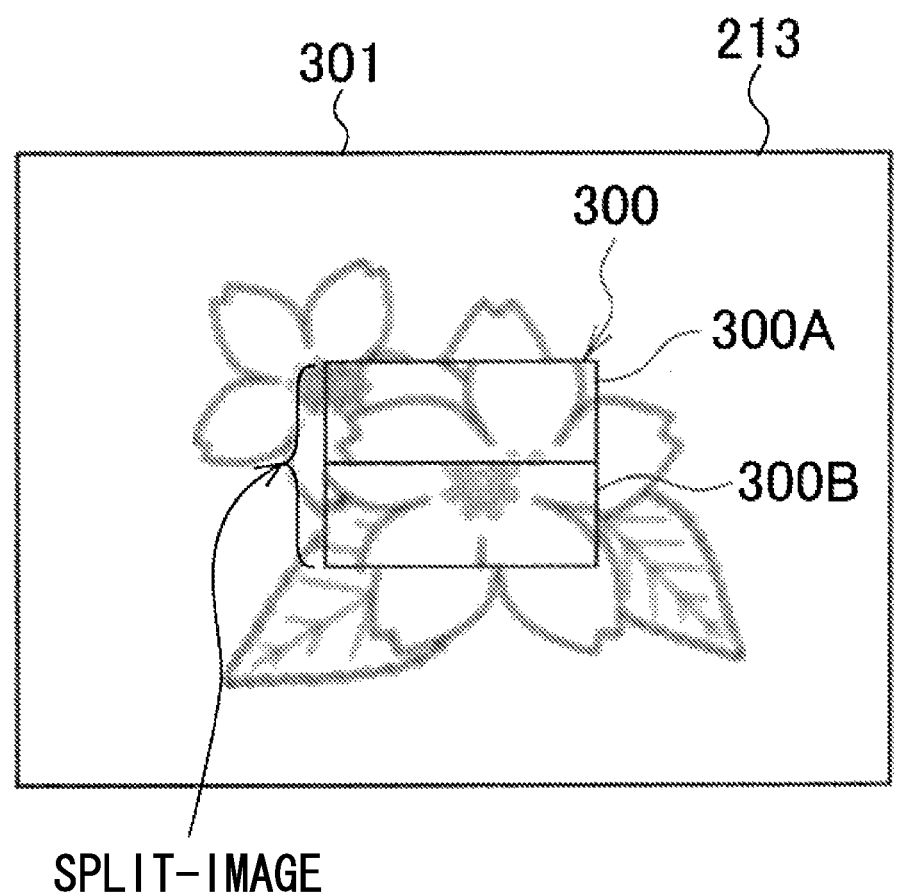

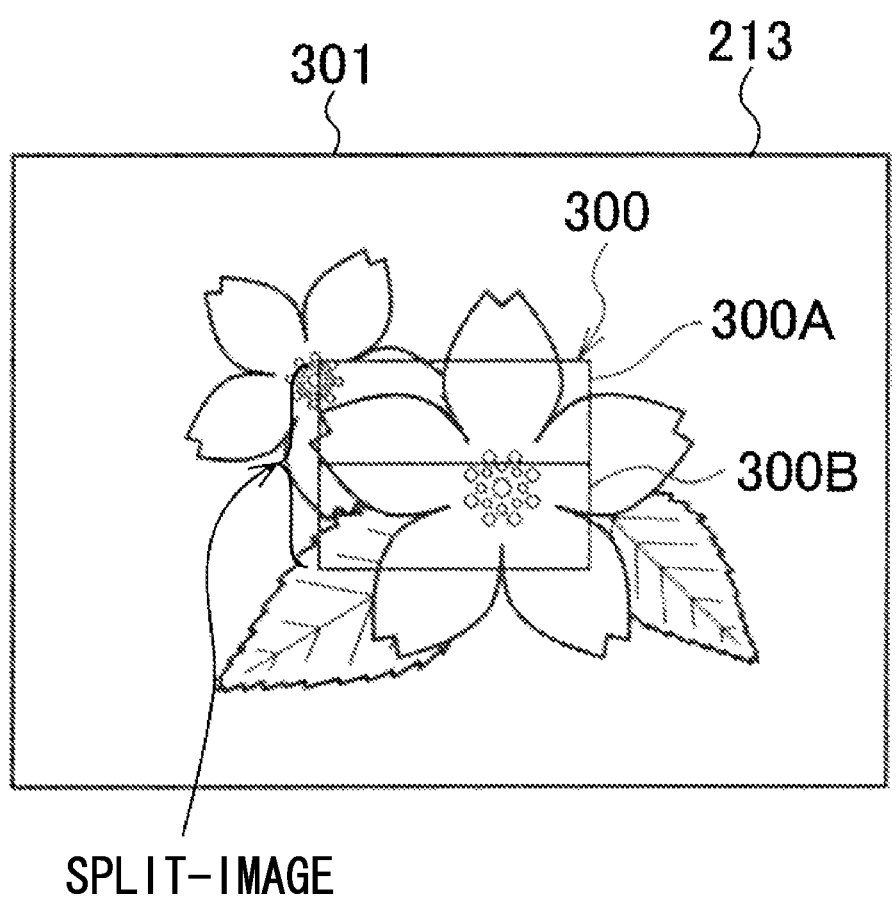

IMAGE PROCESSING DEVICE, IMAGING DEVICE, IMAGE PROCESSING METHOD AND COMPUTER READABLE MEDIUM

CROSS-REFERENCE TO RELATED APPLICATIONS

This application is a continuation application of International Application No. PCT/JP2013/078629, filed Oct. 22, 2013, the disclosure of which is incorporated herein by reference in its entirety. Further, this application claims priority from Japanese Patent Application No. 2013-000043, filed Jan. 4, 2013, the disclosure of which is incorporated herein by reference in its entirety.

BACKGROUND

Technical Field

The present invention relates to an image processing device, an imaging device, a program, and an image processing method, and in particular relates to an image processing device, an imaging device, a computer readable medium, and an image processing method that generate and display an image for verifying the focus state of a subject-image.

Background Art

Hitherto, in imaging devices, such as digital cameras and mobile phones with cameras, technology is now being employed that displays a split-image within a live-view image (a so-called through image) in order to facilitate operation to manually adjust the focal point. A split-image refers to an image synchronized from a portion of a left eye image and a portion of a right eye image corresponding to a specific region of a subject-image. In such a split-image, displacement is generated in a parallax generation direction between the left eye image and the right eye image, according to a state of focus. A user employs this technology to verify the state of focus by visually checking the displacement of the left eye image and the right eye image in the split-image.

In an imaging device employing such technology described in Japanese Patent Application Laid-Open (JP-A) No. 2009-237214 (referred to below as Patent Document 1), it is possible to display a combination of a split-image, and an expanded part image corresponding to a portion of the live-view image. This imaging device includes a means to switch between displaying a split-image, and displaying a part image corresponding to a portion of the subject-image, on a display means during manual focusing.

In JP-A No. 2005-222036 (referred to below as Patent Document 2), an imaging device is also described that assists the focal point adjustment by performing automatic focus control when manually adjusting the focal point. In this imaging device, it is possible to adjust the state of focus in manual focusing using a first focus lens used for manual focusing by operating an operating means to move a second focus lens used for automatic focusing, while maintaining the position of the first focus lens.

Technical Problem

Development has hitherto been desired of an imaging device capable of further assisting focal point adjustment, by performing automatic focus control while a user is performing manual focal point adjustment while verifying a split-image.

Combining the technology described in Patent Document 2 with the technology described in Patent Document 1 might be considered to implement such an imaging device. In cases in which a user performs manual focal point adjustment using a split-image, focal point adjustment is performed while verifying the state of the split-image. Therefore, in cases in which automatic focus control is further performed during manual focal point adjustment using a split-image, there is a need to match the image region that is the target during manual focal point adjustment to the image region that is the target during automatic focus control.

However, in the technology described in Patent Document 2, there is no restriction to the range of the image region applied as the target during automatic focus control. Thus there is the issue that the image region that is the target during manual focal point adjustment does not necessarily match the image region that is the target during automatic focus control, and it is not necessarily always possible to perform manual focal point adjustment without an uncanny feeling.

SUMMARY

In consideration of the above issues, an object of the present invention is to provide an image processing device, an imaging device, a program, and an image processing method enabling manual focal point adjustment to be performed without an uncanny feeling.

Solution to Problem

In order to achieve the above object, an image processing device according to the present invention includes: a generation section that generates a first display image based on an image signal output from an image pick-up device including first and second pixel groups on which respective images are formed by a pupil-divided subject-image that has passed through first and second regions of an imaging lens, and generates a second display image for use in focus verification from first and second images based on an image signal output from the first and second pixel groups; a display section that displays images; a display controller that performs control to display the first display image generated by the generation section on the display section, and to display the second display image generated by the generation section on the display section within a display region of the first display image; and an automatic focus section that, in cases in which a predetermined instruction has been input, performs automatic focusing in a focus region having at least a portion that overlaps with at least a portion of a display region of the second display image.

In the image processing device according to the present invention, the first display image is generated by the generation section based on the image signal output from the image pick-up device including the first and second pixel groups on which respective images are formed by the pupil-divided subject-image that has passed through the first and second regions of the imaging lens.

Moreover, in the present invention, the second display image for use in focus verification from the first and second images is generated by the generation section based on the image signal output from the first and second pixel groups.

Moreover, in the present invention, control is performed by the display controller to display the first display image generated by the generation section on the display section that displays images, and to display the second display image generated by the generation section on the display section within the display region of the first display image.

In the present invention, in cases in which the predetermined instruction has been input, the automatic focus section performs automatic focusing in a focus region having at least a portion that overlaps with at least a portion of the display region of the second display image.

Thus in the image processing device according to the present invention, at least a portion of a focus region that is the image region target during automatic focusing overlaps with at least a portion of the image region of the second display image (split-image), enabling manual focal point adjustment to be performed without an uncanny feeling.

In order to achieve the above object, an image processing device according to the present invention includes: a generation section that generates a first display image based on an image signal output from an image pick-up device including first and second pixel groups on which respective images are formed by a pupil-divided subject-image that has passed through first and second regions of an imaging lens, and generates a second display image for use in focus verification from first and second images based on an image signal output from the first and second pixel groups; a display section that displays images; a display controller that performs control to inhibit display by the display section of the first display image generated by the generation section, and to display the second display image generated by the generation section on the display section; and an automatic focus section that, in cases in which a predetermined instruction has been input, performs automatic focusing in a focus region having at least a portion that overlaps with at least a portion of a display region of the second display image.

In the image processing device according to the present invention, the first display image is generated by the generation section based on the image signal output from the image pick-up device including the first and second pixel groups on which respective images are formed by the pupil-divided subject-image that has passed through the first and second regions of the imaging lens.

Moreover, in the present invention, the second display image for use in focus verification from the first and second images is generated by the generation section based on the image signal output from the first and second pixel groups.

Moreover, in the present invention, control is performed by the display controller to inhibit display of the first display image generated by the generation section on the display section, and to display the second display image generated by the generation section on the display section.

In the present invention, in cases in which the predetermined instruction has been input, the automatic focus section performs automatic focusing in a focus region having at least a portion that overlaps with at least a portion of the display region of the second display image.

Thus in the image processing device according to the present invention, at least a portion of a focus region that is the image region target during automatic focusing overlaps with at least a portion of the image region of the second display image, enabling manual focal point adjustment to be performed without an uncanny feeling.

In the image processing device according to the present invention, configuration may be made such that the automatic focus section performs automatic focusing in a focus region having a proportion of surface area overlapping with the display region of the second display image that is a predetermined first threshold value or greater. This thereby enables the degree of overlap between the second display image and the focus image to be set.

In the image processing device according to the present invention, configuration may be made such that the display controller further performs control to display data indicating the range of the focus region on the display section. This thereby enables the convenience to be raised due to a user being able to visually check the focus region.

In the image processing device according to the present invention, configuration may further include an extraction section that extracts at least a portion of a region corresponding to a main subject-image in the second display image as a subject-image region, and the automatic focus section may perform automatic focusing using the subject-image region extracted by the extraction section as the focus region. This thereby enables focusing to be performed on the main subject-image in the second display image.

In the image processing device according to the present invention, configuration may be made such that the extraction section extracts at least a portion of a region corresponding to a face of a person as the subject-image region. This thereby enables focusing to be performed on the face of a person in the second display image.

In the image processing device according to the present invention, configuration may be made such that the automatic focus section performs automatic focusing using, as the focus region, a predetermined region that has at least a portion overlapping with at least a portion of the display region of the second display image and includes a central portion within the display region of the first display image. This thereby enables an image region in which there is a high probability of the main subject-image being present to be the target of automatic focusing.

The image processing device according to the present invention may further include a reception section that receives input of position data representing the position of the focus region, and the automatic focus section may move the position of the focus region based on the position data received by the reception section and perform automatic focusing. This thereby enables automatic focusing to be performed with a user-desirable region as the focus region.

In the image processing device according to the present invention, configuration may be made such that, only in cases in which at least a portion of the focus region after moving based on the position data would overlap with at least a portion of the display region of the second display image, the automatic focus section performs the movement and performs automatic focusing. This thereby enables manual focal point adjustment to be performed more certainly without an uncanny feeling.

In the image processing device according to the present invention, configuration may be made such that the display controller performs control to halt display of the second display image in cases in which the focus region after moving based on the position data would fall outside the display region of the second display image. This thereby enables focal point adjustment with an uncanny feeling to be avoided.

In the image processing device according to the present invention, configuration may be made such that the reception section re-receives input of the position data after being controlled by the display controller to halt display of the second display image, and, in cases in which the position data has been re-received by the reception section, the display controller performs control so as to restart display of the second display image in cases in which at least a portion of the focus region after moving based on the position data would overlap with at least a portion of the display region of the second display image. This thereby enables focal point adjustment to be performed without an uncanny feeling even in cases in which the movement destination of the focus region has been mistakenly instructed by a user.

The image processing device according to the present invention may further include a second extraction section that extracts at least a portion of a region corresponding to a main subject-image within the first display image as a second subject-image region, and, in cases in which the second subject-image region extracted by the second extraction section would fall outside the display region of the second display image, the automatic focus section may perform automatic focusing using, as the focus region, a region within the display region having a predetermined size and having the shortest distance from the second subject-image region. This thereby enables focal point adjustment to be performed without an uncanny feeling even in cases in which the main subject-image is outside of the display region of the second display image.

The image processing device according to the present invention may further include a second reception section that receives input of expansion instruction data for instructing expansion of the second display image, and the display controller may perform control to expand and display the second display image in cases in which input of expansion instruction data has been received by the second reception section, and, in cases in which control has been performed by the display controller to expand and display the second display image, the automatic focus section may expand the focus region with an expansion ratio of an expansion ratio of the second display image or less and perform automatic focusing. This thereby enables an increase to be prevented in the amount by which the focus region juts out from the second display image accompanying expansion of the second display image and the focus region.

In the image processing device according to the present invention, configuration may be made such that, in cases in which the size of the focus region after expansion would be larger than a predetermined second threshold value, the automatic focus section performs automatic focusing using the focus region at the size of the second threshold value. This thereby enables the precision of automatic focusing to be raised by being able to suppress images other than the main imaging subject from being included in the focus region.

In order to achieve the above object, an imaging device recited in the present invention includes the image processing device according to the present invention, the imaging lens, and the image pick-up device.

Thus the imaging device according to the present invention operates similarly to the image processing device according to the present invention, and so, similarly to the image processing device according to the present invention, enables focal point adjustment to be performed manually without an uncanny feeling.

In order to achieve the above object, a program according to the present invention causes a computer to function as: a generation section that generates a first display image based on an image signal output from an image pick-up device including first and second pixel groups on which respective images are formed by a pupil-divided subject-image that has passed through first and second regions of an imaging lens, and generates a second display image for use in focus verification from first and second images based on an image signal output from the first and second pixel groups; a display controller that performs control to display the first display image generated by the generation section on a display section that displays images, and to display the second display image generated by the generation section on the display section within a display region of the first display image; and an automatic focus section that, in cases in which a predetermined instruction has been input, performs automatic focusing in a focus region having at least a portion that overlaps with at least a portion of a display region of the second display image.

Thus the program according to the present invention causes a computer to operate similarly to the image processing device according to the present invention, and so, similarly to the image processing device according to the present invention, enables focal point adjustment to be performed manually without an uncanny feeling.

Moreover, in order to achieve the above object, an image processing method according to the present invention includes: a generation step that generates a first display image based on an image signal output from an image pick-up device including first and second pixel groups on which respective images are formed by a pupil-divided subject-image that has passed through first and second regions of an imaging lens, and generates a second display image for use in focus verification from first and second images based on an image signal output from the first and second pixel groups; a display control step that performs control to display the first display image generated by the generation step on a display section that displays images, and to display the second display image generated by the generation step on the display section within a display region of the first display image; and an automatic focusing step that, in cases in which a predetermined instruction has been input, performs automatic focusing in a focus region having at least a portion that overlaps with at least a portion of a display region of the second display image.

Thus the image processing method according to the present invention operates similarly to the image processing device according to the present invention, and so, similarly to the image processing device according to the present invention, enables focal point adjustment to be performed manually without an uncanny feeling.

Advantageous Effects of Invention

The present invention exhibits the advantageous effect of enabling automatic focusing to be performed manually without an uncanny feeling.

BRIEF DESCRIPTION OF DRAWINGS

FIG. 4 is a schematic layout diagram illustrating an example of a color filter and placement of light blocking members provided to an image pick-up device included in an imaging device according to an exemplary embodiment.

FIG. 7A is a face-on view illustrating an example of a display state of a normal image and a split-image according to an exemplary embodiment.

FIG. 7B is a face-on view illustrating an example of a display state of a normal image and a split-image according to an exemplary embodiment.

DESCRIPTION OF EMBODIMENTS

Explanation follows regarding examples of exemplary embodiments of an imaging device according to the present invention, with reference to the drawings.

First Exemplary Embodiment

Figure 1:
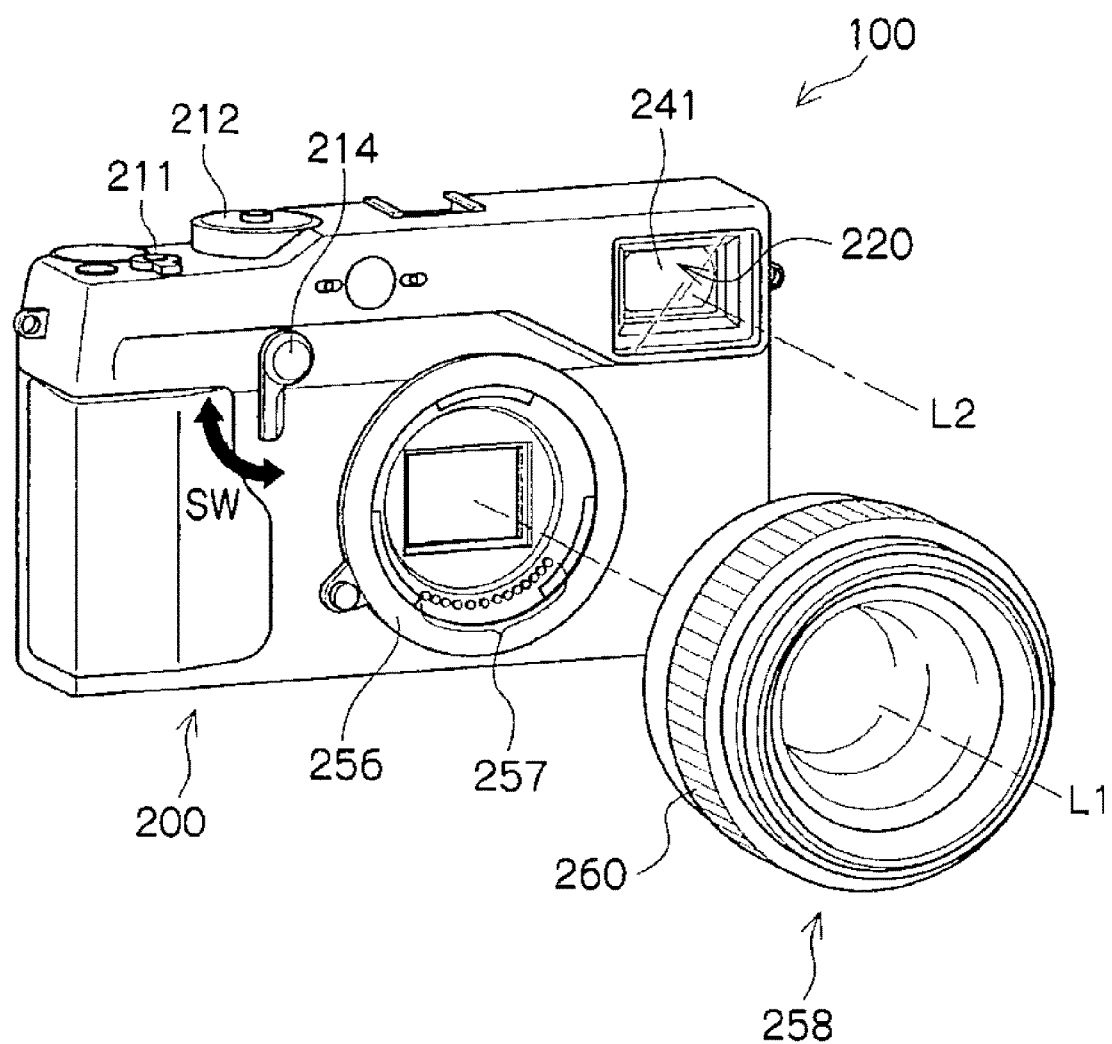
FIG. 1 is a perspective view illustrating an example of an external appearance of an interchangeable lens camera that is an imaging device according to a first to a fifth exemplary embodiment.

An imaging device 100 of the present exemplary embodiment is an interchangeable lens camera. Moreover, as illustrated in FIG. 1, the imaging device 100 is a digital camera with a camera body 200 and an interchangeable lens 258

(imaging lens, focus ring 260) that is interchangeably mounted to the camera body 200, and without a reflex mirror. A HYBRID FINDER (registered trademark) 220 is also provided to the camera body 200. The HYBRID FINDER 220 indicates, for example, a finder selectively employed as an optical viewfinder (referred to as "OVF" below), or as an electronic viewfinder (referred to as "EVF" below).

The interchangeable lens 258 is mounted interchangeably to the camera body 200 by coupling a mount 256 provided to the camera body 200 together with a mount 346 (see FIG. 3) provided on the interchangeable lens 258 side to correspond to the mount 256. Moreover, a focus ring 260 is provided to a mirror cylinder of the interchangeable lens 258, and the focusing lens is moved in the optical axis direction according to rotational operation of the focus ring 260, enabling subject-image light to be focused on an image pick-up device 20 (see FIG. 3), described below, at an in-focus position according to distance from the subject-image.

An OVF finder window 241 included in the HYBRID FINDER 220 is provided on the front face of the camera body 200. A finder switching lever 214 is provided on the front face of the camera body 200. Switching is performed (described below) between an optical image visible with the OVF and an electronic image visible with the EVF (live-view image) by turning the finder switching lever 214 in the directions of the arrows SW. The optical axis L2 of the OVF is different from the optical axis L1 of the interchangeable lens 258. The top face of the camera body 200 is mainly provided with a release switch 211 and a dial 212 to set imaging mode, replay mode, and the like.

The release switch 211 is configured capable of detecting a two stage press-operation, a state pressed from a standby position to an intermediate position (half pressed position), or a state pressed to a final pressed position past the intermediate position (fully pressed position). In the following a "state pressed from the standby position to the half pressed position" is referred to as a "half pressed state", and "a state pressed from the standby position to the fully pressed position" is referred to as the "fully pressed state". In the imaging device 100 according to the first exemplary embodiment, placing the release switch 211 in a half pressed state causes the image capture control processing described below to be executed, and subsequently placing the release switch 211 in a fully pressed state causes exposure (image capture) to be performed.

Figure 2:
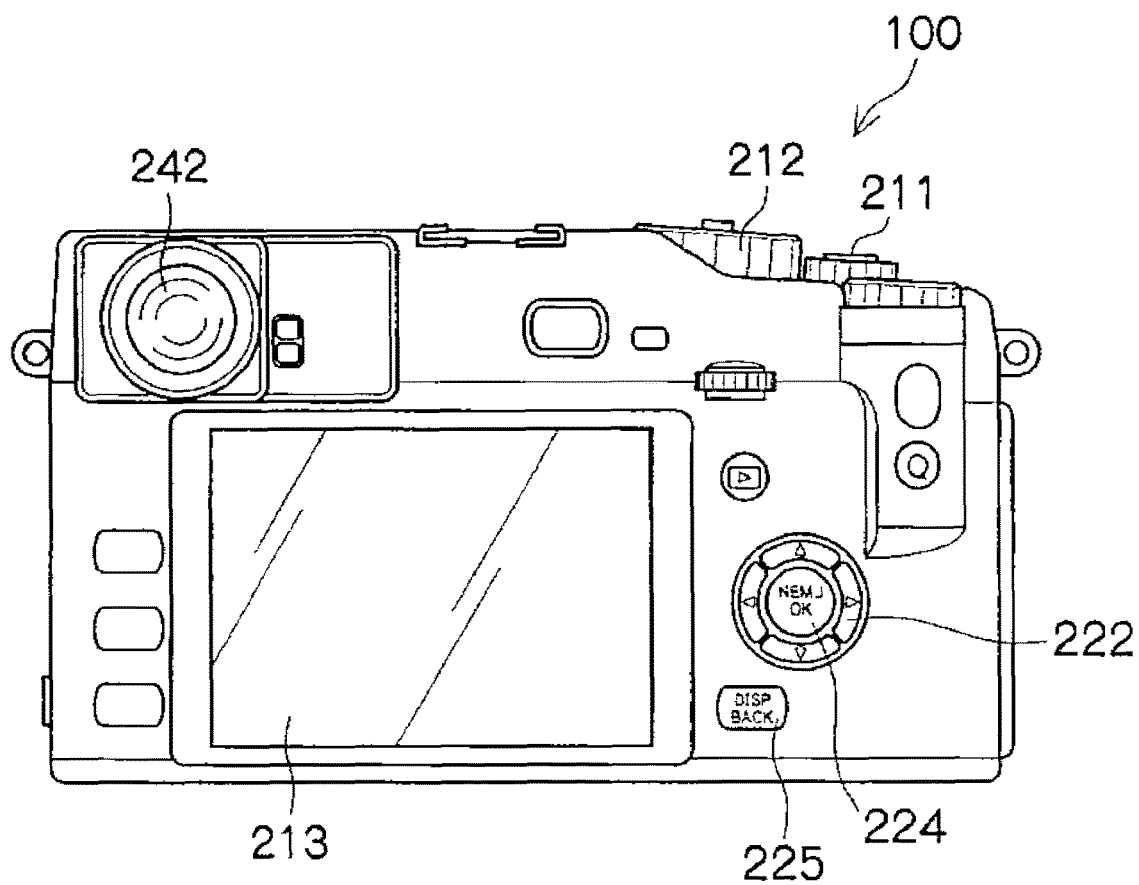
FIG. 2 is a back view illustrating the back face side of the imaging device according to the first to the fifth exemplary embodiments.

As illustrated in FIG. 2, the back face of the camera body 200 is provided with an OVF finder eyepiece 242, a display section 213, a cross-key 222, a MENU/OK key 224, and a BACK/DISP button 225.

The cross-key 222 functions as a multifunction key to output various instruction signals, such as menu selection, zoom, and frame advance. The MENU/OK key 224 is an operation key that functions as a menu button to instruct display of a menu on the screen of the display section 213, and also doubles as an OK button function to confirm selected content, to instruct execution, or the like. The BACK/DISP button 225 is used to erase a desired object, such as a selected item, erase specified content, or return to the one-previous operation state, and so on.

The display section 213 is implemented for example by an LCD, and is employed to display a live-view image (through image) that is an example of successive frame images obtained by imaging successive frames during an imaging mode. The display section 213 is also employed to display a still image that is an example of a single frame image obtained by imaging a single frame in cases in which an instruction for still image capture has been given. Moreover, the display section 213 may be employed to display a reproduced image in a reproduction mode, and to display menu screens and the like.

Figure 3:
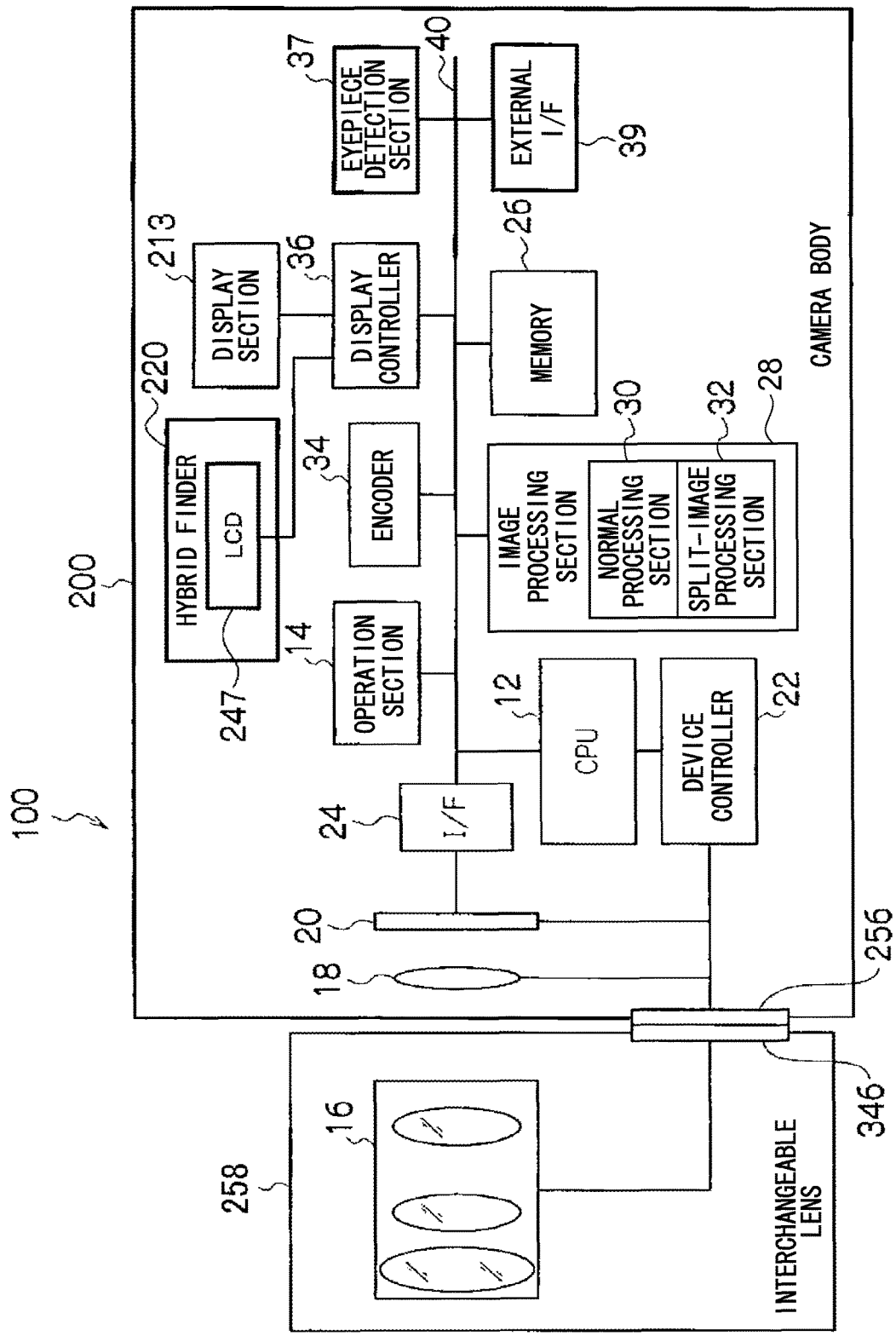
FIG. 3 is a block diagram illustrating an example of a configuration of an electrical system of an imaging device according to the first to the fifth exemplary embodiments.

The imaging device 100 is a digital camera that records captured still images and video images, and, as illustrated in FIG. 3, the overall operation of the camera is integrally controlled by a Central Processing Unit (CPU) 12. As is illustrated in FIG. 3, in addition to the CPU 12, the imaging device 100 also includes an operation section 14, an interface section 24, memory 26, and an encoder 34. The imaging device 100 further includes a display controller 36, an eyepiece detection section 37, and an external interface (I/F) 39 that are examples of a display control of the present invention. Moreover, the imaging device 100 includes an image processing section 28 that is an example of a generation section of the present invention.

The CPU 12, the operation section 14, the interface section 24, the memory 26, the image processing section 28, the encoder 34, the display controller 36, the eyepiece detection section 37, and the external interface (I/F) 39 are connected together through a bus 40. The memory 26 includes a non-volatile storage region (for example EEPROM or the like) stored with parameters, programs, and the like, and a volatile storage region (for example SDRAM or the like) temporarily stored with various data related to images and the like.

In the imaging device 100 according to the first exemplary embodiment, the CPU 12 performs focusing control by controlling the driving of a focal point adjustment motor such that the contrast value of the image obtained by imaging is as a maximum. The CPU 12 computes AE data that is physical data indicating the brightness of the image obtained by imaging. When the release switch 211 is in the half pressed state, the CPU 12 derives the shutter speed and the F number according to the brightness of the image indicated by the AE data. The exposure state is then set by controlling the relevant sections such that the derived shutter speed and F number are achieved.

The operation section 14 is a user interface operated by an operator when giving various instructions to the imaging device 100. Various instructions received by the operation section 14 are output to the CPU 12 as operation signals, and the CPU 12 executes processing according to the operation signals input from the operation section 14.

The operation section 14 includes the release switch 211, the dial 212, the display section 213, the finder switching lever 214, the cross-key 222, the MENU/OK key 224, and the BACK/DISP button 225.

When the imaging mode has been set using the dial, image light representing a subject-image is formed as an image on a light receiving face of a color image pick-up device (for example a CMOS sensor) 20 through imaging lenses 16 that include a focusing lens that is movable by manual operation and a shutter 18. The signal charges accumulated in the image pick-up device 20 are read in sequence as digital signals according to the signal charges (voltage) by a read signal applied from a device controller 22. The image pick-up device 20 has what is referred to as an electronic shutter function, and the charge accumulation time (shutter speed) of each photosensor is controlled by the timing of the read signals by operating the electronic shutter function. The image pick-up device 20 according to the first exemplary embodiment is a CMOS image sensor, however there is no limitation thereto, and a CDD image sensor may be employed.

Figure 4:
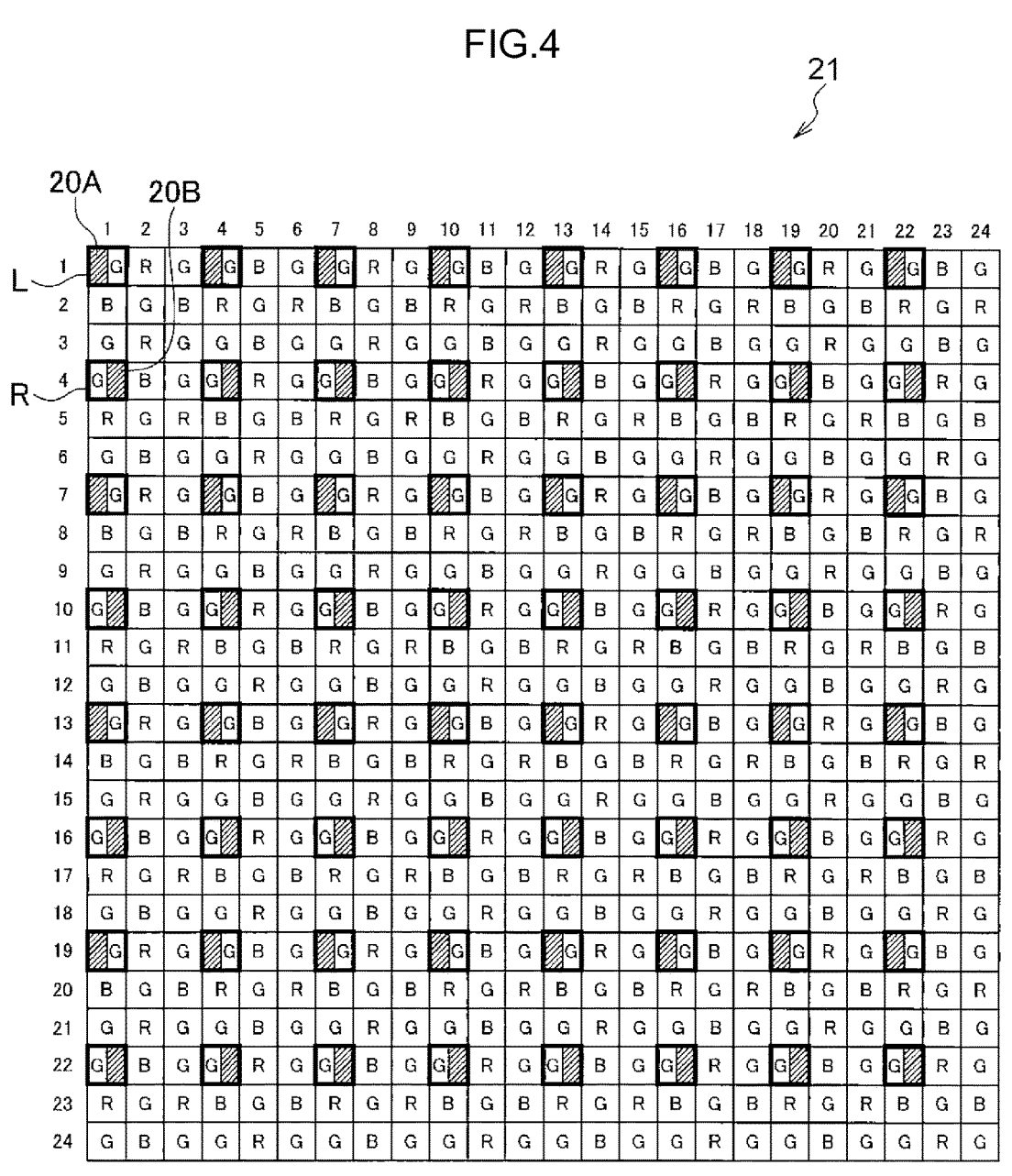

A color filter 21, such as the example illustrated in FIG. 4, is provided to the image pick-up device 20. As illustrated in the example of FIG. 4, the color filter 21 includes a first filter G, corresponding to G (green) that contributes most to obtaining a brightness signal, a second filter R, corresponding to R (red), and a third filter B, corresponding to B (blue).

The imaging device 100 according to the present exemplary embodiment includes a phase difference AF function. The image pick-up device 20 according to the present exemplary embodiment includes plural phase difference detection pixels employed to operate the phase difference AF function. The plural phase difference detection pixels are arrayed in a predetermined pattern.

The pixels employed for phase difference detection are first pixels L having the left half portion in the horizontal direction blocked, or second pixels R having the right half portion in the horizontal direction blocked. When, in the following explanation, there is no need to discriminate between the first pixels L and the second pixels R, they are called "phase difference pixels".

Figure 5:
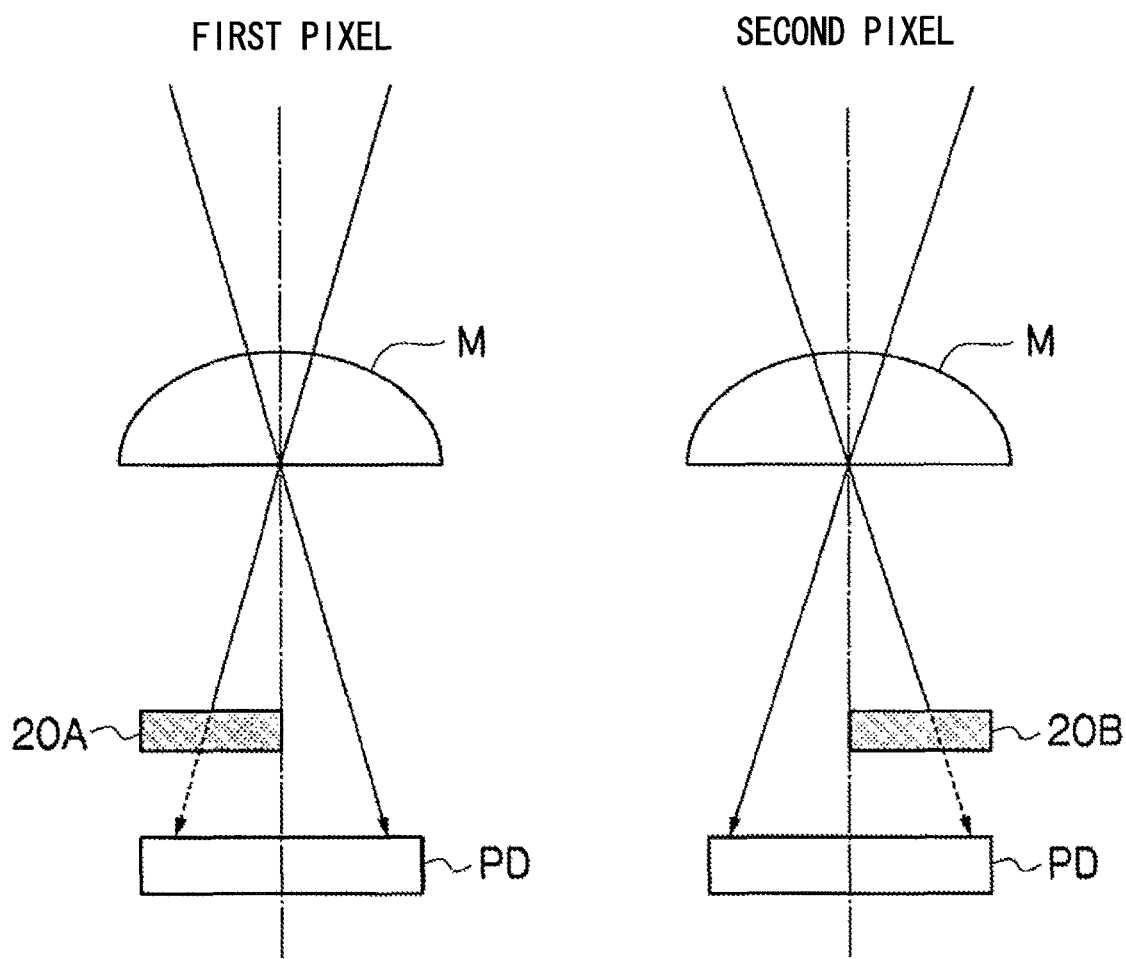
FIG. 5 is a schematic configuration diagram illustrating an example of a configuration of phase difference pixels (a first pixel and a second pixel) included in an image pick-up device of an imaging device according to an exemplary embodiment.

The first pixels L illustrated in the example of FIG. 5 include light-blocking members 20A, and the second pixels R therein include light-blocking members 20B. The light-blocking members 20A are provided at the front face side of a photodiode PD (microlens M side), and block light to the left half of the light receiving faces. The light-blocking members 20B are provided at the front face side of a photodiode PD, and block light to the right half of the light receiving faces.

The microlens M and the light-blocking members 20A, 20B function as a pupil divider, and the first pixels L receive light only from light rays passing through an exit pupil of imaging lenses 16 on the left side of the optical axis, the second pixels R receive light only from light rays passing through the exit pupil of the imaging lenses 16 on the right side of the optical axis. Thus the light rays passing through the exit pupil are divided to the left and right by the microlens M and the light-blocking members 20A, 20B serving as a pupil divider, and are respectively incident to the first pixels L and the second pixels R.

Portions in-focus (in a focused state) out of the subject-image corresponding to the light rays of the left half and the subject-image corresponding to the light rays on the right half among the light rays passing through the exit pupil of the imaging lenses 16 are focused at the same position on the image pick-up device 20. Conversely, portions in focus in front of the image subject or in focus behind the image subject are incident to different respective positions on the image pick-up device 20 to each other (with displaced phase). This thereby enables a parallax image (left eye image, right eye image) to be acquired with different parallax for the subject-image corresponding to the light rays of the left half, and the subject-image corresponding to the light rays of the right half.

The imaging device 100 according to the present exemplary embodiment detects a phase displacement amount based on pixel values of the first pixels L and pixel values of the second pixels R. Adjustment by a user to the in-focus position of the imaging lens 16 is assisted by showing the detected phase displacement amount. Note that in the following, reference numerals are not appended when explanation does not need to discriminate between the light-blocking members 20A, 20B and they are referred to collectively as "light-blocking members".

The image pick-up device 20 according to the present exemplary embodiment is classified into a first pixel group, a second pixel group, and a third pixel group. The first pixel group indicates, for example, the plural first pixels L. The second pixel group indicates, for example, the plural second pixels R. The third pixel group indicates, for example, plural normal pixels. Reference here to "normal pixels" means, for example, pixels other than the phase difference pixels (for example pixels without the light-blocking members 20A. 20B). In the following a RAW image represented by an image signal output from the first pixel group is referred to as a "first image". A RAW image represented by an image signal output from the second pixel group is referred to as a "second image". A RAW image represented by an image signal output from the third pixel group is referred to as a "third image".

Each of the pixels included in the first pixel group and the second pixel group are placed such that positions of the first pixel group and the second pixel group align within 1 pixel of each other in the horizontal direction. Moreover, each of the pixels included in the first pixel group and the second pixel group are place such that positions of the first pixel group and the second pixel group align within 1 pixel of each other in the vertical direction. In the example illustrated in FIG. 4, the first pixels L and the second pixels R are placed alternately to each other in a straight line shape along the horizontal direction and the vertical direction, with a spacing of plural pixels worth (2 pixels worth in the present exemplary embodiment) between each other.

In the example illustrated in FIG. 4, the positions of each of the pixels contained in the first pixel group and the second pixel group are aligned at positions within 1 pixel of each other in both the horizontal direction and the vertical direction, however the positions may be positioned so as to fall within a specific number of pixels (for example within 2 pixels) of each other in at least one of the horizontal direction or the vertical direction. In order to suppress to the maximum extent the occurrence of image misalignment caused by factors other than misaligned focus, however, as illustrated in the example in FIG. 4, preferably the positions of each of the pixels contained in the first and second pixel groups are aligned at positions so as to fall within 1 pixel of each other in both the horizontal direction and the vertical direction.

The phase difference pixels are, as illustrated in the example in FIG. 4, provided to G filter pixels in a square array corresponding to 2×2 pixels (for example, pixels from the third row and third column, third row and fourth column, fourth row and third column, and fourth row and fourth column from the top left of the face-on view of FIG. 4). In the present exemplary embodiment, the pixel at the right bottom corner of the 2×2 G filter pixels in the face-on view of FIG. 4 is assigned as a phase difference pixel.

In this manner, in the color filter 21, the light-blocking members are provided to the pixels at the bottom right corner of the 2×2 pixels of G filters, with the phase difference pixels regularly placed along the vertical direction and the horizontal direction with plural pixel separations therebetween. Thus, since there are comparatively many normal pixels placed at the periphery of the phase difference pixels, the interpolation precision can be raised in cases in which pixel values of the phase difference pixels are interpolated from the pixel values of the normal pixels. Moreover, each of the pixels contained in the first to the third pixel groups are placed so that each of the normal pixels employed for interpolation of phase difference pixels are not employed more than once, enabling a further improvement in interpolation precision to be expected.

Returning to FIG. 3, the image pick-up device 20 outputs the image signal representing the first image (digital signal representing the pixel values of each of the first pixels) from the first pixel group, and outputs the image signal representing the second image (digital signal representing the pixel values of each of the second pixels) from the second pixel group. The image pick-up device 20 outputs the third image (digital signal representing the pixel values of each of the normal pixels) from the third pixel group. The third image is a chromatic image, and is, for example, a color image with the same color array as the array of the normal pixels. Image data representing the first image, the second image, and the third image are temporarily stored in the volatile storage region in the memory 26 through the interface section 24.

The image processing section 28 includes a normal processing section 30. The normal processing section 30 generates a chromatic normal image, serving as an example of a first display image, by processing the R, G, B signals corresponding to the third pixel group. The image processing section 28 also includes a split-image processing section 32. The split-image processing section 32 generates achromatic split-images, serving as an example of second display images, by processing the G signals corresponding to the first pixel group and the second pixel group. The image processing section 28 according to the present exemplary embodiment is, for example, implemented by an Application Specific Integrated Circuit (ASIC) that is a single integrated circuit of circuits for executing the multiple functions related to image processing. The CPU 12 executes an image capture control processing program described below, a split image is generated by the split-image processing section 32, and the CPU 12 controls to display the generated split image on the display section 213. However, hardware configuration of the image processing section 28 is not limited to an ASIC, and, for example, configuration may be made with other hardware, such as a computer including a programmable logic device and CPU, ROM, and RAM.

The encoder 34 converts an input signal into a signal of another format and outputs the converted signal. The HYBRID FINDER 220 includes an LCD 247 that displays an electronic image. The number of pixels in a specific direction in the LCD 247 (for example the number of pixels in the horizontal direction that is the parallax generation direction), is less than the number of pixels in the same direction of the display section 213. The display controller 36 is connected to the display section 213 and the LCD 247, and displays images on the LCD 247 or the display section 213 by selectively controlling the LCD 247 and the display section 213. In the following, when there is no need to discriminate between the display section 213 and the LCD 247, they are referred to collectively as "display devices".

The imaging device 100 according to the present exemplary embodiment is configured to be switchable between a manual focus mode and an autofocus mode using the dial 212. When the one of the focus modes has been selected, the display controller 36 displays on the display devices a live-view image onto which the split-images have been synthesized. Moreover, when the autofocus mode has been selected using the dial 212, the CPU 12 operates as a phase difference detection section and an automatic focus section. The phase difference detection section detects the phase difference between the first image output from the first pixel group and the second image output from the second pixel group. The automatic focus section controls a lens drive section (not illustrated in the drawings) from the device controller 22 through the mounts 256, 346, based on the detected phase displacement, to move the imaging lenses 16 to the in-focus position such that the defocus amount of the imaging lenses 16 becomes zero. The "defocus amount" referred to above indicates, for example, a phase displacement amount between the first image and the second image.

The eyepiece detection section 37 detects each time a user looks into the finder eyepiece 242, and outputs the detection result to the CPU 12. The CPU 12 is accordingly able to ascertain, based on the detection result of the eyepiece detection section 37, whether or not the finder eyepiece 242 is being used.

The external I/F 39 is connected to a communication network, such as a Local Area Network (LAN) or the internet, and transmission and reception of various data between external devices (for example a printer) and the CPU 12 is achieved through the communication network. When connected to a printer as an external device, the imaging device 100 is accordingly capable of outputting captured still images to a printer and printing. When connected to a display as an external device, the imaging device 100 is capable of outputting captured still images and live-view images to a display, and displaying thereon.

Figure 6:
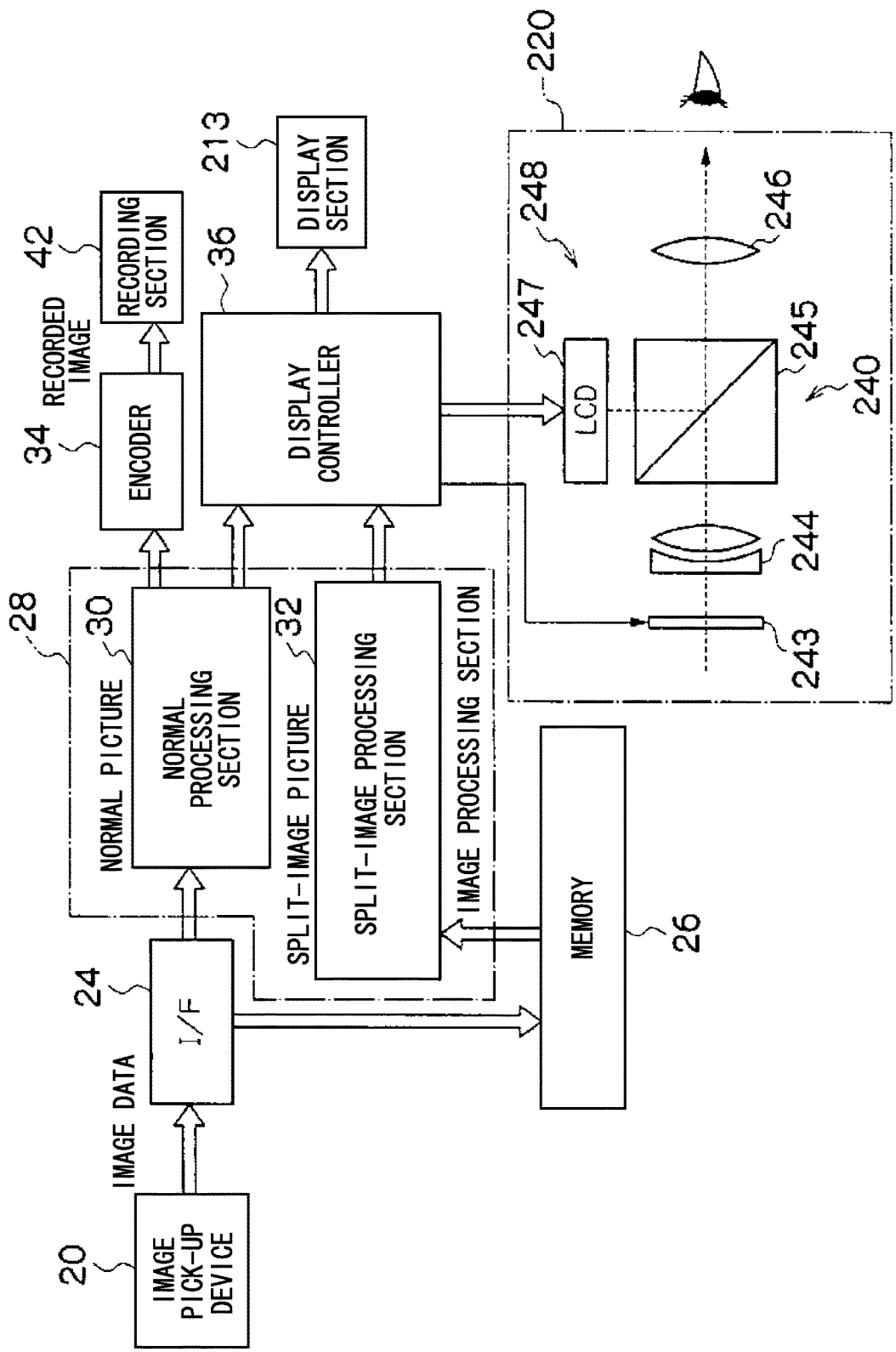
FIG. 6 is a block diagram illustrating an example of relevant functions of an imaging device according to an exemplary embodiment.

As illustrated in FIG. 6, the normal processing section 30 and the split-image processing section 32 each include a WB gain section, a gamma correction section, and a synchronization processing section (not illustrated in the drawings), and perform serial signal processing in each of the processing sections on the original digital signals (RAW images) temporarily stored in the memory 26. Namely, the WB gain section executes white balance (WB) by adjusting the gain of the R, G, B signals. The gamma correction section gamma corrects each of the R, G B signals for which WB has been executed by the WB gain section. The synchronization processing section performs color interpolation processing corresponding to the array of the color filter 21 of the image pick-up device 20, and generates synchronized R, G, B signals. The normal processing section 30 and the split-image processing section 32 perform parallel image processing on the RAW images each time one screen's worth of RAW image is acquired by the image pick-up device 20.

The normal processing section 30 is input with R, G, B RAW images from the interface section 24, and interpolates the pixels that are being light-blocked in the phase difference image of the R, G, B pixels of the third pixel group using peripheral pixels of the same color in the first pixel group and the second pixel group (for example, the adjacent G pixels). The normal processing section 30 may also employ the image obtained by the above interpolation as a normal image for display or as a normal image for recording.

The normal processing section 30 outputs image data of the generated normal image for recording to the encoder 34. The R, G, B signals processed by the normal processing section 30 are converted (encoded) by the encoder 34 into a recording signal and recorded in a recording section 42 (see FIG. 6). Moreover, the normal processing section 30 outputs generated image data representing a normal image for display to the display controller 36. In the following, for convenience of explanation, when there is no need to discriminate between the "normal image for recording" and the "normal image for display" the words "for recording" and the words "for display" are omitted, and they are referred to collectively as "normal images".

The image pick-up device 20 is capable of changing the respective exposure conditions of the first pixel group and the second pixel group (for example, the shutter speed with the electronic shutter), and thereby capable of acquiring images under different exposure conditions at the same time. Consequently, the image processing section 28 is capable of generating images over a wide dynamic range based on the images under different exposure conditions. Moreover, due to being able to acquire plural images under the same exposure conditions at the same time, adding these images together enables a high sensitivity image with little noise to be generated, or a high resolution image to be generated.

The split-image processing section 32 extracts the G signals of the first pixel group and the second pixel group from the RAW images temporarily stored in the memory 26, and generates an achromatic split-image based on the G signals of the first pixel group and the second pixel group. Both the first pixel group and the second pixel group extracted from the RAW images are pixel groups from the G filter pixels as described above. The split-image processing section 32 is accordingly able to generate an achromatic left parallax image and an achromatic right parallax image based on the G signals of the first pixel group and the second pixel group. In the following, for convenience of explanation, the above "achromatic left parallax image" is referred to as the "left eye image", and the above "achromatic right parallax image" is referred to above the "right eye image".

The split-image processing section 32 synthesizes the left eye image based on the first image output from the first pixel group together with the right eye image based on the second image output from the second pixel group to generate a split-image. Image data of the generated split-image is output to the display controller 36.

The display controller 36 generates image data for display based on the image data for recording corresponding to the third pixel group input from the normal processing section 30, and image data of the split-image corresponding to the first and second pixel groups input from the split-image processing section 32. For example, the display controller 36 synthesizes a split-image represented by image data input from the split-image processing section 32 in a display region of a normal image represented by image data for recording corresponding to the third pixel group input from the normal processing section 30. The image data obtained by synthesizing is then output to a display device.

The split-image generated by the split-image processing section 32 is a multi-section image synthesized from one section of a left eye image, and one section of a right eye image. An example of what is referred to here as a "multi-section image" is a split-image 300, illustrated for example in FIG. 7A and FIG. 7B. The split-image 300 is an image synthesized from the top half section image of a left eye image 300A out of the sectioned images divided in 2 in the up-down direction of the face-on views of FIG. 7A and FIG. 7B, and from the bottom half section image of a right eye image 300B out of the same section images divided into two. The split-image 300 is an image arising from displacing each of the section images from the left eye image 300A and the right eye image 300B with respect to each other in a predetermined direction (the left-right direction in the face-on view of FIG. 7A and FIG. 7B in the present exemplary embodiment) by an amount according to the state of focus.

In the present exemplary embodiment, when synthesizing the split-image 300 onto a normal image 301, synthesis is performed by inserting the split-image 300 in place of a portion of the normal image, however the synthesis method is not limited thereto. For example, a synthesis method may be employed in which the split-image 300 is superimposed on the normal image 301. Moreover, when superimposing the split-image 300, a synthesis method may be employed in which the transparency, of both the image of a portion of the normal image 301 corresponding to the region onto which the split-image 300 is to be superimposed and the split-image 300, is appropriately adjusted for superimposition. Alternatively the normal image 301 and the split-image 300 may be displayed in different layers from each other. The split-image 300 can thereby be displayed within a display region of the normal image of a live-view image. A live-view image is an image representing the subject-image when images are successively captured and successively displayed on the screen of the display device.

As illustrated in FIG. 6, the HYBRID FINDER 220 includes an OVF 240 and an EVF 248. The OVF 240 is a reverse Galileo finder including an object lens 244 and an eyepiece lens 246. The EVF 248 includes the LCD 247, a prism 245, and the eyepiece lens 246.

A liquid crystal shutter 243 is disposed at the front of the object lens 244, and the liquid crystal shutter 243 blocks light such that the optical image is not incident to the object lens 244 while the EVF 248 is being used.

The prism 245 reflects the electronic image or various data displayed on the LCD 247 and guides these toward the eyepiece lens 246, and synthesizes an optical image together with information (electronic image, various types of data) displayed on the LCD 247.

When the finder switching lever 214 is turned in the arrow SW direction illustrated in FIG. 1, switching is made at each turn between the OVF mode that enables a visual check to be made on an optical image using the OVF 240, and the EVF mode that enables a visual check to be made on the electronic image using the EVF 248.

In the OVF mode, the display controller 36 controls so that the liquid crystal shutter 243 is in a non-light blocking state, enabling a visual check to be made on an optical image through the finder eyepiece section 242. Moreover, only the split-image 300 is displayed on the LCD 247. This thereby enables a finder image in which the split-image 300 is superimposed on a portion of the optical image to be displayed.

In the EVF mode, the display controller 36 controls so that the liquid crystal shutter 243 is in a light blocking state, enabling a visual check to be made through the finder eyepiece section 242 of an electronic image displayed alone on the LCD 247. Similar image data to the image data synthesized with the split-image 300 for output on the display section 213 is input to the LCD 247. This enables the electronic image synthesized with the split-image 300 to be displayed on a portion of the normal image 301, similarly to with the display section 213.

The image signals representing the normal image 301 and the split-image 300 are respectively input to the display device. In this situation, the display device displays the split-image 300 represented by the input image signal on a rectangular shaped display region 302 of the split-image 300 at a central portion of the screen, as illustrated in the example in FIG. 7A and FIG. 7B. The display device displays the normal image 301 represented by the input image signal in an external peripheral region of the split-image 300. In cases in which the image signal representing the split-image 300 is not input and only the image signal representing the normal image 301 has been input, the display device displays the normal image 301 represented by the input image signal on the entire display region of the display device. In cases in which the image signal representing the normal image 301 is not input and only the image signal representing the split-image 300 has been input, the display device displays the split-image 300 represented by the input image signal in the display region 302, and leaves the external peripheral region as a blank region.

The imaging device 100 according to the present exemplary embodiment, however, includes a function to perform automatic focus control when a predetermined operation has been performed while set in a manual focus mode state. The imaging device 100 according to the present exemplary embodiment accordingly displays the split-image 300 on the display device, and also performs the automatic focus control when operated as described above, in addition to performing image capture control processing to capture an image when operated to instruct image capture.

Figure 8:
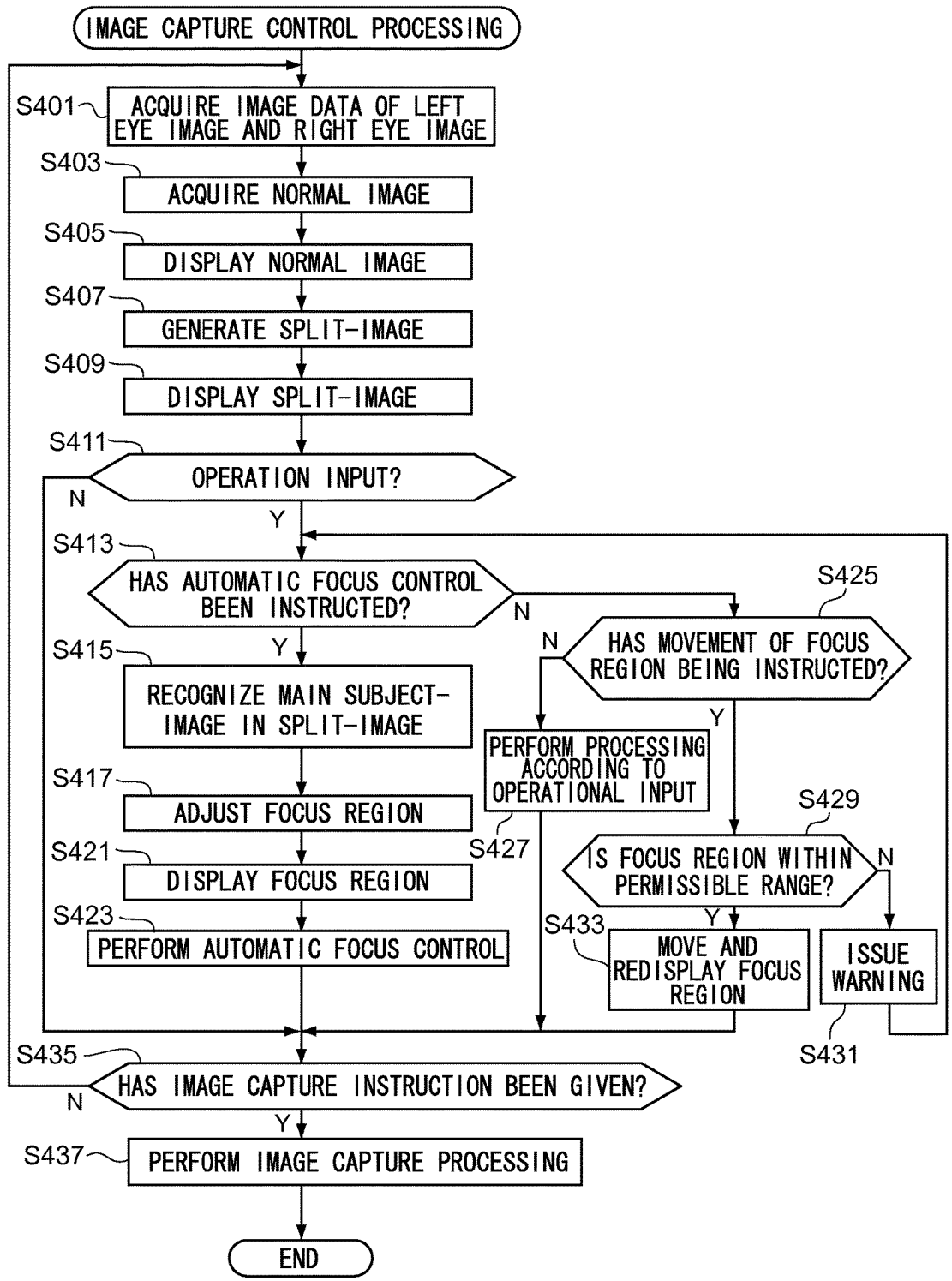
FIG. 8 is a flowchart illustrating a flow of processing of an imaging control program according to the first exemplary embodiment.

Explanation next follows regarding operation of the imaging device 100 according to the present exemplary embodiment, with reference to FIG. 8. FIG. 8 is a flowchart illustrating a flow of processing of an imaging control program executed by the CPU 12 when the manual focus mode is set in the imaging device 100, and the image capture mode has been set by the dial 212. This program is pre-stored in a specific recording region of the memory 26.

Explanation will be omitted of processing when the release switch 211 is in a half pressed state.

First, at step S401, image data representing the left eye image 300A based on the image signal output from the first pixel group, and image data representing the right eye image 300B based on the image signal output from the second pixel group, are acquired through the interface section 24. Each of the acquired image data is stored by the CPU 12 in a specific storage region (for example in the memory 26).

At the next step S403, image data representing the normal image 301 based on the image signal output from the third pixel group is acquired through the interface section 24. When this is performed, the CPU 12 acquires the image data representing the normal image 301 based on the image signal output from the third pixel group, however the method of acquiring the image data representing the normal image 301 is not limited thereto. Namely, image data representing the normal image 301 may be generated based on acquired image data representing each of the left eye image 300A and the right eye image 300B.

An example of a method for generating image data representing the normal image 301 is a method in which the left eye image 300A or the right eye image 300B are employed as they are as the normal image 301. Moreover, a method may be employed in which interpolation pixels are placed between each of the adjacent pixels in the left eye image 300A or the right eye image 300B, and image data representing the normal image 301 is generated using the average value of the pixel values of pixels surrounding the interpolation pixels as the pixel values of the interpolation pixels. Moreover, as the method to generate the normal image 301, a method may be employed in which the normal image 301 is generated by synthesizing the left eye image 300A and the right eye image 300B together.

At the next step S405, control is performed to display the normal image 301 on the display section 213. Note that although in the present exemplary embodiment the normal image 301 is displayed on the display section 213, there is no limitation thereto, and the normal image 301 may be displayed on the LCD 247. Moreover, the normal image 301 may be displayed on the LCD 247 in cases in which a user is detected by the eyepiece detection section 37 to be looking into the finder eyepiece section 242, and the normal image 301 displayed on the display section 213 in other situations.

At the next step S407, control of the split-image processing section 32 is performed to generate a split-image. First, the split-image processing section 32 reads from the memory 26 data representing the display region of the split-image 300 on the display section 213 (referred to below as "display region data", a region in the present exemplary embodiment positioned at the central portion of the display region, and having a predetermined shape and size). In the present exemplary embodiment, the display region data is represented in a predetermined coordinate system within the display region of each of the display devices, and data representing the range of the display region 302 is pre-stored in the memory 26. Moreover, the split-image processing section 32 determines the direction for dividing each of the left eye image 300A and the right eye image 300B. In the present exemplary embodiment, data representing the dividing direction (referred to below as "dividing direction data") is pre-stored in the memory 26, and the dividing direction is determined by reading the dividing direction data. Moreover, data representing the number of divisions in each of the left eye image 300A and the right eye image 300B (referred to below as "division number data") is read from the memory 26. In the present exemplary embodiment, the division number data is pre-stored in the memory 26. The split-image processing section 32 then generates the split-image 300 based on data representing each of the display region, the dividing direction, and the division number that have been obtained by performing the above processing.

At the next step S409, control is performed to display the split-image 300 generated by the split-image processing section 32 on the display region of the display section 213. As illustrated in the example in FIG. 9, the CPU 12 performs control to display the normal image 301 on the entire display region of the display section 213, and to display the split-image 300 superimposed on the central portion of the normal image 301.

At the next step S411, determination is made as to whether or not there has been a user operation input by determining whether or not operation input has been performed using the operation section 14. Processing transitions to step S413 when affirmative determination is made at step S411, and processing transitions to step S435, described below, when negative determination is made at step S411.

At the next step S413, determination is made as to whether or not automatic focus control has been instructed by operation input using the operation section 14. When this is performed, the CPU 12 determines that automatic focus control has been instructed by operation input using the operation section 14 in cases in which a predetermined operation to instruct automatic focus control has been performed using the operation section 14. Processing transitions to step S415 when affirmative determination is made at step S413, and processing transitions to step S425, described below, when negative determination is made at step S413.

At the next step S415, recognition of the main subject-image present in the display region of the split-image 300 is performed. In the imaging device 100 according to the present exemplary embodiment, the CPU 12 recognizes the main subject-image in the split-image 300, and extracts a region that is centered on the center of gravity of the main subject-image, and has a predetermined shape and size. The extracted region is denoted as a subject-image region 304. The subject-image region 304 according to the present exemplary embodiment is, as illustrated in the example in FIG. 9B, a rectangular region of a predetermined shape and size. However, the method to determine the subject-image region 304 is not limited thereto, and the subject-image region 304 may be determined as the region containing the center of gravity of the main subject-image from out of plural regions obtained by dividing the display region of the normal image 301 into a lattice shape of a predetermined number of divisions (for example, 7×7). Moreover, a face recognition function may be added to the imaging device 100 according to the present exemplary embodiment, and a person's face may be recognized as the main subject-image.

In the imaging device 100 according to the present exemplary embodiment, the CPU 12 uses the nearest object to the imaging device 100 in the split-image 300 as the main subject-image in cases in which a main subject-image has not been recognized by the processing of the step S415. However, the method to recognize the main subject-image in cases in which the main subject-image has not been recognized is not limited thereto, and a region may be employed that is centered on a central portion of the split-image 300 and has a predetermined shape and size.

Figure 9A:
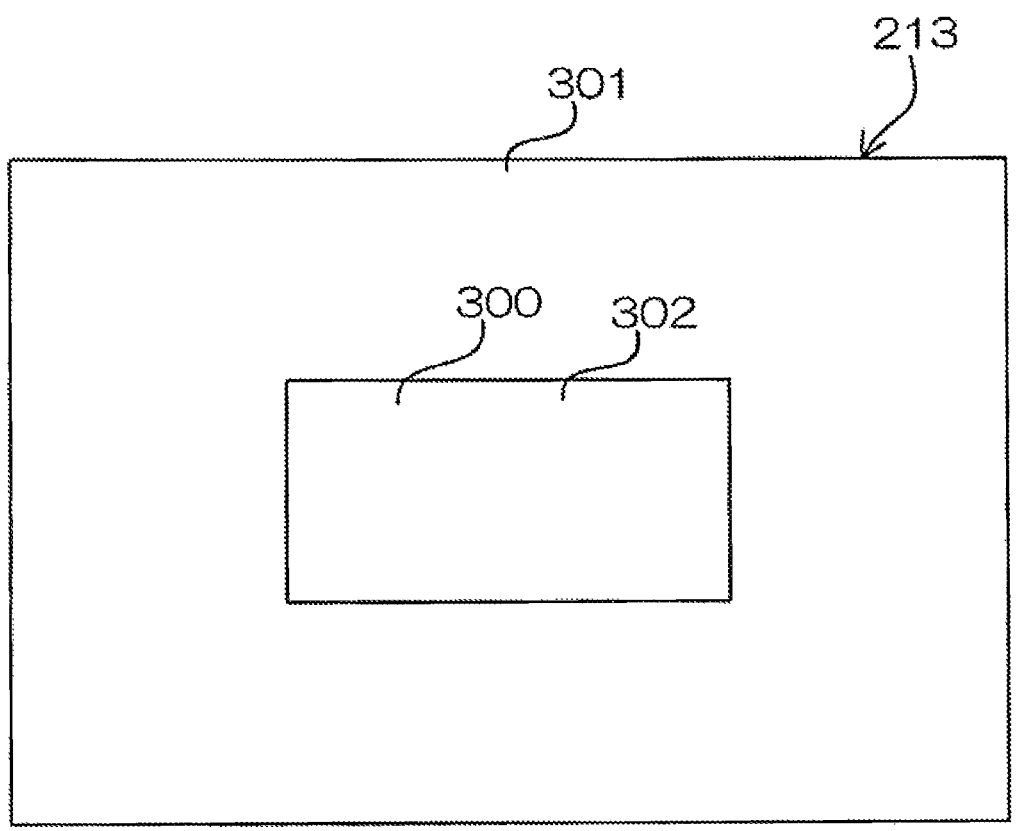
FIG. 9A is a face-on view illustrating an example of a region of a split-image according to the first exemplary embodiment.
Figure 9B:
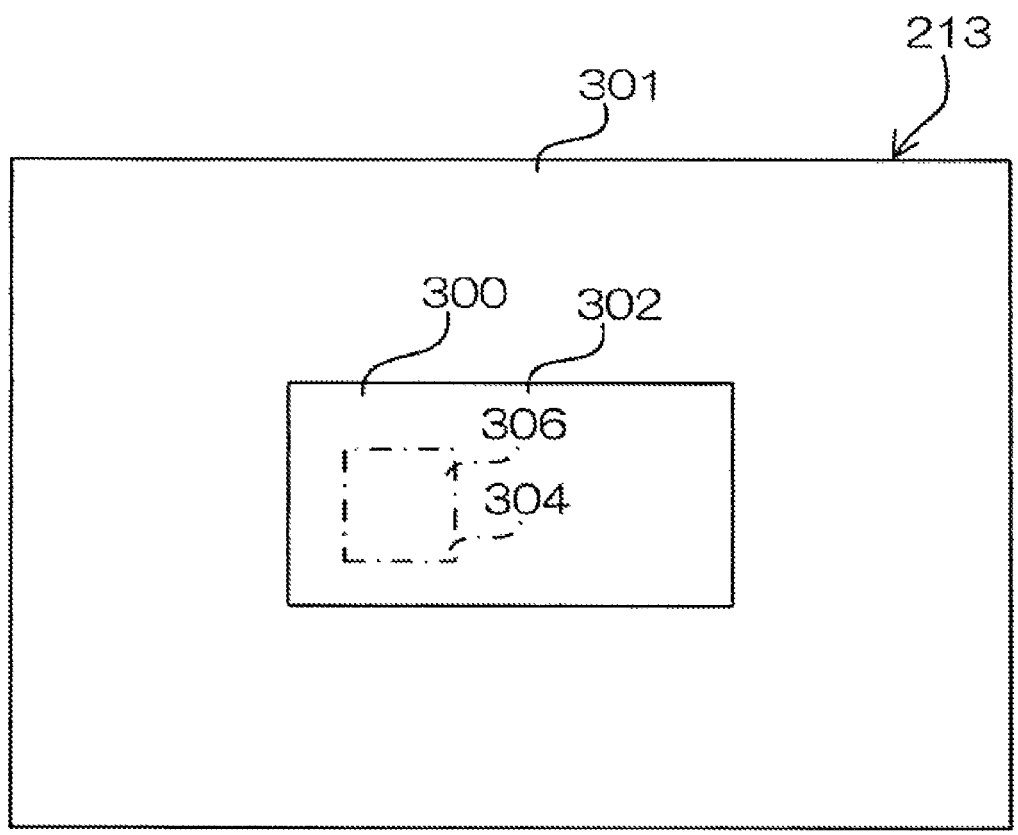
FIG. 9B is a face-on view illustrating an example of a split-image and a focus region during automatic focus control according to the first exemplary embodiment.

At the next step S417, the position of the focal region that is the region for performing automatic focus control is adjusted. In the imaging device 100 according to the present exemplary embodiment, the region corresponding to the main subject-image, namely the extracted subject-image region 304, is employed as a focus region 306. When this is performed, as illustrated in FIG. 9B, since the subject-image region 304 is a region extracted from within the split-image 300, the focus region overlaps with the display region of the split-image 300. However, the position of the focus region 306 may be adjusted such that at least a portion of the focus region 306 overlaps with at least a portion of the display region of the split-image 300 (for example, such that the proportion of overlapping surface area is a predetermined threshold value or greater). The threshold value in the present exemplary embodiment is 50%. Namely, adjustment may be made such that the surface area overlapping with the split-image 300 is half of the overall surface area of the focus region 306 or greater.

Figure 9C:
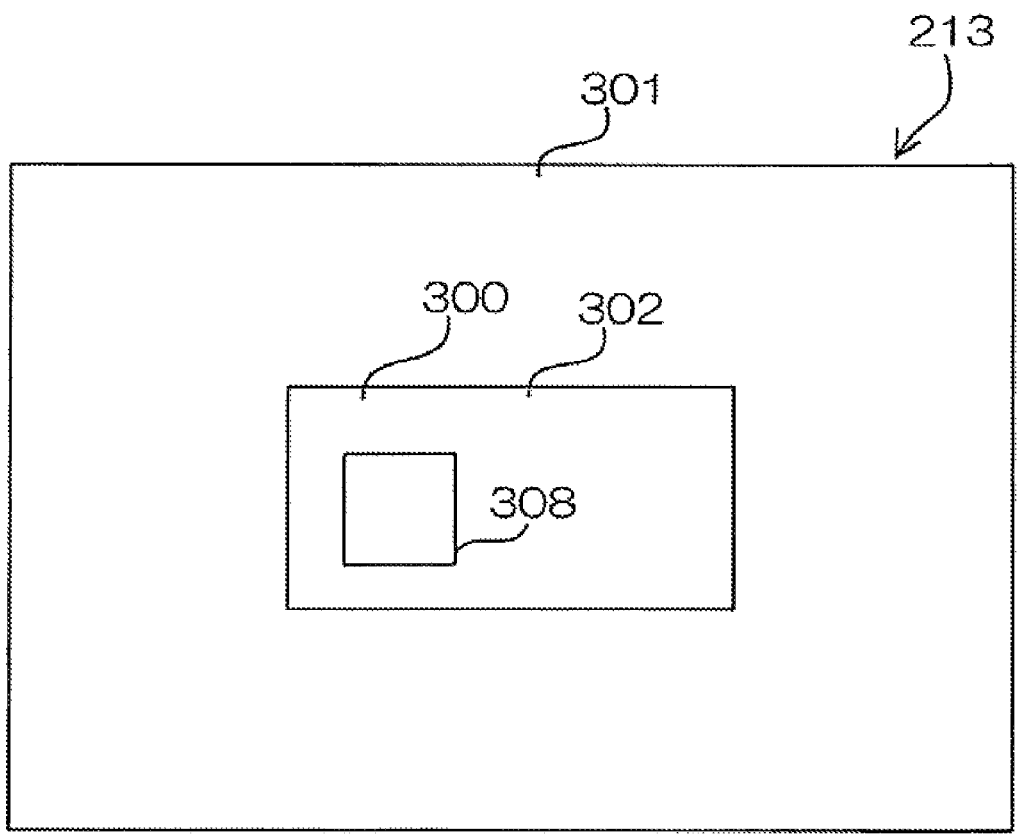
FIG. 9C is a face-on view illustrating an example of a split-image and a focus region during automatic focus control according to the first exemplary embodiment.

At the next step S421, the normal image 301 and the split-image 300 are superimposed on each other, and control is performed to display data representing the range of the focus region on the display section 213. In the present exemplary embodiment, as illustrated in FIG. 9C, the CPU 12 displays an outer frame image 308 representing the outer frame of the focus region 306. In cases in which the processing of steps S413 to S423 has already been performed, and the focus region 306 is being displayed, re-display of the focus region 306 is performed at the position adjusted at step S417. The data representing the range of the focus region 306 may have a display color inside the focus region 306 of a predetermined tint, or may be displayed inside the focus region 306 in half-tone, mesh, or the like.

At the next step S423, automatic focus control is performed in the adjusted focus region. When this is performed, the CPU 12 activates the phase difference detection section and the automatic focus section as described above, and performs automatic focus control using the subject image in the focus region 306 by moving the focal point of the imaging lenses 16 to the in-focus position.

At step S425, determination is made as to whether or not there is movement instruction data representing an instruction, by operational input using the operation section 14, to move the focus region 306. The movement instruction data is data including data representing the movement destination of the focus region 306, and is, for example, data indicating a movement direction and a movement amount. In the movement instruction data according to the present exemplary embodiment, the movement direction is, for example, input using the cross-key 222, and the movement amount is, for example, input by the number of times the cross-key 222 is operated.

Processing transitions to step S427 when negative determination is made at step S425, and then processing transitions to step S435 after performing processing corresponding to an operational input.

Processing transitions to step S429 when affirmative determination has been made at step S425.

At step S429, determination is made as to whether or not the movement destination of the focus region 306 specified by the movement instruction data is within a permissible range where setting of the focus region 306 is permitted. The permissible range according to the present exemplary embodiment is the display region of the split-image 300. This is in consideration that it is a user who employs the split-image 300 to perform focal point adjustment, and placing the focus region 306 for performing automatic focus control in the display region of the split-image 300 enables the user to be more efficiently assisted in focal point adjustment.

Figure 9D:
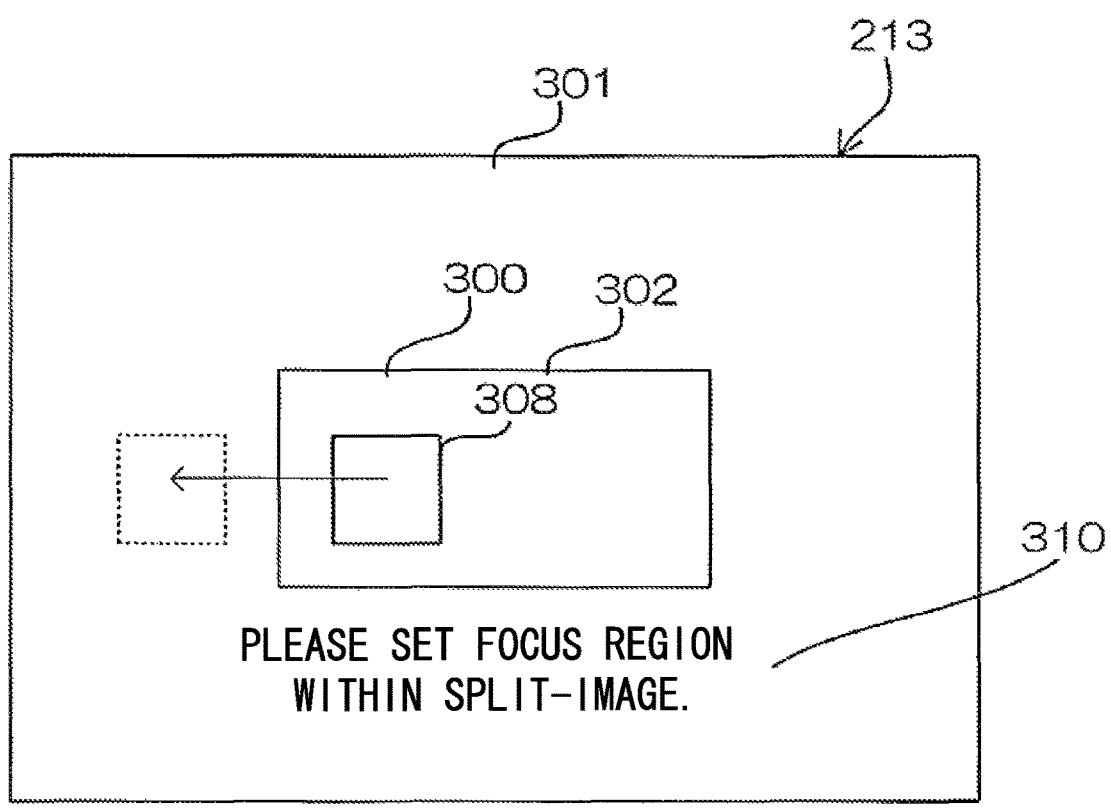
FIG. 9D is a face-on view illustrating an example of a split-image and a focus region during automatic focus control according to the first exemplary embodiment.
Figure 9E:
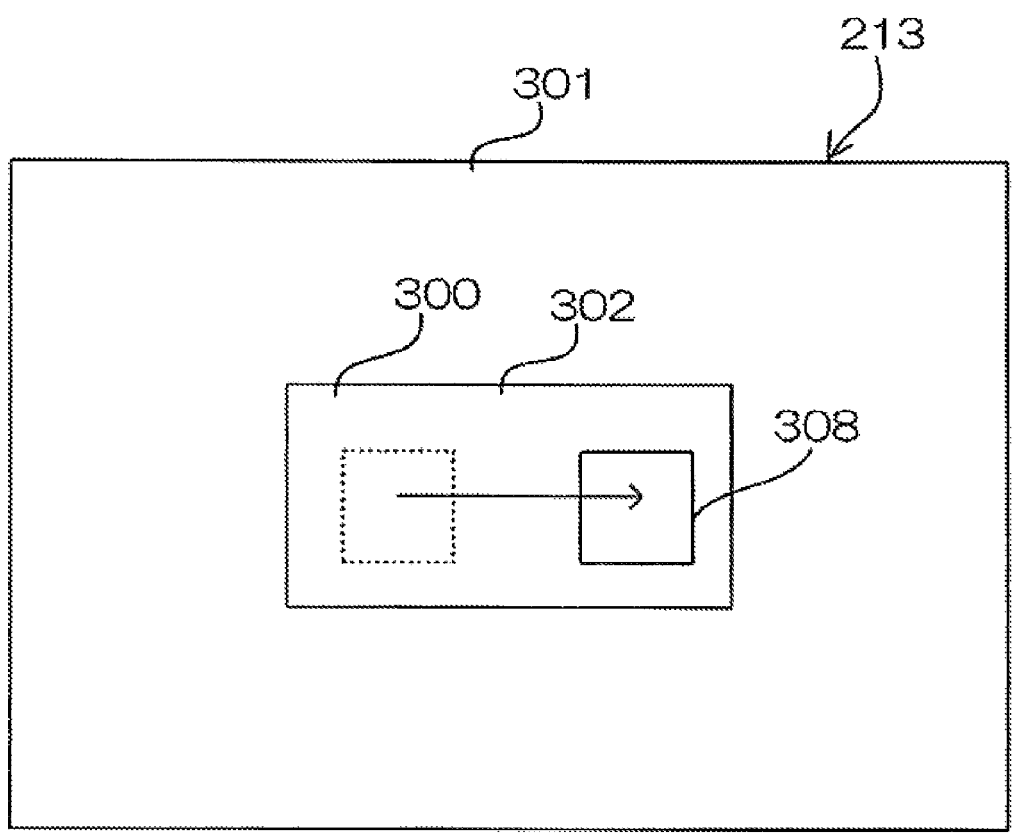
FIG. 9E is a face-on view illustrating an example of a split-image and a focus region during automatic focus control according to the first exemplary embodiment.

Processing transitions to step S431 when negative determination has been made at step S429, the user is notified with a warning that the movement destination is outside the permissible range, and processing transitions to step S413. In the imaging device 100 according to the present exemplary embodiment, as illustrated in the example of FIG. 9D, the user is notified with a warning by displaying information 310 representing the warning on the display section 213, however the notification method is not limited thereto, and, for example, the warning may be delivered audibly.

Figure 9F:
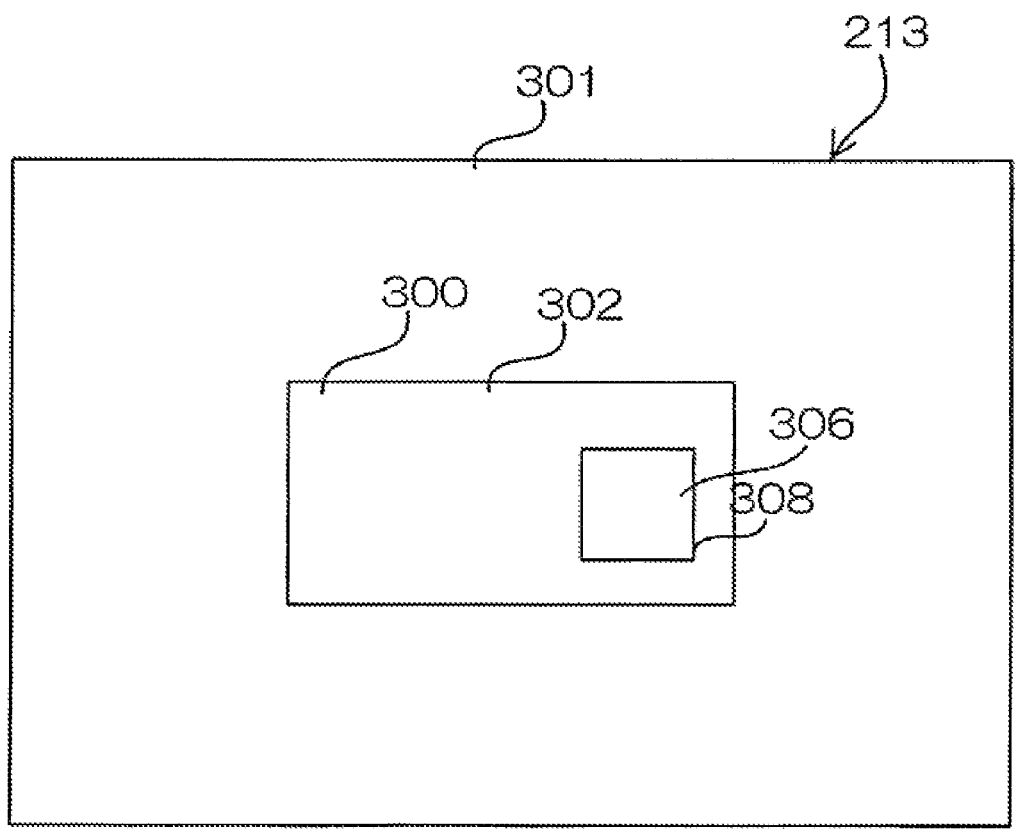
FIG. 9F is a face-on view illustrating an example of a split-image and a focus region during automatic focus control according to the first exemplary embodiment.

Processing transitions to step S433 when affirmative determination has been made at step S429, and the focus region 306 is moved and re-displayed. As illustrated in the example in FIG. 9E, the CPU 12 moves the focus region 306 to the position specified by the user, and as illustrated in FIG. 9F, re-displays the outer frame image 308 representing the outer frame of the moved focus region 306.

At the next step S435, determination is made as to whether or not an image capture instruction has been input. When this is performed, the CPU 12 determines that an image capture instruction has been input when fully pressed operation of the release switch 211 is detected. Processing returns to step S401 when negative determination has been made at step S435, and processing transitions to step S437 when affirmative determination has been made.

At step S437, image capture processing is performed that records the image data representing the normal image 301 in the memory 26, and the present image capture control processing program is ended. The image capture processing referred to above is generally performed processing and so explanation thereof will be omitted.

In the imaging device 100 according to the present exemplary embodiment, the movement instruction data is data including data indicating the movement direction and the movement amount, however the data included in the movement instruction data is not limited thereto. For example, in place of data including data indicating the movement direction and the movement amount, the movement instruction data may include data indicating the position of the movement destination in the normal image 301 (position in the display region). In such cases, at step S429, in cases in which the focus region 306 has been moved to a position specified by the movement instruction data, determination is made as to whether or not the position of the focus region 306 is within the permissible range where setting of the focus region 306 is permitted.

Moreover, when the split-image 300 is employed in manual focus mode, sometimes automatic focus control is performed at plural focus regions 306 (in what is referred to as multi-point autofocus control). In such cases, only focus regions 306 that overlap with the display region of the split-image 300 are considered to be valid focus regions 306, and automatic focus control is only performed on the valid focus regions 306. In such cases, any focus regions 306 having a surface area of a region overlapping with the split-image 300 that is half the total surface area, or less, may be considered to be an invalid focus regions 306.

Second Exemplary Embodiment

Detailed explanation follows of an imaging device 100 according to a second exemplary embodiment, with reference to the appended drawings.

Whereas in the first exemplary embodiment, the subject-image region 304 is made the focus region 306, in the second exemplary embodiment, a predetermined region is made the focus region 306.

Configuration of the imaging device 100 according to the second exemplary embodiment is similar to that of the imaging device 100 according to the first exemplary embodiment, and so explanation is omitted thereof. However, data representing a display position of the focus region 306 is pre-stored in the memory 26 according to the present exemplary embodiment. In the present exemplary embodiment, the data representing the display position of the focus region 306 is that of a central portion of the display region of the display device.

Figure 10:
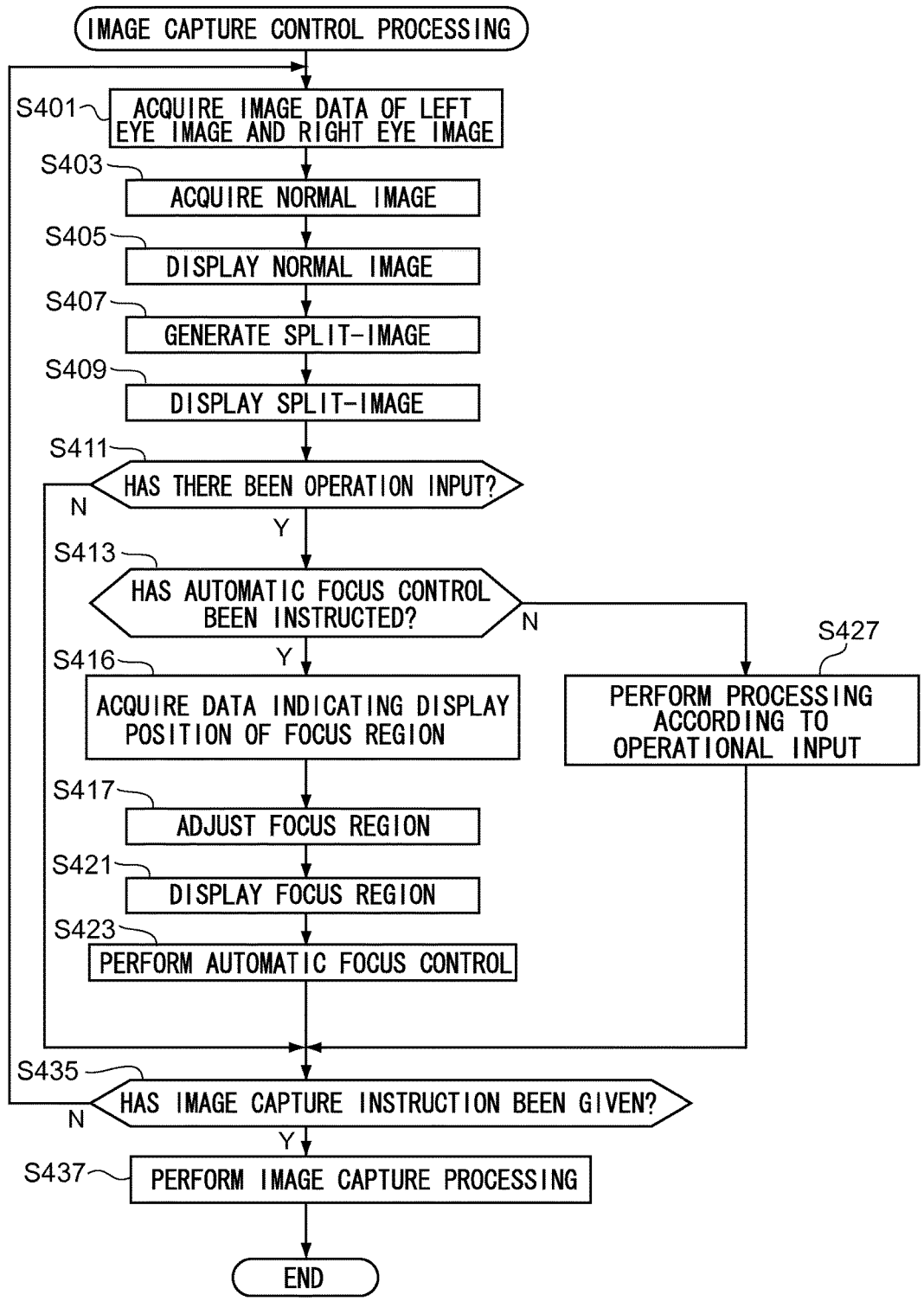
FIG. 10 is a flowchart illustrating a flow of processing in an image capture control processing program according to the second exemplary embodiment.

Explanation next follows regarding operation of the imaging device 100 during execution of image capture control processing according to the present exemplary embodiment, with reference to FIG. 10. FIG. 10 is a flowchart indicating a flow of processing performed at this time in an image capture control processing program executed by the CPU 12 of the imaging device 100. The program is pre-stored in a specific region of the memory 26.

Steps that are similar to those of the image capture control processing of the first exemplary embodiment are allocated the same step number, and duplicate explanation will be omitted thereof.

In the present exemplary embodiment, processing transitions to step S426 when negative determination has been made at step S413, and processing then transitions to S435 after processing corresponding to an operational input has been performed.

Processing transitions to step S416 after the processing of step S413 has been performed.

At step S416, data representing the display position of the focus region 306 is acquired by reading position data representing the display position of the focus region 306 from the memory 26.

Figure 11A:
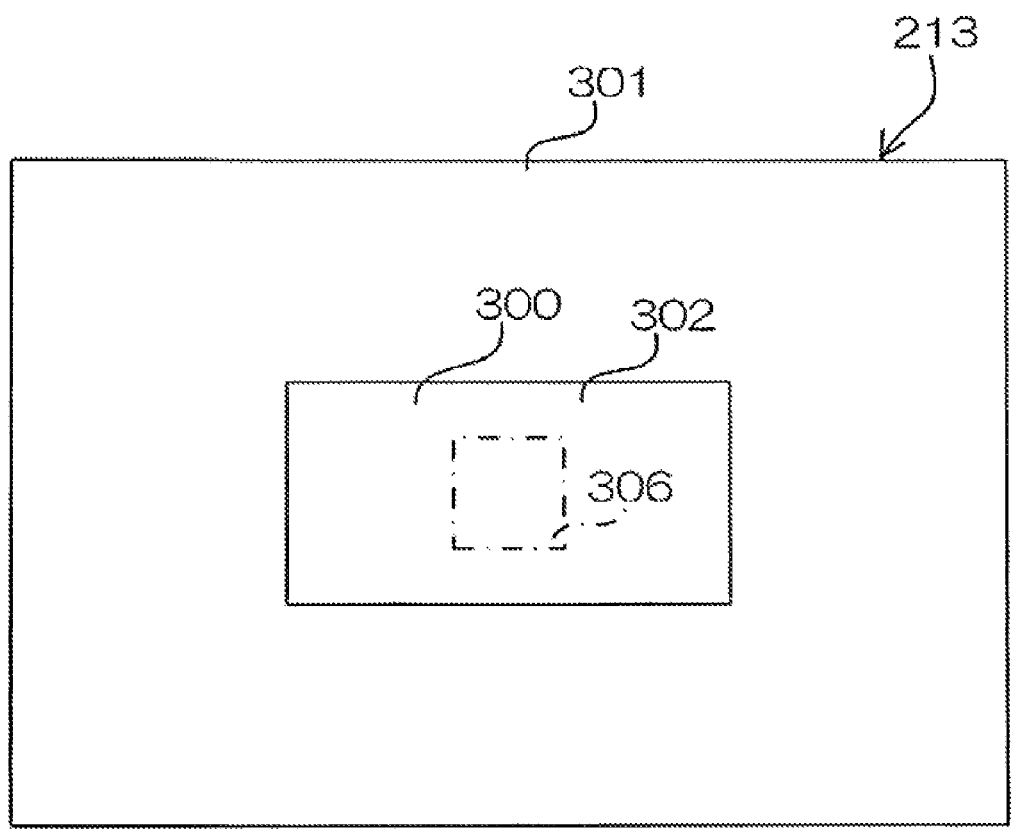
FIG. 11A is a face-on view illustrating an example of a split-image and a focus region during automatic focus control according to the second exemplary embodiment.
Figure 11B:
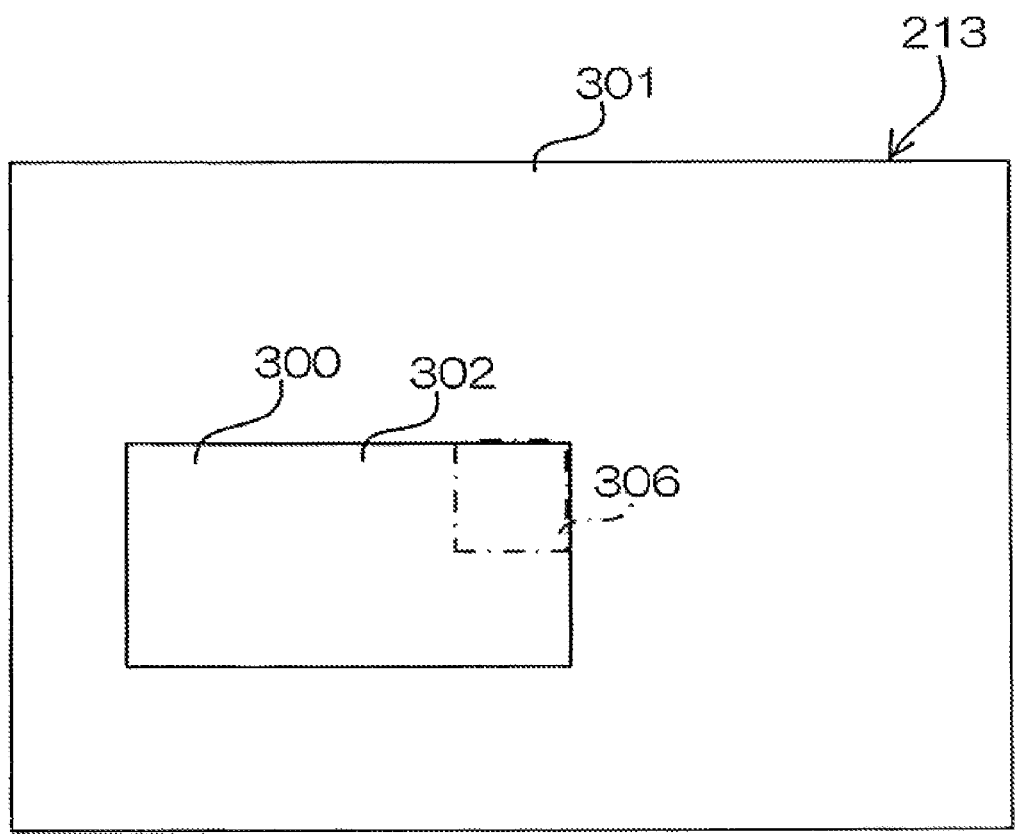
FIG. 11B is a face-on view illustrating an example of a split-image and a focus region during automatic focus control according to the second exemplary embodiment.
Figure 11C:
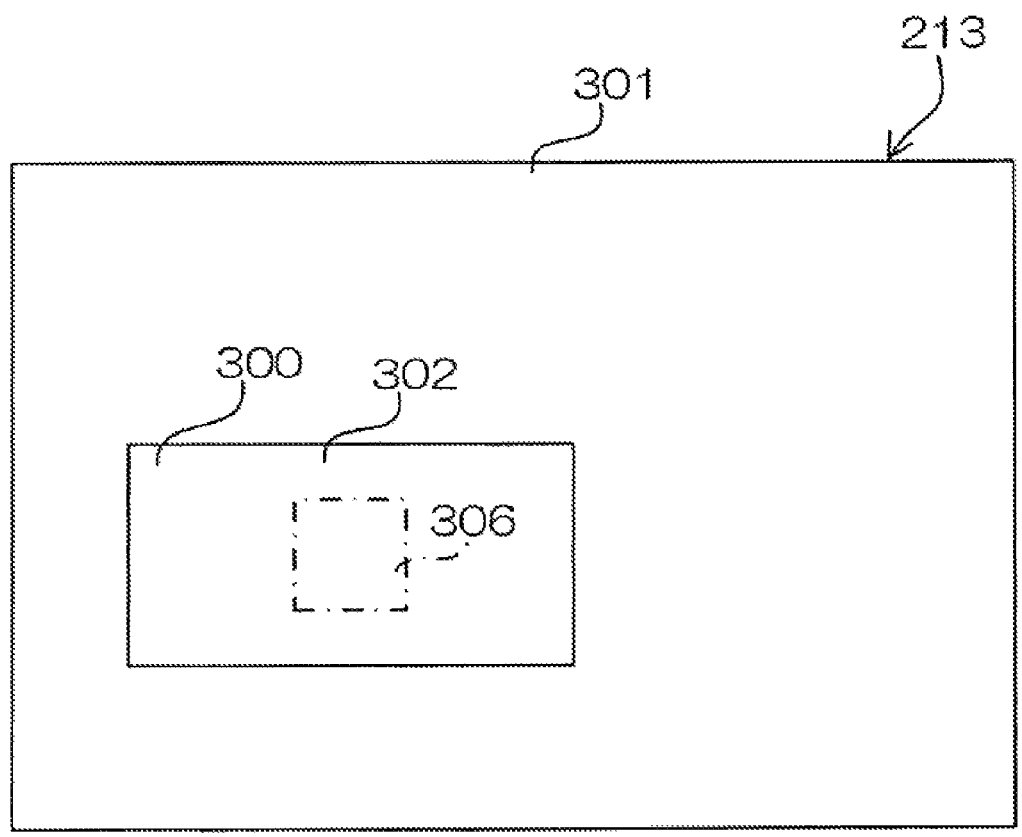
FIG. 11C is a face-on view illustrating an example of a split-image and a focus region during automatic focus control according to the second exemplary embodiment.

At the next step S417, the position of a focus region that is a region for performing automatic focus control is adjusted based on the above position data. In the imaging device 100 according to the present exemplary embodiment, as illustrated in the example of FIG. 11A, the focus region 306 is set as a region that is centered on the position represented by the above position data (the central portion of the display region of the display device), and that has a rectangular shape of a predetermined shape and size. When this is performed, in cases in which the display position of the split-image 300 is displaced from the central portion of the display region of the display device, as illustrated in the example of FIG. 11B, the focus region 306 may be set to a position within the split-image 300 that is closest to the central portion of the display region of the display device. The position represented by the above position data is not limited thereto, and, as illustrated in the example of FIG. 11C, the center portion of the split-image 300 may be aligned with the center of the focus region 306.

Third Exemplary Embodiment

Detailed explanation follows regarding an imaging device 100 according to a third exemplary embodiment, with reference to the appended drawings.

Whereas in the first exemplary embodiment the main subject-image is recognized within the split-image 300, in the third exemplary embodiment, the main subject-image is recognized within the normal image 301.

Note that the configuration of the imaging device 100 according to the third exemplary embodiment is similar to that of the imaging device 100 according to the first exemplary embodiment and the second exemplary embodiment, and so explanation will be omitted thereof.

Figure 12:
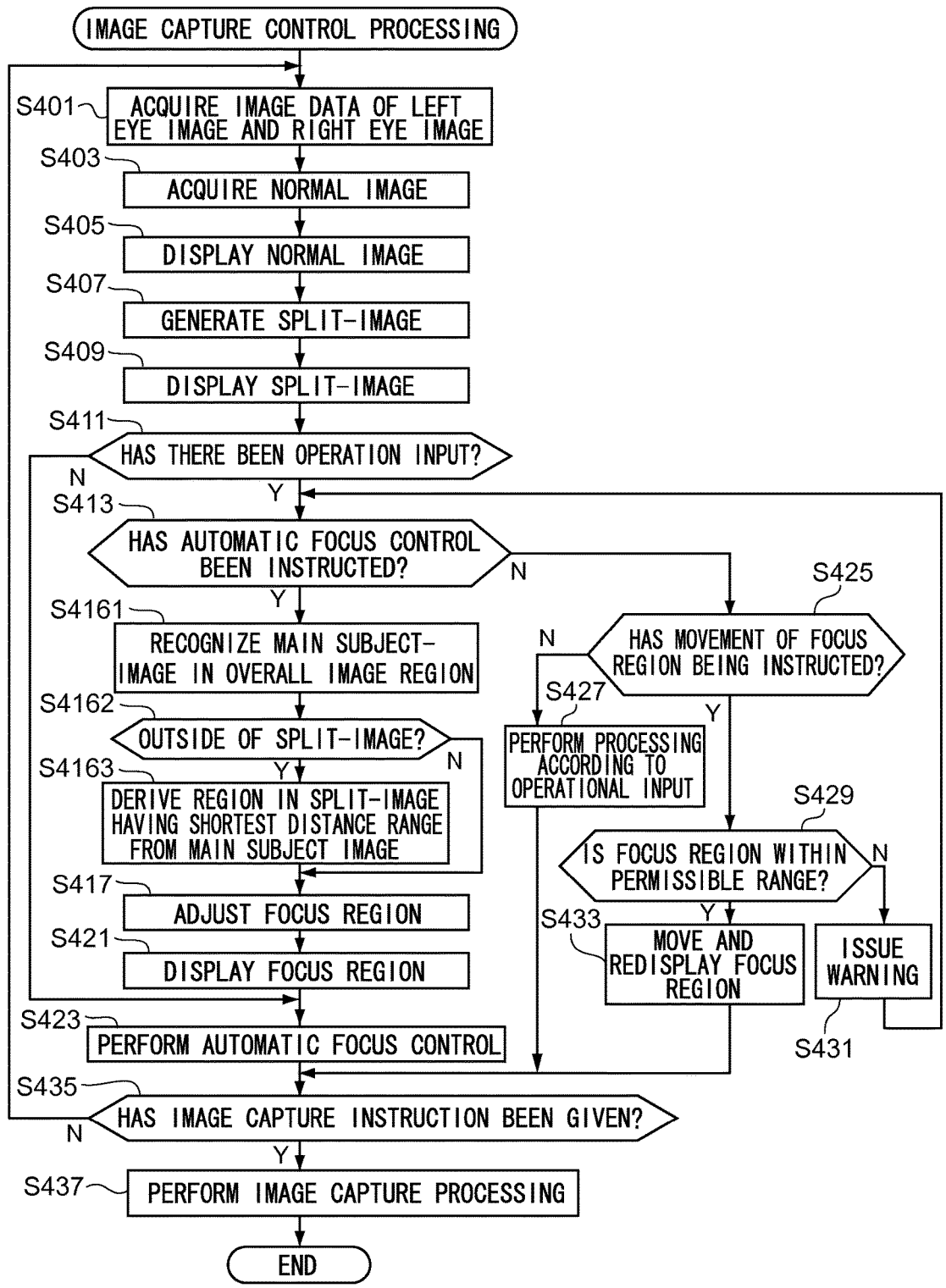
FIG. 12 is a flowchart illustrating a flow of processing of an image capture control processing program according to the third exemplary embodiment.

Explanation next follows regarding operation of the imaging device 100 during execution of image capture control processing according to the present exemplary embodiment, with reference to FIG. 12. FIG. 12 is a flowchart illustrating a flow of processing of an image capture control processing program executed at this time by the CPU 12 of the imaging device 100. This program is pre-stored in a specific recording region of the memory 26.

Steps similar to those of the image capture control processing of the first exemplary embodiment and the second exemplary embodiment are allocated the same step numbers, and duplicate explanation will be omitted thereof.

In the present exemplary embodiment, processing transitions to step S4161 when affirmative determination has been made at step S413.

At step S4161, the main subject-image present within the display region of the normal image 301 is recognized. The method of recognizing the main subject-image is similar to that of step S415 of the first exemplary embodiment, and so explanation will be omitted thereof.

At the next step S4162, determination is made as to whether or not a subject-image region 304 corresponding to the main subject-image is positioned outside of the split-image 300. Note that in the present exemplary embodiment, the CPU 12 determines positioning as being outside of the split-image 300 in cases in which the proportion of surface area of a region of the subject-image region 304 overlapping with the display region of the split-image 300 is smaller than a predetermined third threshold value.

Processing transitions to step S4163 when affirmative determination has been made at step S4162, and processing transitions to step S417 when negative determination has been made at step S4161.

At step S4163, a rectangular shaped region in the split-image 300 is derived having the shortest distance from the subject-image region 304 and having a predetermined shape and size, then processing transitions to step S417.

Figure 13A:
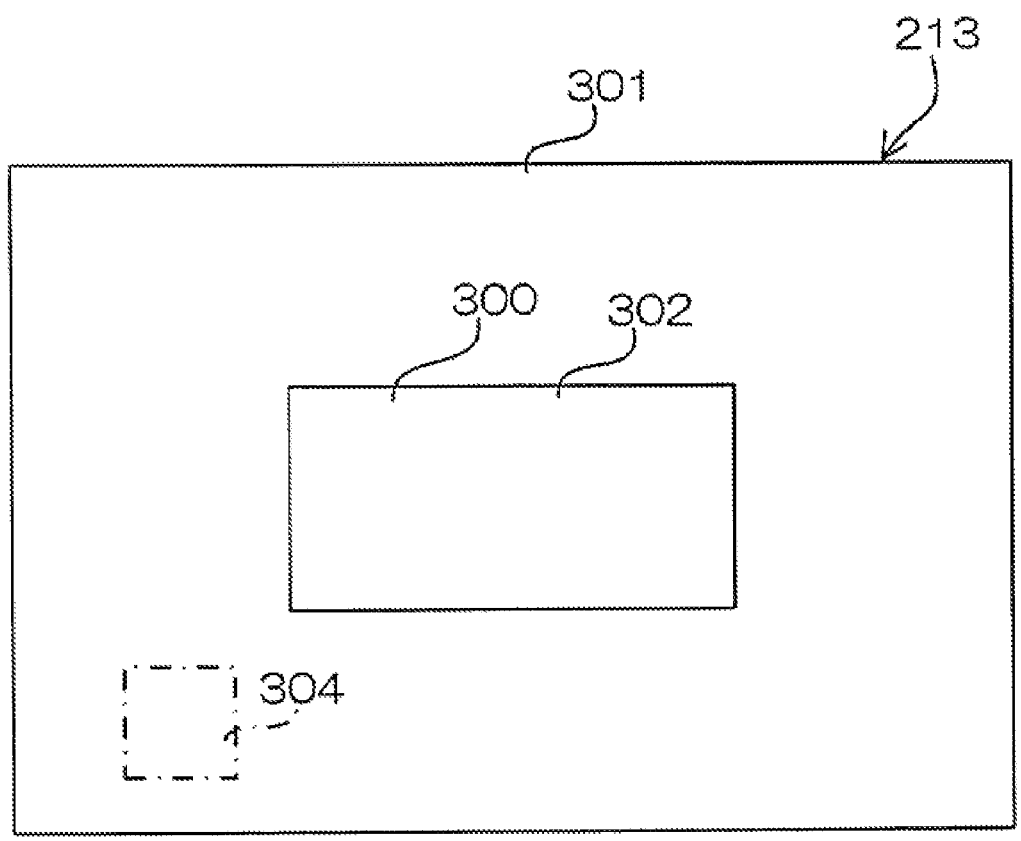
FIG. 13A is a face-on view illustrating an example of a focus region during automatic focus control according to the third exemplary embodiment.
Figure 13B:
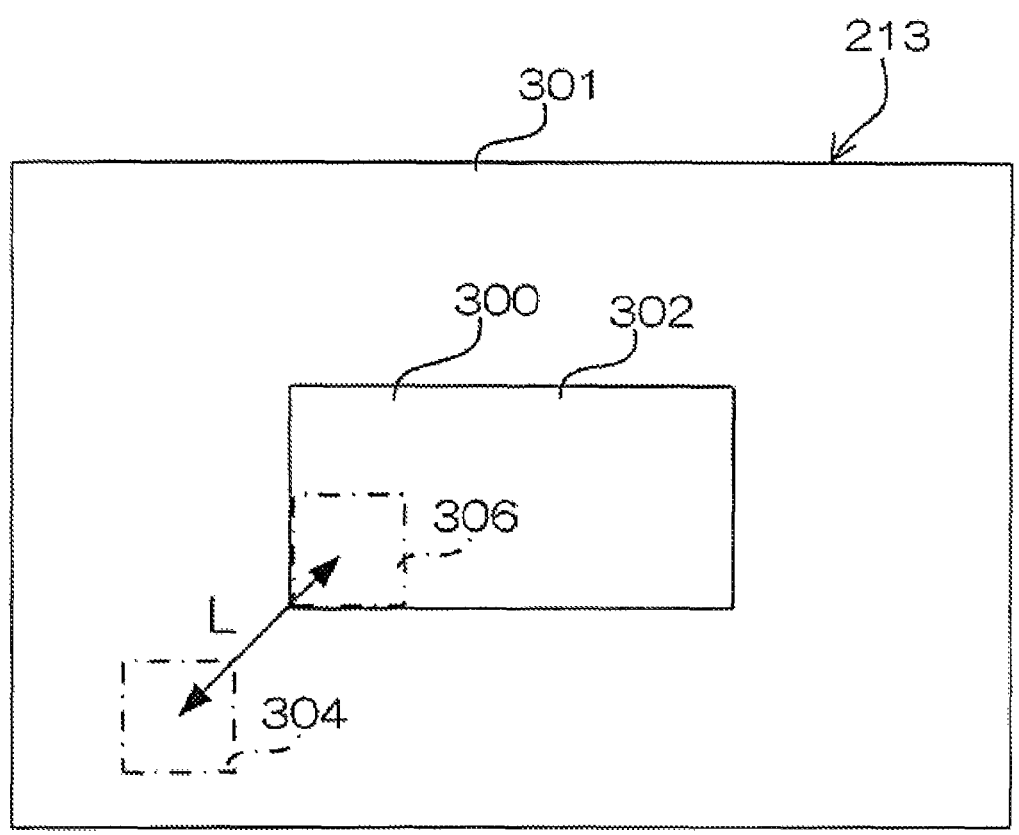
FIG. 13B is a face-on view illustrating an example of a split-image and a focus region during automatic focus control according to the third exemplary embodiment.

At step S417, the position of the focus region 306 is adjusted. In the imaging device 100 according to the present exemplary embodiment consider a case, as illustrated in the example of FIG. 13A, in which the subject-image region 304 is positioned outside the split-image 300. In such cases, as illustrated in the example in FIG. 13B, the region in the split-image 300 that has the shortest distance to the subject-image region 304, derived by the processing of step S4163, is made the focus region 306. In the imaging device 100 according to the present exemplary embodiment, the extracted subject-image region 304 is made a focus region 306 when the subject-image region 304 is positioned within the split-image 300.

Fourth Exemplary Embodiment

Detailed explanation follows regarding operation of an imaging device 100 according to a fourth exemplary embodiment, with reference to the appended drawings.

In the third exemplary embodiment, the focus region 306 is set within the split-image 300 in cases in which the subject-image region 304 was positioned outside the split-image 300. In the fourth exemplary embodiment, the subject-image region 304 is made the focus region 306 in cases in which the subject-image region 304 was positioned outside the split-image 300, and display of the split-image 300 is halted.

Configuration of the imaging device 100 according to the fourth exemplary embodiment is similar to the configuration of the imaging device 100 according to the first exemplary embodiment to the third exemplary embodiment, and so explanation will be omitted thereof.

Figure 14:
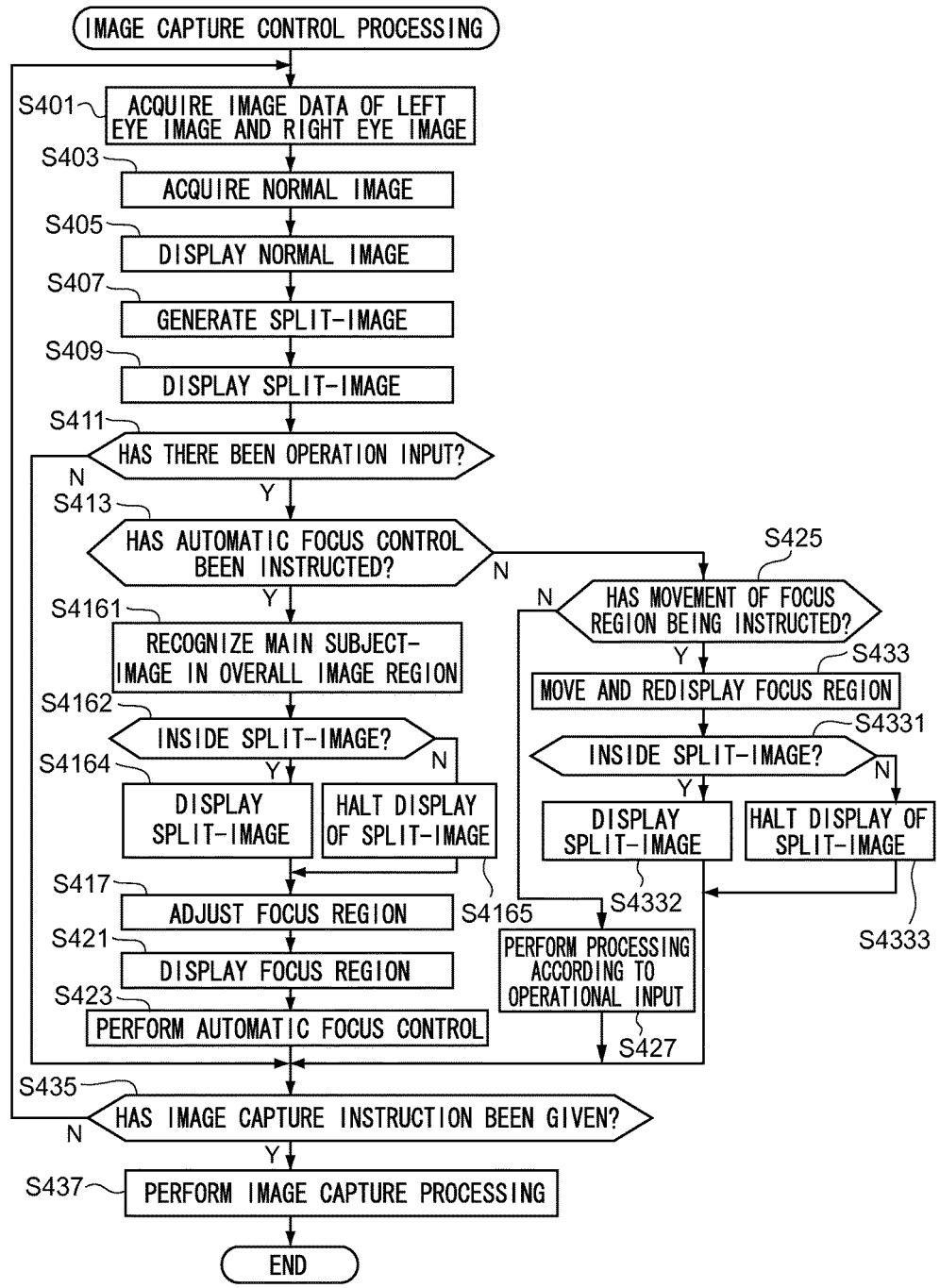
FIG. 14 is a flowchart illustrating a flow of processing of an image capture control processing program according to the fourth exemplary embodiment.

Explanation next follows regarding operation of the imaging device 100 during execution of image capture control processing according to the present exemplary embodiment, with reference to FIG. 14. FIG. 14 is a flowchart illustrating a flow of processing of an image capture control processing program executed at this time by the CPU 12 of the imaging device 100. This program is pre-stored in a specific recording region of the memory 26.

Steps similar to those of the image capture control processing of the first exemplary embodiment to the third exemplary embodiment are allocated the same step numbers, and duplicate explanation will be omitted thereof.

In the present exemplary embodiment, processing transitions to step S4164 in cases in which affirmative determination has been made at step S4162, and processing transitions to step S4165 in cases in which negative determination has been made at step S4162.

At step S4164, control is performed to display the split-image 300 on the display section 213, superimposed on the normal image 301, then processing transitions to step S417. In cases in which the split-image 300 is already being displayed at this point in time, the CPU 12 continues to display the split-image 300.

At step S4165, control is performed to halt display of the split-image 300 on the display section 213, then processing transitions to step S417. In cases in which display of the split-image 300 is already halted at this point in time, the CPU 12 continues to halt display of the split-image 300.

Figure 15A:
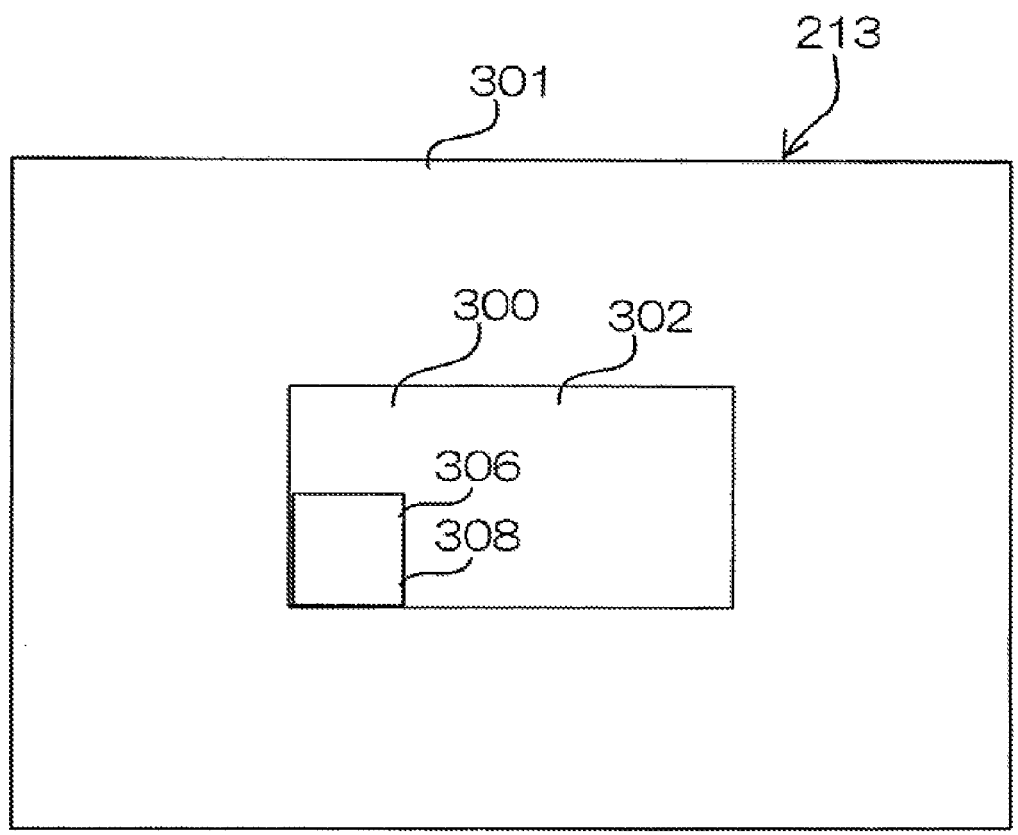
FIG. 15A is a face-on view illustrating an example of a split-image and a focus region during automatic focus control according to the fourth exemplary embodiment.
Figure 15B:
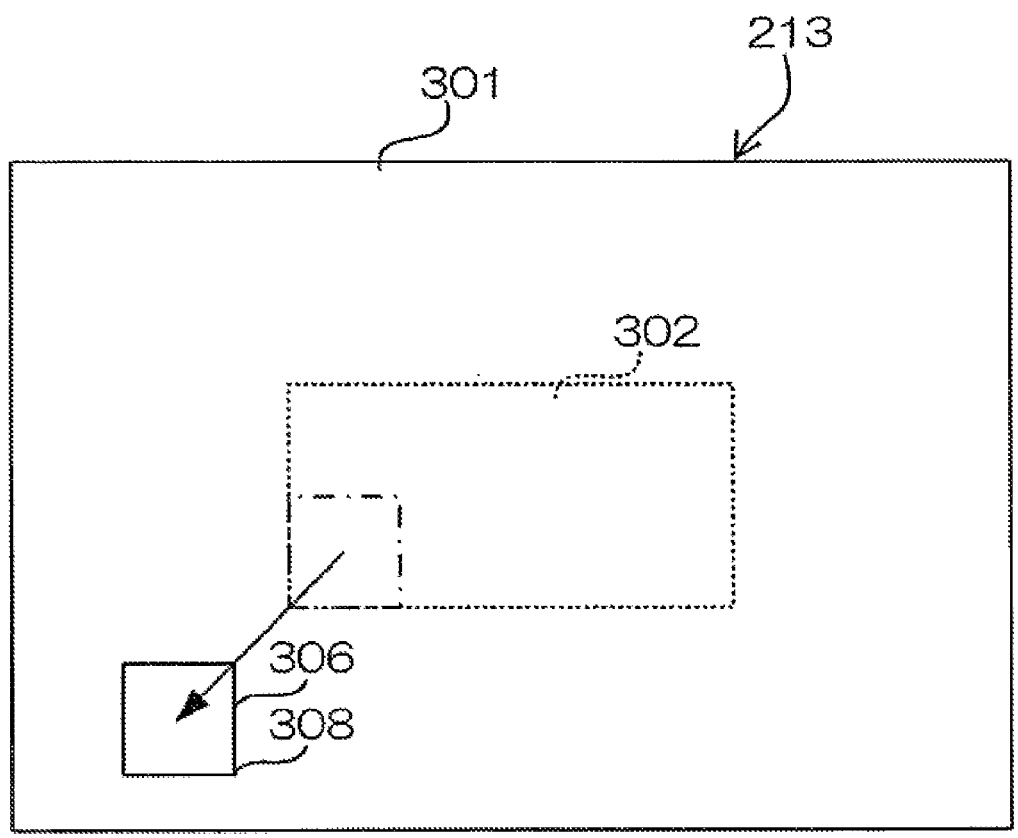
FIG. 15B is a face-on view illustrating an example of a split-image and a focus region during automatic focus control according to the fourth exemplary embodiment.

At step S417, the position of the focus region 306 is adjusted. In the imaging device 100 according to the present exemplary embodiment, in cases in which the subject-image region 304 is positioned within the split-image 300, the CPU 12 displays the split-image 300, as illustrated in the example of FIG. 15A. In cases in which the subject-image region 304 is positioned outside the split-image 300, the CPU 12 halts display of the split-image 300, as illustrated in the example of FIG. 15B.

Figure 15C:
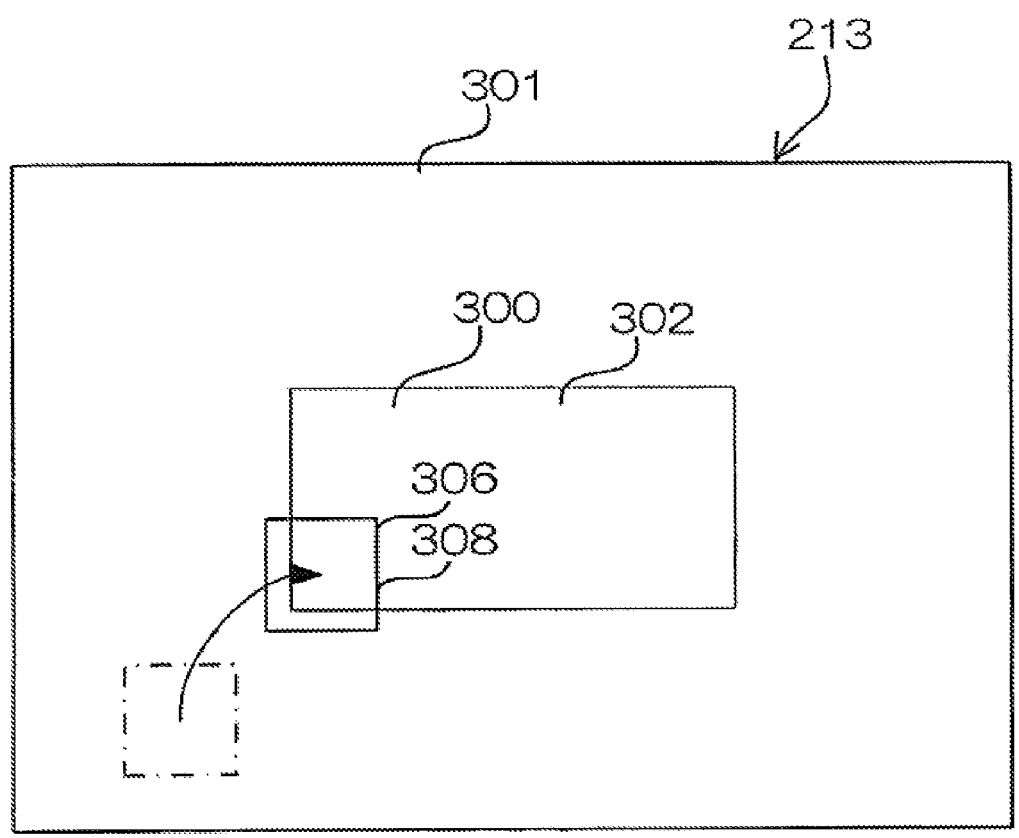
FIG. 15C is a face-on view illustrating an example of a split-image and a focus region during automatic focus control according to the fourth exemplary embodiment.

After performing the processing of step S433, processing transitions to step S4331, processing is performed at steps S4331 to S4333 similar to that of the above steps S4162, S4164, and S4165, and then processing transitions to step S435. As illustrated in the example of FIG. 15B, in a state in which display of the split-image 300 is halted, the subject-image region 304 is moved to within the split-image 300. In such cases, the CPU 12 re-displays the split-image 300 as illustrated in the example of FIG. 15C.

Fifth Exemplary Embodiment

Detailed explanation follows regarding the imaging device 100 according to a fifth exemplary embodiment, with reference to the appended drawings.

Whereas in the first exemplary embodiment control was performed to move the focus region 306 based on input operation by a user, in the fifth exemplary embodiment, control is performed to expand the split-image 300 based on input operation by a user.

Configuration of the imaging device 100 according to the fifth exemplary embodiment is similar to the configuration of the imaging device 100 according to the first exemplary embodiment to the fourth exemplary embodiment, and so explanation will be omitted thereof. However, upper limit data representing an upper limit value to the size of the focus region 306 is pre-stored in the memory 26 according to the present exemplary embodiment.

Figure 16:
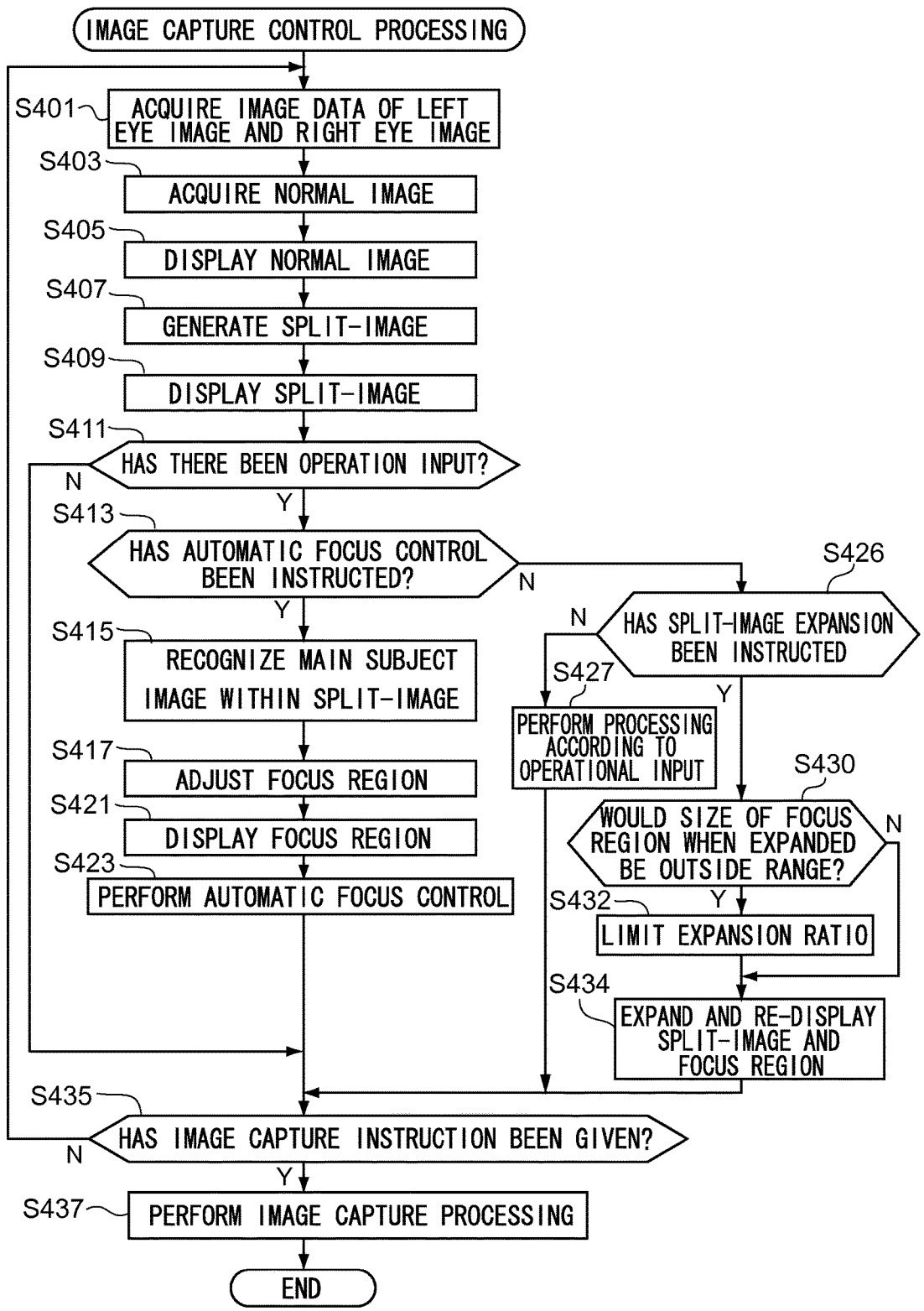
FIG. 16 is a flowchart illustrating a flow of processing of an image capture control processing program according to the fifth exemplary embodiment.

Explanation next follows regarding operation of the imaging device 100 during execution of image capture control processing according to the present exemplary embodiment, with reference to FIG. 16. FIG. 16 is a flowchart illustrating a flow of processing of an image capture control processing program executed at this time by the CPU 12 the imaging device 100. This program is pre-stored in a specific recording region of the memory 26.

Steps similar to those of the image capture control processing of the first exemplary embodiment to the fourth exemplary embodiment are allocated the same step numbers, and duplicate explanation will be omitted thereof.

In the present exemplary embodiment, processing transitions to step S415 when affirmative determination has been made at step S413, and processing transitions to step S426 when negative determination has been made at step S413.

At step S426, determination is made as to whether or not there has been an operational input, using the operation section 14, instructing expansion of the split-image 300. In the present exemplary embodiment, determination is made that there has been an operational input using the operation section 14 instructing expansion of the split-image 300 in cases in which expansion data including data representing the expansion ratio has been input using the operation section 14. Processing transitions to step S427 when negative determination has been made at step S426, and processing transitions to step S430 when affirmative determination has been made at step S426.

At step S430, determination is made as to whether or not the size of the focus region 306, as expanded according to an expansion when the split-image 300 is expanded based on the above instructed data, would be within a predetermined range. In the present exemplary embodiment, the predetermined range is a range in which the size of the focus region 306 is the upper limit value represented by the upper limit data, or smaller.

Processing transitions to step S432 in cases in which affirmative determination has been made at step S430, and processing transitions to step S434, described below when negative determination has been made at step S430.

At step S432, processing transitions to step S434 after limiting the expansion ratio for when expanding the focus region 306. In the imaging device 100 according to the present exemplary embodiment, the CPU 12 makes the expansion ratio for when expanding the focus region 306 an expansion ratio such that the size of the focus region 306 after expansion is the upper limit value.

Figure 17A:
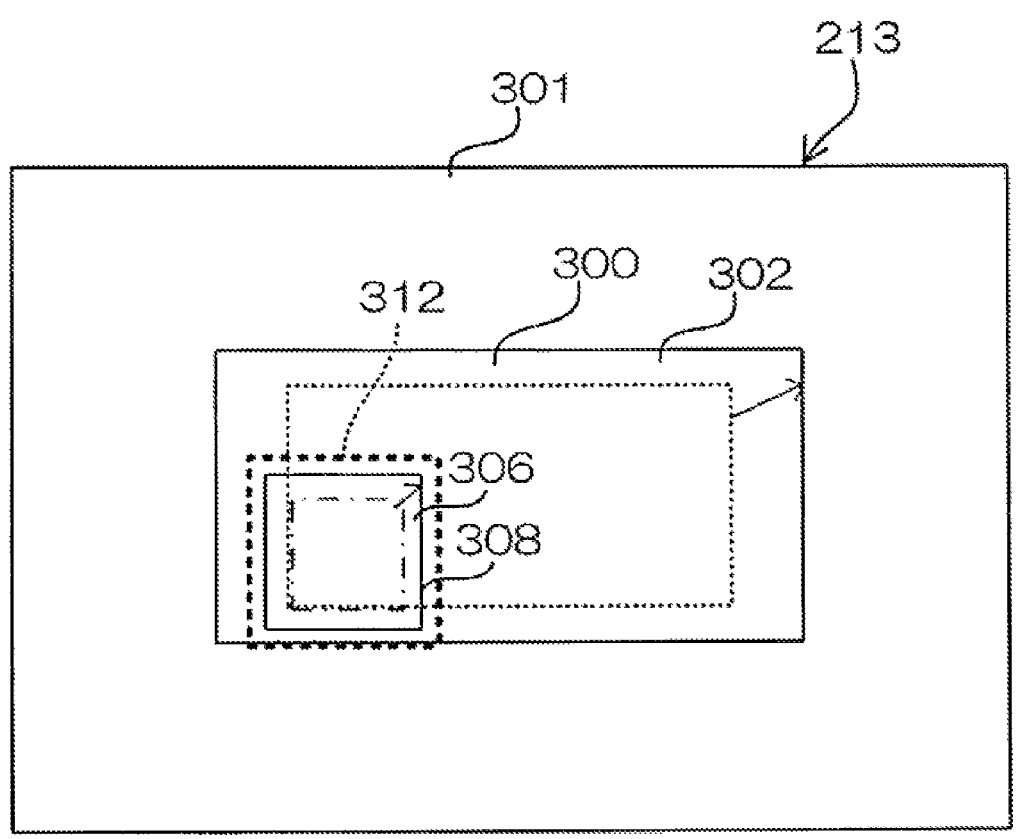
FIG. 17A is a face-on view illustrating an example of a split-image and a focus region during automatic focus control according to the fifth exemplary embodiment.
Figure 17B:
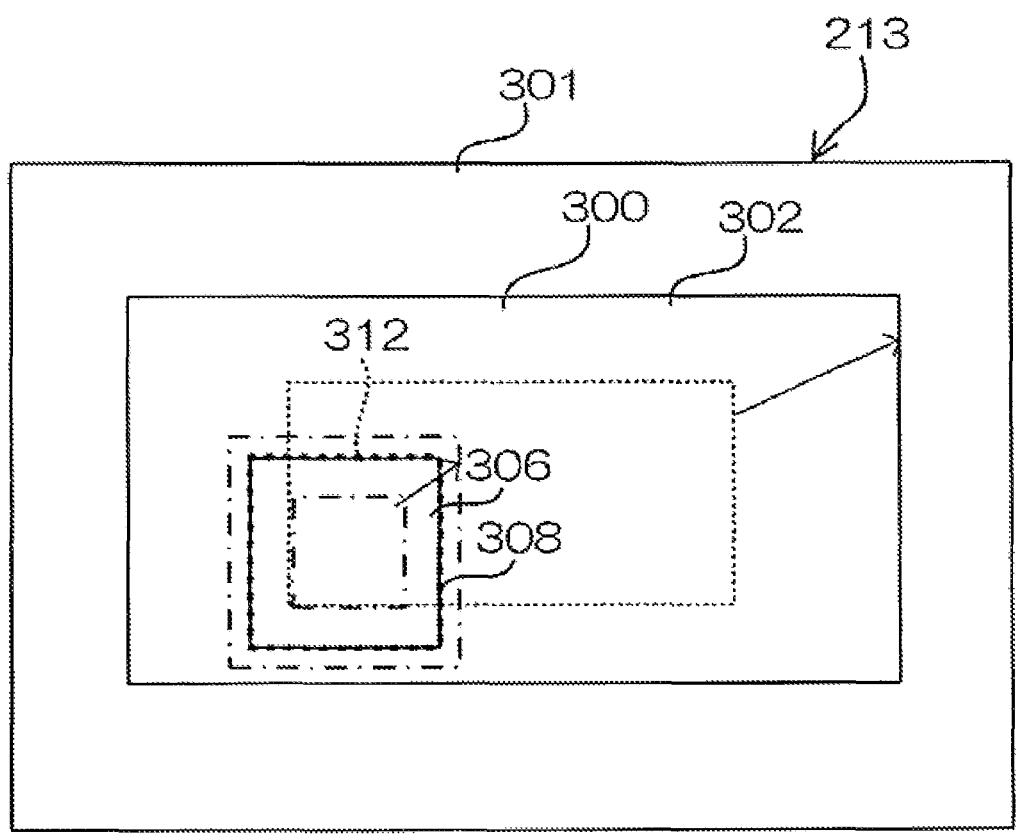
FIG. 17B is a face-on view illustrating an example of a split-image and a focus region during automatic focus control according to the fifth exemplary embodiment.

At step S434, control is performed to expand and display the split-image 300 and the focus region 306 on the display section 213. When this is performed, as illustrated in the example of FIG. 17A, the CPU 12 expands the focus region 306 with an expansion ratio corresponding to the expansion ratio of the split-image 300 in cases in which the size of the expanded focus region 306 will be within the predetermined range. However, in cases in which the size of the expanded focus region 306 will be outside of the predetermined range, the focus region 306 is expanded by the limited expansion ratio, as illustrated in the example of FIG. 17B.

Figure 18:
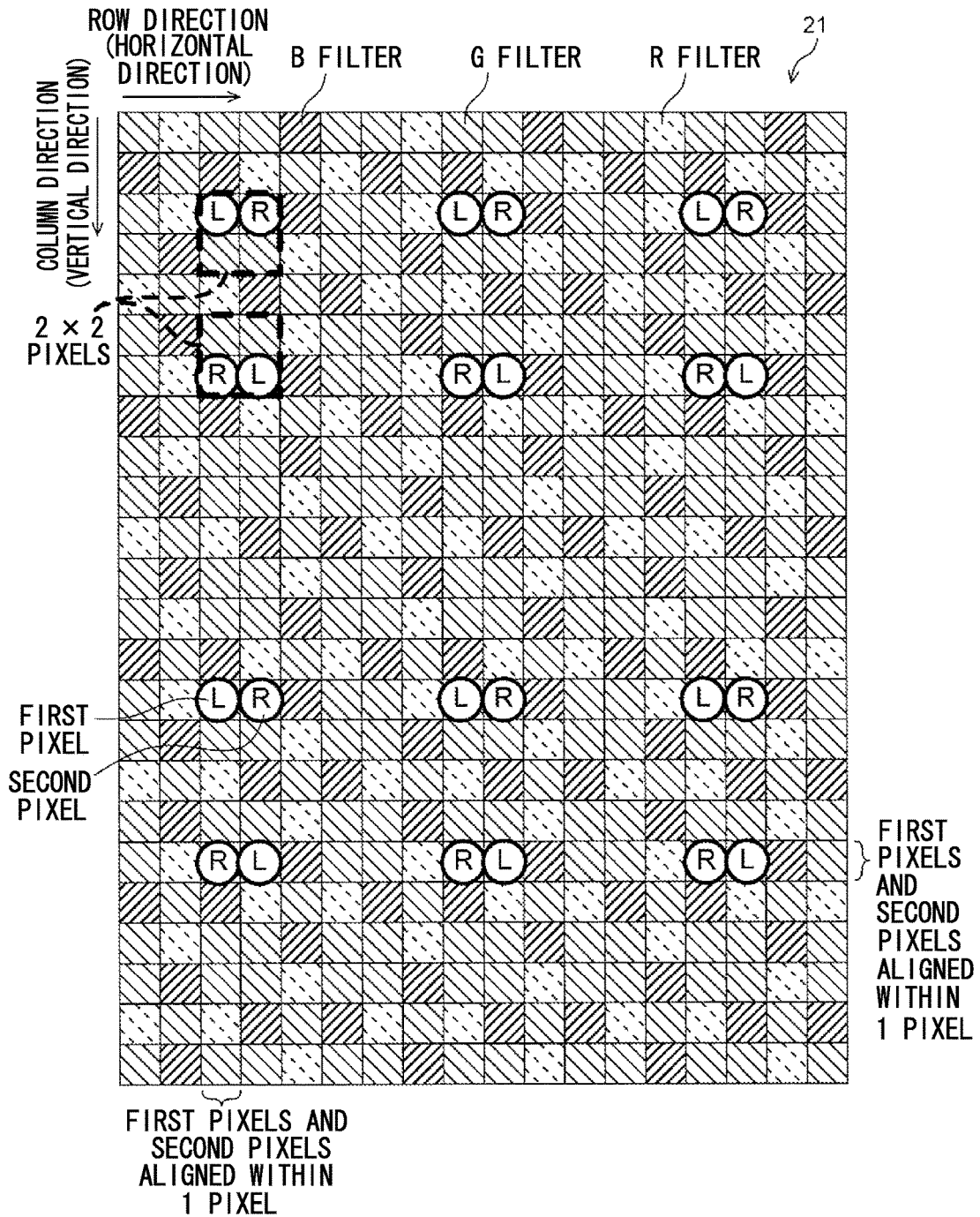
FIG. 18 is a schematic layout diagram illustrating an example of a color filter array and placement of light blocking members provided to an image pick-up device included in an imaging device according to an exemplary embodiment.
Figure 19:
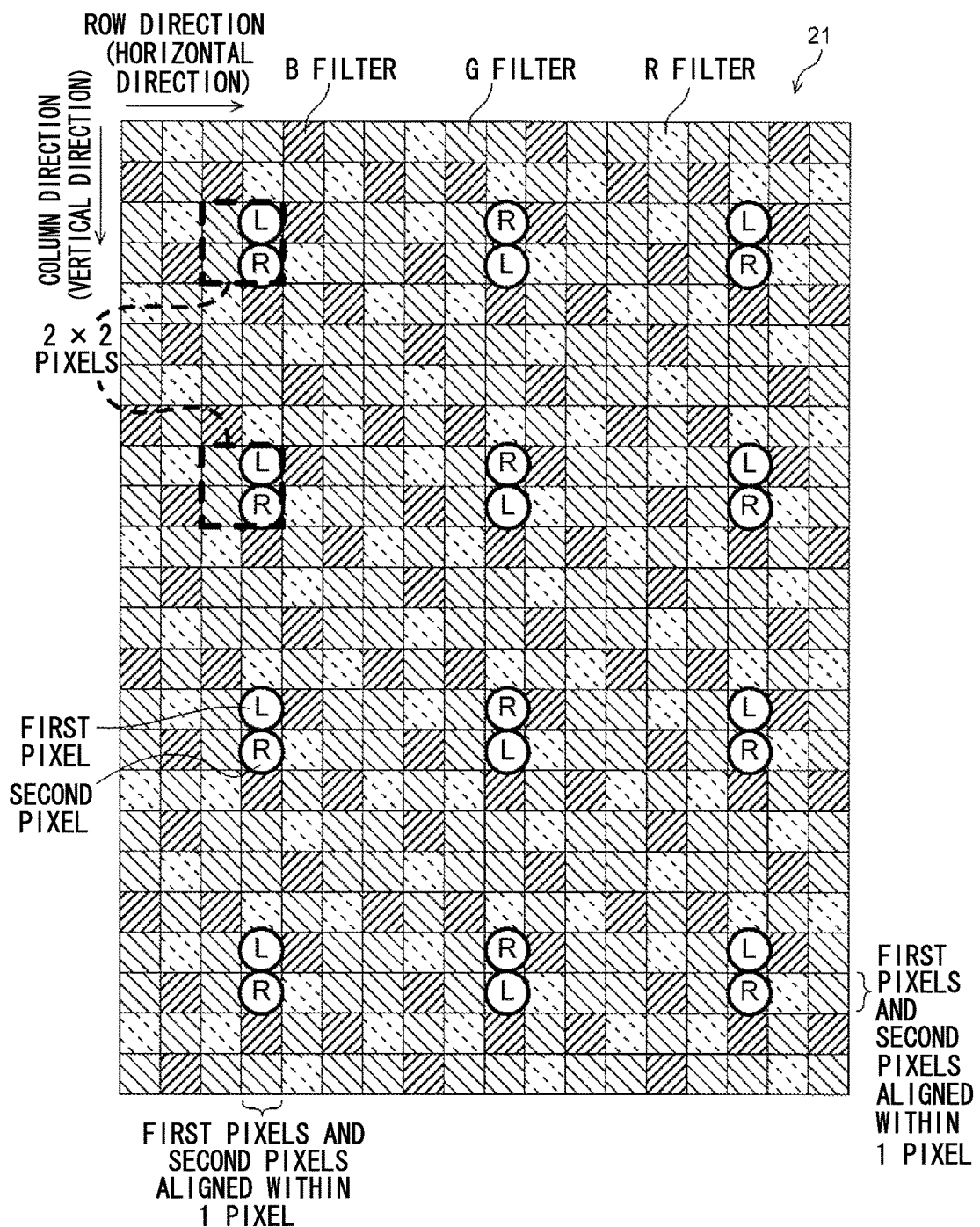
FIG. 19 is a schematic layout diagram illustrating an example of a color filter array and placement of light blocking members provided to an image pick-up device included in an imaging device according to an exemplary embodiment.

In the first exemplary embodiment to the fifth exemplary embodiment, although explanation has been given of an embodiment in which a single phase difference pixel is placed on 2×2 pixel G filters, there is no limitation thereto, and, for example, a pair of a first pixel L and a second pixel R may be placed on 2×2 pixel G filters. For example, as illustrated in FIG. 18, a pair of a first pixel L and a second pixel R may be placed on 2×2 pixel G filters so as to be adjacent in the row direction. Moreover, as illustrated in the example of FIG. 19, a pair of a first pixel L and a second pixel R may be placed on 2×2 pixel G filters so as to be adjacent in the column direction. In either of these cases, as explained with reference to the first exemplary embodiment, the positions of the first pixel L and the second pixel R are preferably arranged such that the separation between the first pixel group and the second pixel group is within a specific number of pixels in at least one of the column direction or the row direction. FIG. 18 and FIG. 19 illustrate examples in which the first pixel L and the second pixel R are placed in positions such that the separation between the first pixel group and the second pixel group is within 1 pixel in the column direction and the row direction, respectively.

Figure 20:
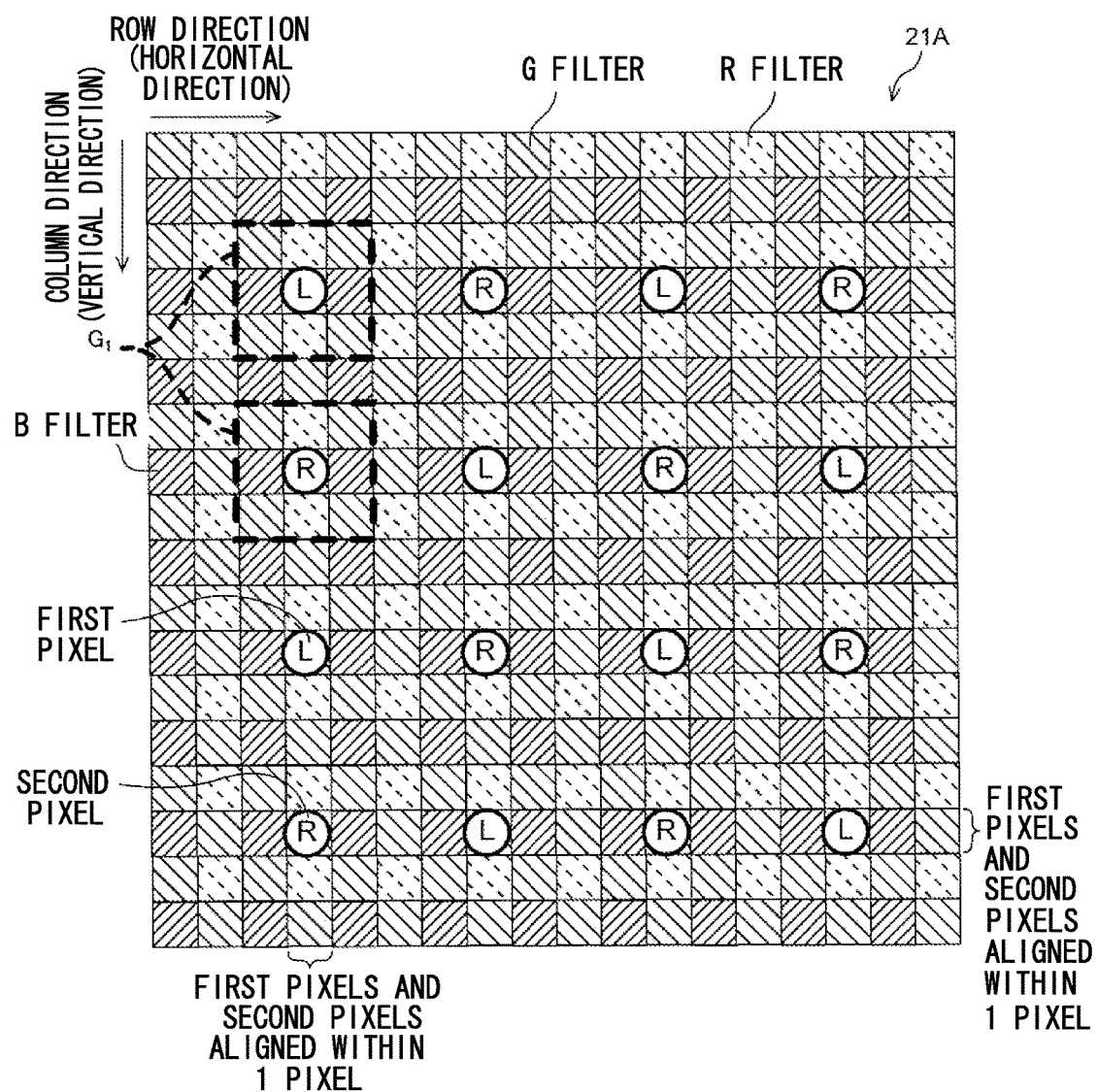
FIG. 20 is a schematic layout diagram illustrating an example of a color filter array and placement of light blocking members provided to an image pick-up device included in an imaging device according to an exemplary embodiment.
Figure 21:
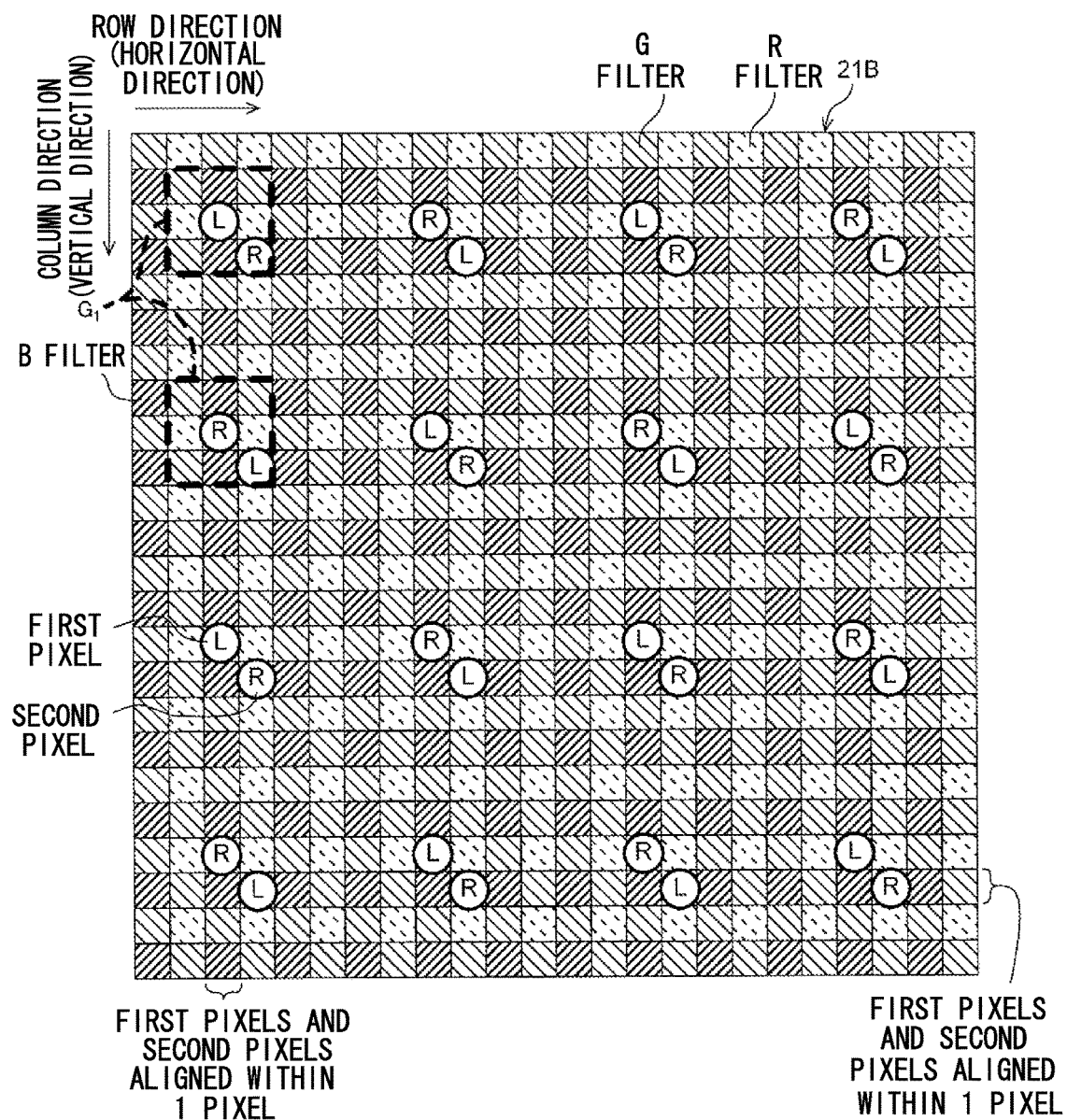
FIG. 21 is a schematic layout diagram illustrating an example of a color filter array and placement of light blocking members provided to an image pick-up device included in an imaging device according to an exemplary embodiment.
Figure 22:
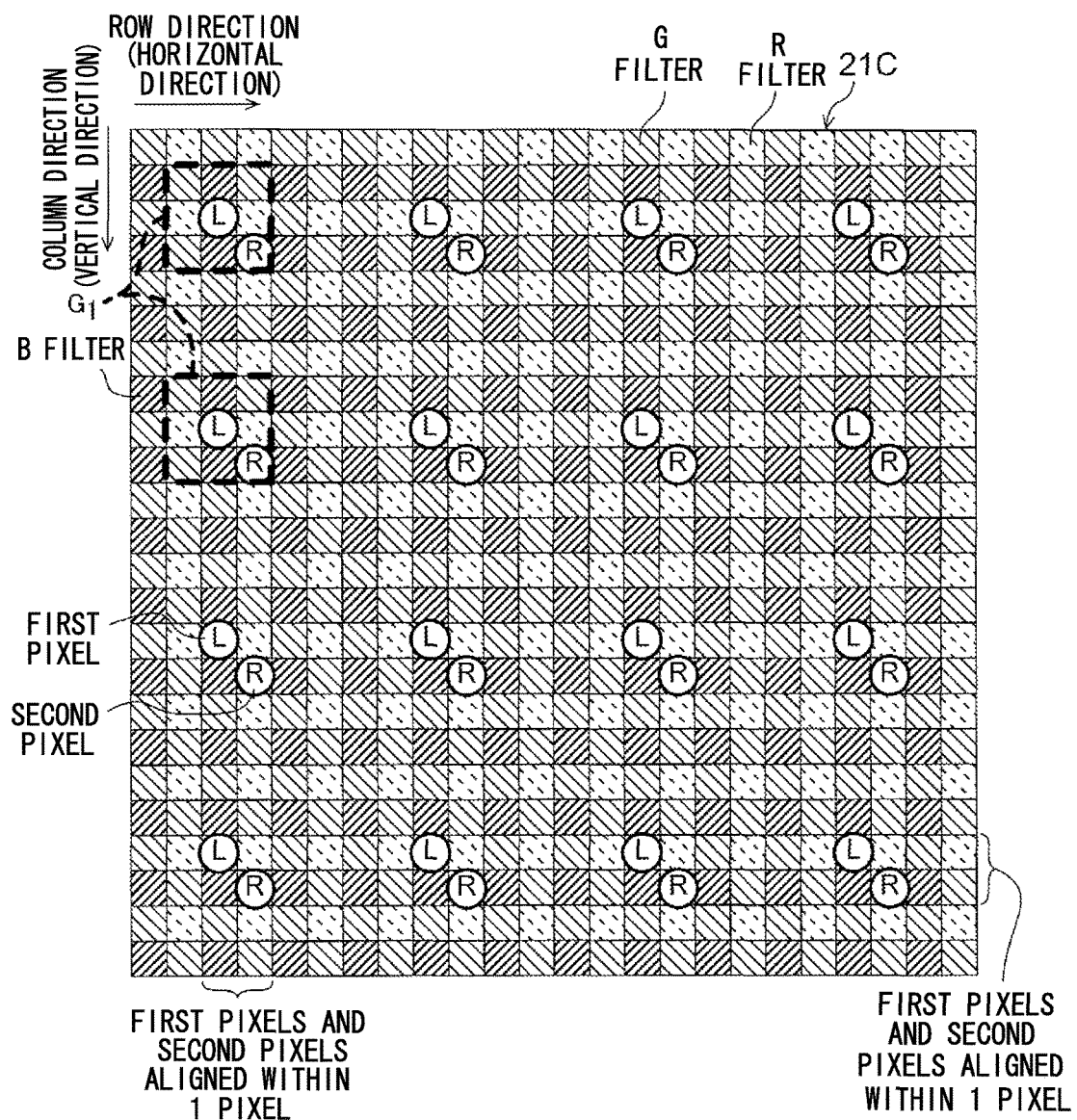
FIG. 22 is a schematic layout diagram illustrating an example of a color filter array and placement of light blocking members provided to an image pick-up device included in an imaging device according to an exemplary embodiment.

In the first exemplary embodiment to the fifth exemplary embodiment, an example has been given in which the color filter 21 includes a basic array pattern C, however the present invention is not limited thereto. For example, as illustrated in FIGS. 20 to 22, the array of the primary color filters (R filter, G filter, B filter) may be a Bayer array. In the examples illustrated in FIGS. 20 to 22, phase difference pixels are placed on G filters.

In a color filter 21A illustrated as an example in FIG. 20, the phase difference pixel is placed at the center of an array pattern G1 that has G filters placed on at four corners and center of a 3×3 pixel square array. Moreover, the first pixel L and the second pixel R are placed alternately to each other on every other 1 pixel worth of G filter in both the row direction and the column direction (with 1 pixel worth of G filter placed in between). The first pixel L and the second pixel R are each placed at positions such that the first pixel group and the second pixel group are aligned with each other within 1 pixel in both the column direction and the row direction. Thus an image based on the phase difference pixels at the center of the array pattern G1 can be interpolated using an image based on the normal pixels at the four corners of the array pattern G1, enabling an improvement in interpolation precision to be achieved over cases lacking the present configuration.

Moreover, positions of each of the array patterns G1 do not overlap with each other. Namely, the first pixel L and the second pixel R are placed in positions such that each of the pixels contained in the first and second images, which are interpolated using a third image configured from pixels contained in a third pixel group adjacent to each of the pixels of the first and second pixel groups, do not overlap with each other at the pixel unit level. This thereby enables a situation to be avoided in which an image based on phase difference pixels is interpolated using an image based on normal pixels that have already been employed for interpolating an image based on other phase difference pixels. Thus a further improvement in interpolation precision can be expected.

A color filter 21B illustrated as an example in FIG. 21 has the phase difference pixels placed at the center of an array pattern G1, and lower right corner thereof in the drawing as viewed face-on. The first pixel L and the second pixel R are placed alternately to each other, while skipping 2 pixels of G filter in between, in both the row direction and the column direction (with 2 pixels worth of G filter placed in between). This thereby enables the first pixel L and the second pixel R to each be placed at positions such that the first pixel group and the second pixel group are aligned with each other at positions within 1 pixel in both the column direction and the row direction, such that the first pixel L and the second pixel R can be made adjacent to each other. This thereby enables occurrences of image displacement caused by factors other than misaligned focus to be suppressed.

Moreover, there are normal pixels provided with filters of the same color (G filters) adjacent to each of the phase difference pixels, thereby enabling interpolation precision to be raised. Moreover, the positions of each of the array patterns G1 do not overlap with each other. Namely, the first pixel L and the second pixel R are placed in positions such that the pixels contained in the first and second images, which are interpolated using a third image configured from pixels contained in a third pixel group adjacent to each of the pixels contained in the first and second pixel groups, do not overlap with each other in pixel pair units. Reference here to "pixel pairs" indicates, for example, the first pixel L and the second pixel R (the phase difference pixel pair) contained in each of the array patterns G1. This thereby enables a situation to be avoided in which an image based on a phase difference pixel pair is interpolated using an image based on normal pixels that have already been employed for interpolating an image based on another phase difference pixel pair. Thus a further improvement in interpolation precision can be expected.

A color filter 21C illustrated as an example in FIG. 22 has the first pixel L placed at the center of the array pattern G1, and the second pixel R placed at the lower right corner thereof in the drawing as viewed face-on. The first pixels L are placed alternately to each other, while skipping 2 pixels of G filter in between, in both the row direction and the column direction, and the second pixels R are placed alternately to each other, while skipping 2 pixels of G filter in between, in both the row direction and the column direction. This thereby enables the first pixel L and the second pixel R to each be placed at positions such that the first pixel group and the second pixel group are aligned with each other at positions within 2 pixels in both the column direction and the row direction, and for the first pixel L and the second pixel R to be placed adjacent to each other. This thereby enables occurrences of image displacement caused by factors other than misaligned focus to be suppressed.

Moreover, similarly to the example illustrated in FIG. 21, in the example illustrated in FIG. 22 the positions of each of the array patterns G1 do not overlap with each other. This thereby enables a situation to be avoided in which an image based on a phase difference pixel is interpolated using an image based on normal pixels that have already been employed for interpolating an image based on another phase difference pixel. Thus a further improvement in interpolation precision can be expected.

Figure 23:
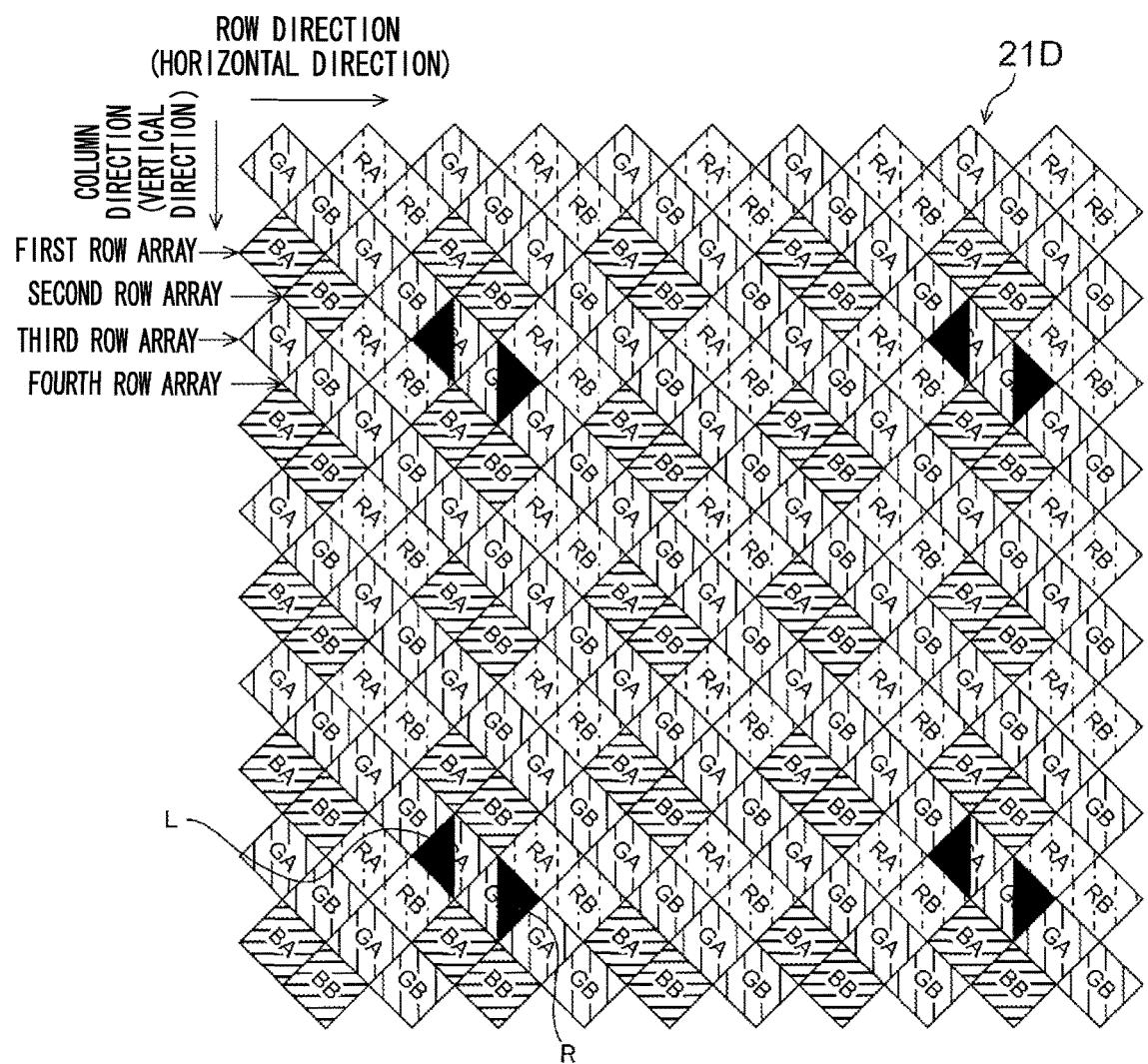
FIG. 23 is a schematic layout diagram illustrating an example of a color filter array and placement of light blocking members provided to an image pick-up device included in an imaging device according to an exemplary embodiment.

Another configuration example of a color filter is, for example, a color filter 21D illustrated in FIG. 23. FIG. 23 schematically illustrates an example of an array of the primary colors (R filter, G filter, B filter) of the color filter 21D, and of an array of light-blocking members, provided to the image pick-up device 20. In the color filter 21D illustrated in FIG. 23, first to fourth row arrays are repeatedly disposed along the column direction. The first row array indicates an array in which B filters and G filters are alternately placed along the row direction. The second row array indicates an array that is the first row array, displaced by half a pitch (half a pixel) in the row direction. The third row array indicates an array in which G filters and R filters are alternately placed along the row direction. The fourth row array indicates an array that is the third row array, displaced by half a pitch in the row direction.

The first row array and the second row array are displaced by half a pitch in the column direction and adjacent to each other. The second row array and the third row array are also displaced by half a pitch in the column direction and adjacent to each other. The third row array and the fourth row array are also displaced by half a pitch in the column direction and adjacent to each other. The fourth row array and the first row array are also displaced by half a pitch in the column direction and adjacent to each other. Thus each of the first to fourth row arrays appear repeated every 2 pixels in the column direction.

As illustrated in the example in FIG. 23, the first pixel L and the second pixel R are allocated to the third and fourth row arrays. Namely, the first pixels L are allocated to the third row arrays, and the second pixels R are allocated to the fourth row arrays. The first pixel L and the second pixel R are placed so as to configure pairs adjacent to each other (minimum pitch). In the example illustrated in FIG. 23, the first pixels L are allocated to every $6^{th}$ pixel in both the row direction and the column direction, and the second pixels R are also allocated to every $6^{th}$ pixel in both the row direction and the column direction. The phase difference between the first pixel group and the second pixel group is accordingly computed with higher precision than in cases lacking the present configuration.

Moreover, in the example illustrated in FIG. 23, G filters are allocated to the first pixel L and the second pixel R. Due to pixels provided with the G filters having better sensitivity than pixels provided with filters of other colors, the interpolation precision can be raised. Moreover, due to the G filters having better continuity that filters of other colors, the pixels allocated with the G filters are more readily interpolated than pixels allocated with filters of other colors.

Moreover, although in the first exemplary embodiment an example has been given in which the split-images are divided in two along the up-down direction, there is no limitation thereto, and a split-image configuration may be applied of an image divided into plural divisions along the left-right direction or a diagonal direction.

Figure 24:
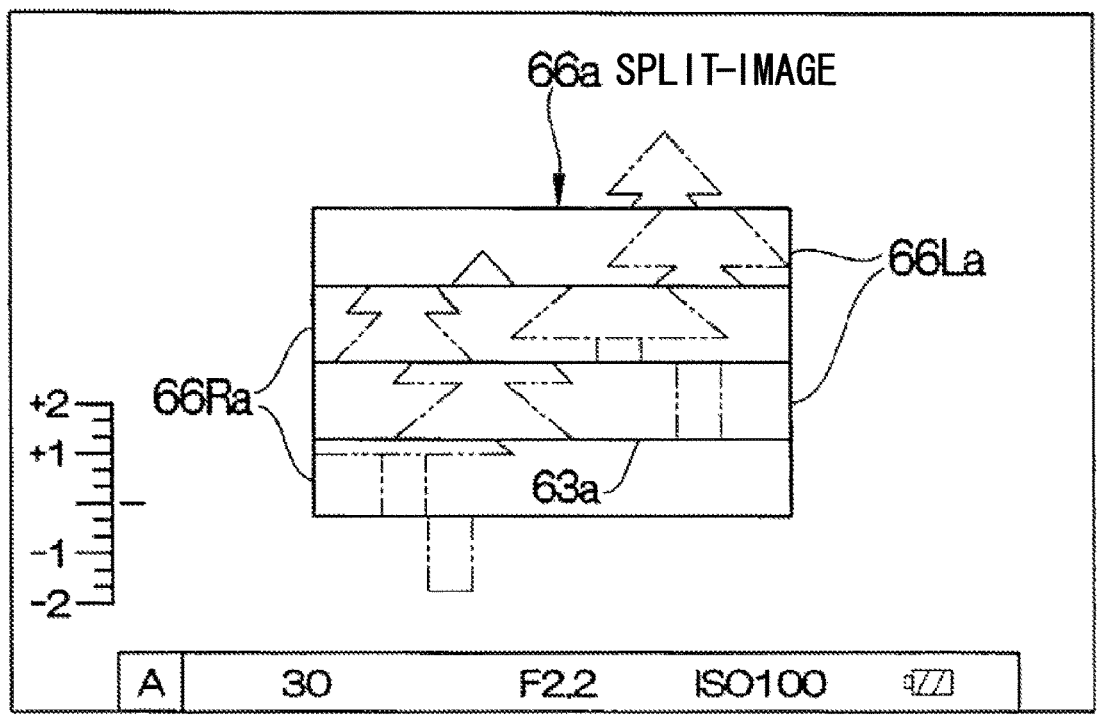
FIG. 24 is a face-on view illustrating an example of a method of dividing display regions of a split-image according to an exemplary embodiment.

A split-image 66a illustrated in the example in FIG. 24 is divided into odd numbered lines and even numbered lines by plural dividing lines 63a parallel to the row direction. In the split-image 66a, line shaped (for example strip shaped) phase difference images 66La generated based on the output signal output from the first pixel group are displayed on the odd numbered lines (or on the even numbered lines). Line shaped (for example strip shaped) phase difference images 66Ra generated based on the output signal output from the second pixel group are displayed on the even numbered lines.

Figure 25:
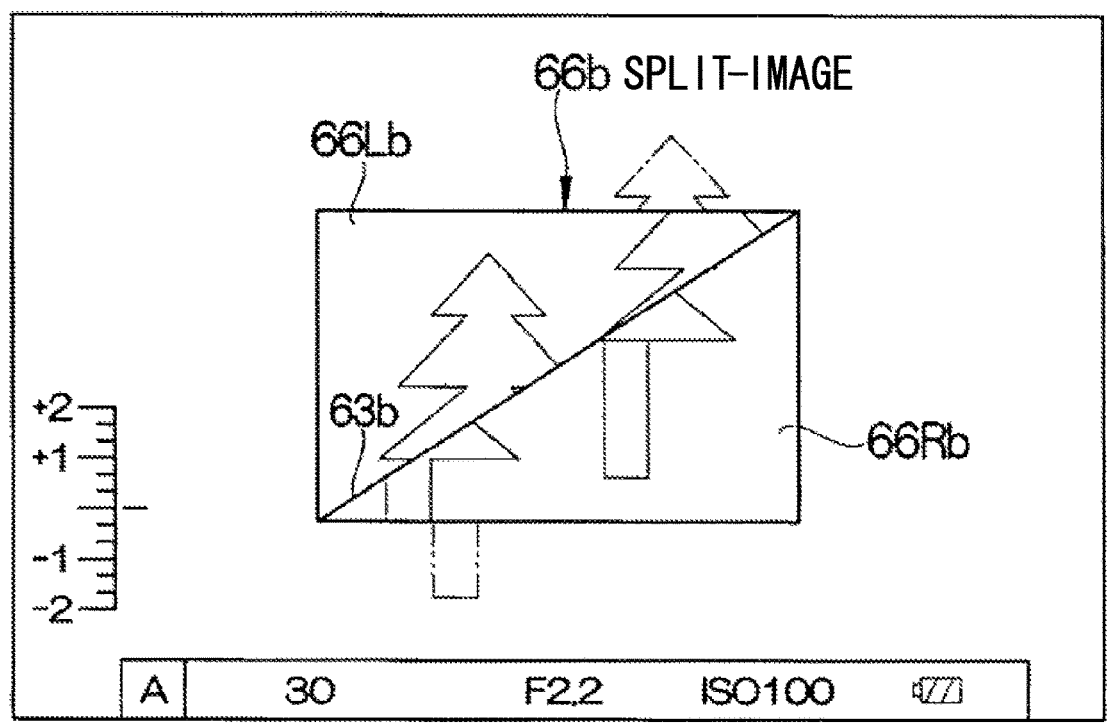
FIG. 25 is a face-on view illustrating an example of a method of dividing display regions of a split-image according to an exemplary embodiment.

A split-image 66b illustrated in FIG. 25 is divided into two by a dividing line 63b with slope angled with respect to the row direction (for example a diagonal line of the split-image 66b). In the split-image 66b, a phase difference image 66Lb generated based on the output signal output from the first pixel group is displayed in one region. A phase difference image 66Rb generated based on the output signal output from the second pixel group is displayed in the other region.

Figure 26A:
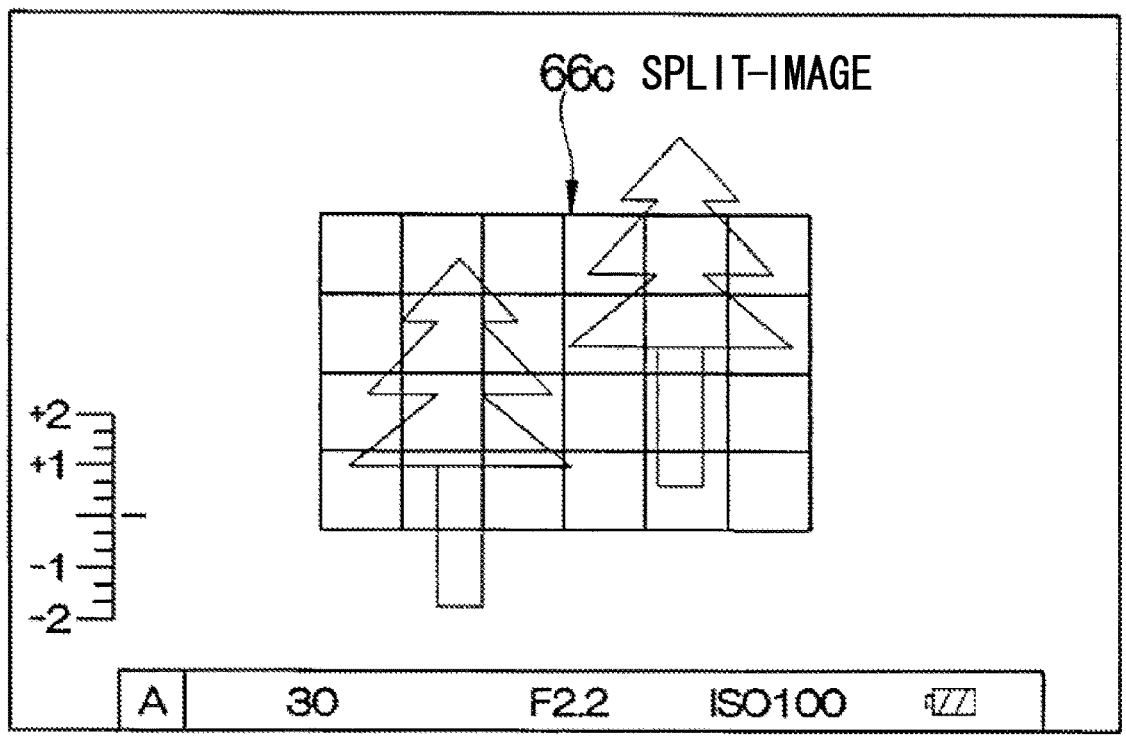
FIG. 26A is a face-on view illustrating an example of a method of dividing display regions of a split-image according to an exemplary embodiment.
Figure 26B:
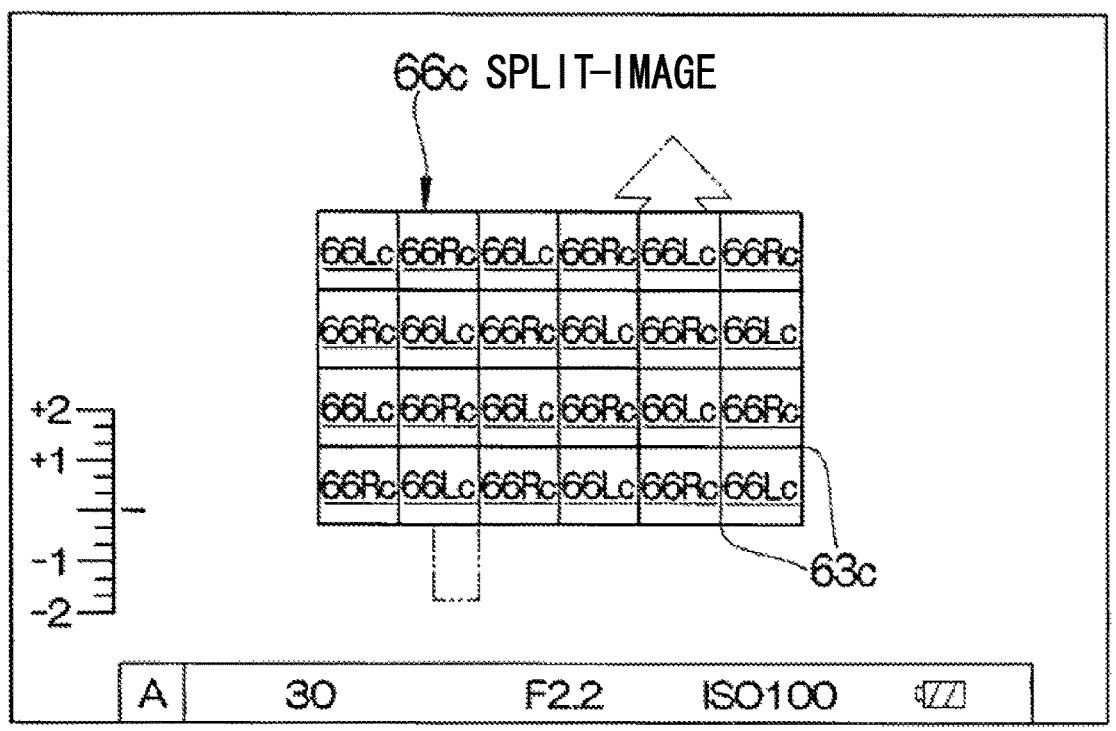
FIG. 26B is a face-on view illustrating an example of a method of dividing display regions of a split-image according to an exemplary embodiment.

A split-image 66c illustrated in FIG. 26A and FIG. 26B is divided by lattice shaped dividing lines 63c parallel to the row direction and column direction, respectively. In the split-image 66c, a phase difference image 66Lc generated based on the output signals output from the first pixel group is displayed arranged in a chess board pattern (checkered pattern). A phase difference image 66Rc generated based on an output signal output from the second pixel group is also displayed arranged in a chess board pattern.

Moreover, there is no limitation to a split-image, and another focus verification image may be generated from the two phase difference images, and the focus verification image displayed. For example, the two phase difference images may be superimposed on each other in a synthesized display, so as to display as a double image when not in focus and to display as a clear image when in a focused state.

The flow of the image capture control processing explained in the first exemplary embodiment to the fifth exemplary embodiment are merely examples thereof. Accordingly, it goes without saying that steps not required may be eliminated, new steps may be added, and the processing sequence may be rearranged within a range not departing from the spirit. Each type of the processing included in the image generation and output processing explained for the first exemplary embodiment to the fifth exemplary embodiment may be realized by a software configuration utilizing a computer by executing a program, or may be realized by a hardware configuration. Implementation may also be made with a combination of a hardware configuration and a software configuration.

Note that in the image capture control processing explained in the first exemplary embodiment to the fifth exemplary embodiment, in cases in which implementation is by executing a program with a computer, the program may be pre-stored in a specific storage region (for example the memory 26). Initial storage in the memory 26 is not always necessary. For example, a program may first be stored on a freely selectable "portable storage medium" such as a Solid State Drive (SSD), CD-ROM, a DVD disk, a magneto optical disk, or an IC card, employed connected to a computer. A computer may then acquire and execute a program from such a portable storage medium. Each program may also be stored in advance on another computer, server device, or the like connected to a computer through the internet, a Local Area Network (LAN), or the like, such that the computer acquires and executes such programs therefrom.

Sixth Exemplary Embodiment

In the first exemplary embodiment to the fifth exemplary embodiment, examples are given of the imaging device 100, however mobile terminal devices that are modified examples of the imaging device 100 include mobile phones and smartphones, personal digital assistants (PDAs) and mobile gaming machines, including a camera function. Detailed explanation follows regarding an example of a smartphone, with reference to the drawings.

Figure 27:
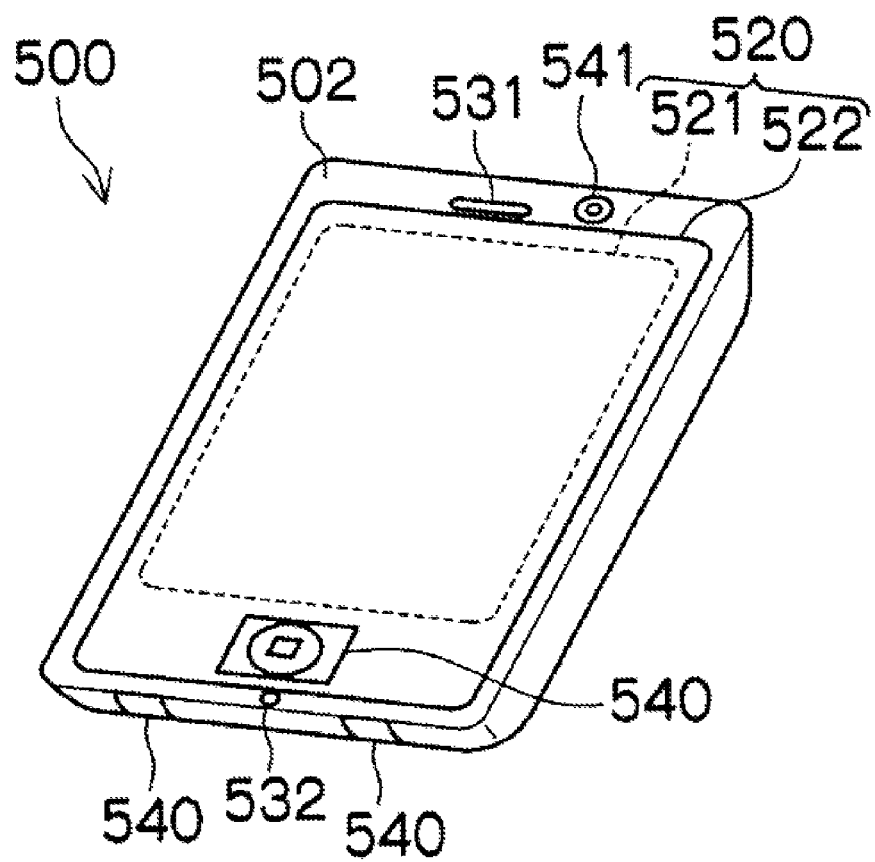
FIG. 27 is a perspective view illustrating an example of the external appearance of a smartphone according to a sixth exemplary embodiment.

FIG. 27 is a perspective view illustrating an example of the external appearance of a smartphone 500. The smartphone 500 illustrated in FIG. 27 includes a flat plate shaped casing 502, and a display and input section 520 provided on one face of the casing 502 and integrating together a display panel 521 serving as a display section and an operation panel 522 serving as an input section. The casing 502 includes a speaker 531, a microphone 532, an operation section 540, and a camera section 541. Note that the configuration of the casing 502 is not limited thereto, and, for example, a configuration may be employed in which the display section and the input section are provided independently from each other, and a configuration including a folding structure or a sliding structure may also be employed.

Figure 28:
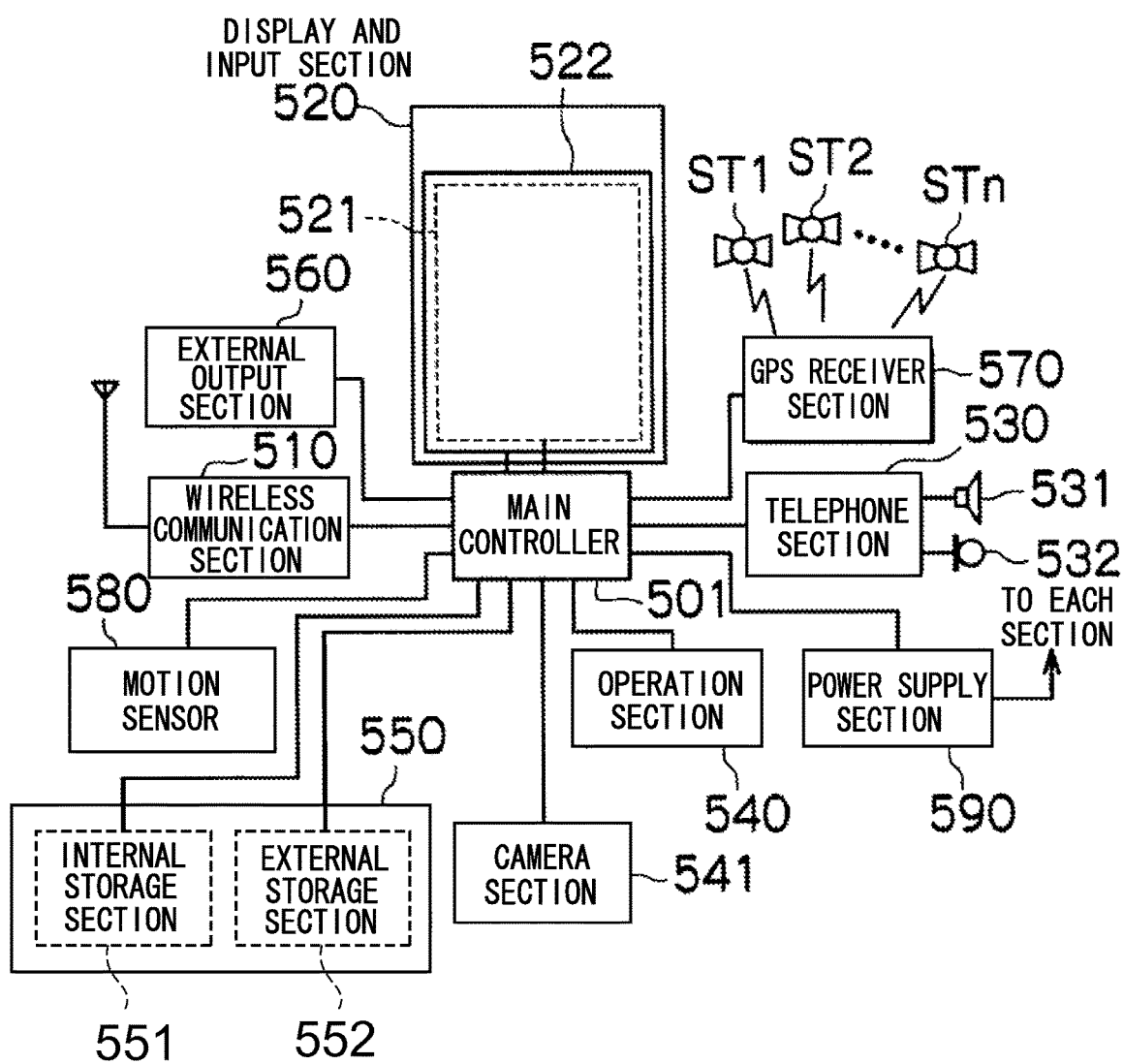
FIG. 28 is a block diagram illustrating an example of relevant configuration of an electrical system of a smartphone according to the sixth exemplary embodiment.

FIG. 28 is a block diagram illustrating an example of a configuration of the smartphone 500 illustrated in FIG. 27. As illustrated in FIG. 28, main configuration elements of the smartphone 500 include a wireless communication section 510, the display and input section 520, a telephone section 530, the operation section 540, the camera section 541, a storage section 550, and an external input-output section 560. Main configuration elements of the smartphone 500 also include a Global Positioning System (GPS) receiver section 570, a motion sensor 580, a power supply section 590, and a main controller 501. Main functions of the smartphone 500 include a wireless communication function that performs mobile wireless communication through a base station device and a mobile communication network.

The wireless communication section 510 performs wireless communication with the base station device installed in the mobile communication network according to instructions from the main controller 501. Transmission and reception of various types of file data, such as voice data and image data, email data etc., and reception of web data, streaming data, and the like is performed using the wireless communication.

The display and input section 520 is what is referred to as a touch panel, and includes the display panel 521 and the operating panel 522. Thus, according to control by the main controller 501, the display and input section 520 transmits information to a user visibly by displaying images (still images and video images), text data, and the like, and also detects user operation in response to the displayed information. The display panel 521 is preferably a 3D display panel in cases in which generated 3D is viewed.

The display panel 521 employs a display device such as an LCD, or an organic electroluminescence display (OELD). The operating panel 522 is a device that is installed such that an image displayed on the display screen of the display panel 521 is visible, and detects one or plural coordinates operated by a user finger or stylus. A detection signal generated by operation when such a device is operated by a user finger or stylus is output to the main controller 501. The main controller 501 then detects the operation position (coordinates) on the display panel 521 based on the detection signal received.

As illustrated in FIG. 27, the display panel 521 and the operation panel 522 of the smartphone 500 are integrated together to configure the display and input section 520, and the operation panel 522 is disposed so as to entirely cover the display panel 521. In cases in which such a placement is adopted, the operation panel 522 may include a function to detect user operation even in a region outside of the display panel 521. In other words, the operation panel 522 may include a detection region for a superimposed section superimposed on the display panel 521 (referred to below as the display region), and a detection region for an outer edge section other than the above that is not superimposed on the display panel 521 (referred to below as the non-display region).

The size of the display region and the size of the display panel 521 may completely match each other, however they do not necessarily have to match each other. The operating panel 522 may include two sensitive regions, at the outer edge section and at an inside portion other than the outer edge section. The width of the outer edge section is appropriately designed according to the size of the casing 502 and the like. Moreover, as a position detection method employed in the operating panel 522, any of, for example, a matrix switch method, a resistance film method, a surface acoustic wave method, an infrared radiation method, an electromagnetic induction method, an electrostatic capacitance method, or the like may be adopted.

The telephone section 530 includes the speaker 531 and the microphone 532. The telephone section 530 converts the voice of the user input through the microphone 532 into voice data capable of being processed by the main controller 501, then outputs this to the main controller 501. The telephone section 530 decodes voice data received by the wireless communication section 510 or by the external input-output section 560, and outputs the voice data from the speaker 531. As illustrated in FIG. 27, for example, the speaker 531 may be installed in the same face as the face at which the display and input section 520 is provided, and the microphone 532 may be installed in a side face of the casing 502.

The operation section 540 is a hardware key that employs a key switch or the like, and is a section that receives instructions from a user. For example, as illustrated in FIG. 27, the operation section 540 is installed to a side face of the casing 502 of the smartphone 500, and is a push-button type switch that is switched ON by depressing with a finger or the like, and is switched to an OFF state when the finger is removed by restoring force, such as from a spring.

The storage section 550 is stored with a control program and control data for the main controller 501, application software, address data that corresponds names against telephone numbers of communication partners, and data of sent and received emails. The storage section 550 stores web data downloaded by web browsing, and downloaded content data. The storage section 550 also temporarily stores streaming data and the like. The storage section 550 includes an internal storage section 551 installed within the smartphone, and an external storage section 552 including a detachable external memory slot. The internal storage section 551 and the external storage section 552 configuring the storage section 550 are implemented using a storage medium, such as a flash memory type or a hard disk type. Other examples that may be employed as the storage medium include a multimedia card micro type, a card type memory (such as a MICRO SD (registered trademark) memory or the like), Random Access Memory (RAM), or Read Only Memory (ROM).

The external input-output section 560 serves the role of an interface to all external devices coupled to the smartphone 500, and is employed for communication and the like with other external devices, or for direct or indirect connection by a network. Examples of communication or the like with other external devices include a universal serial bus (USB), and IEEE 1394. Examples of networks include the internet, wireless LAN, BLUETOOTH (registered trademark), radio frequency identification (RFID), and infrared data association (IrDA) (registered trademark) communication. Other examples of networks include ULTRA WIDEBAND (UWB) (registered trademark), and ZIGBEE (registered trademark).

External devices coupled to the smartphone 500 include, for example, wired/wireless headsets, wired/wireless external chargers, a wired/wireless data port, and/or a memory card connected through a card socket. Other examples of external devices include a subscriber identity module (SIM) card, a user identity module (UIM) card, and an external audio/video device connected through an audio/video input/output (I/O) terminal. Examples of other external audio/video devices include wirelessly connected external audio/video devices. In place of an external audio/video device, for example, a wired/wirelessly connected smartphone, a wired/wirelessly connected personal computer, a wired/wirelessly connected PDA, or earphones or the like may also be applied.

The external input-output section is capable of transmitting received data that was transmitted by such external devices to each of the configuration elements within the smartphone 500, and capable of transmitting data within the smartphone 500 to the external devices.

Under instruction from the main controller 501, the GPS receiver section 570 receives GPS signals transmitted from GPS satellites ST1 to STn and executes position computation processing based on plural received GPS signals to detect the position in latitude, longitude, and altitude of the smartphone 500. The GPS receiver section 570 is also capable of detecting the position by using positional data when it is possible to acquire positional data from the wireless communication section 510 or the external input-output section 560 (such as a wireless LAN).

The motion sensor 580 includes, for example, a triaxial acceleration sensor, and detects physical movement of the smartphone 500 according to instruction from the main controller 501. The movement direction and acceleration of the smartphone 500 is detected by detecting the physical movement of the smartphone 500. The detection result is output to the main controller 501.

The power supply section 590 supplies electrical power accumulated in a battery (not illustrated in the drawings) to each of the sections of the smartphone 500 under instruction from the main controller 501.

The main controller 501 includes a microprocessor, and operates according to a control program and control data stored in the storage section 550 so as to integrally control each of the sections of the smartphone 500. In order to perform voice communication and data communication through the wireless communication section 510, the main controller 501 includes a mobile communication control function that controls each of the sections of the communication system, and an application processing function.

The application processing function is implemented by the main controller 501 operating according to application software stored in the storage section 550. Examples of application processing functions include an infrared communication function that controls the external input-output section 560 to perform data communication with a counter-party device, an email function that performs email transmission and reception, and a web browsing function that views web pages.

The main controller 501 includes an image processing function that displays a picture on the display and input section 520, or the like, based on image data (still image or video image data) such as received data or downloaded streaming data. The image processing function is a function in which the main controller 501 decodes the above image data, subjects the decoded result to image processing, and displays the image on the display and input section 520.

The main controller 501 also executes display control of the display panel 521, and operation detection control to detect user operation through the operation section 540, and the operating panel 522.

By executing display control the main controller 501 displays icons to startup application software, and software keys such as scroll bars, or displays windows to generate emails. Scroll bars are software keys to receive instructions to move the display portion of an image such as large images that cannot be accommodated within the display region of the display panel 521.

By executing the operation detection control, the main controller 501 detects user operation through the operation section 540, and receives, through the operating panel 522, input of operations to the above icons, and input of character sequences to the entry field of the above window. By execution of the operation detection control, the main controller 501 receives scroll demands for display images through the scroll bar.

Moreover, by executing the operation detection control, the main controller 501 determines whether the operation position on the operating panel 522 is in the superimposed section superimposed on the display panel 521 (display region), or in the other outer edge section not superimposed on the display panel 521 (non-display region). It also includes a touch panel control function to receive the determination result, and to control the display position of the sensitive region of the operating panel 522 and the display position of the software key.

The main controller 501 detects gesture operations to the operating panel 522, and is capable of executing a preset function according to the detected gesture operation. Gesture operation does not mean a simple conventional touch operation, and means tracing a track with a finger or the like, specifying plural positions at the same time, or combinations thereof, and means an operation to trace a track of at least one from plural positions.

The camera section 541 is a digital camera that captures an image using an image pick-up device such as a CMOS or CCD, and includes functions similar to those of the imaging device 100 as illustrated in FIG. 1 and the like.

The camera section 541 is capable of switching between a manual focus mode and an automatic focus mode. When the manual focus mode has been selected, focusing of the imaging lens 16 of the camera section 541 can be performed by operating a focus icon button or the like displayed on the operation section 540 or the display and input section 520. Then during manual focus mode, a live-view image synthesized with a split-image is displayed on the display panel 521, thereby enabling the focus state to be verified during manual focus. The HYBRID FINDER 220 illustrated in FIG. 6 may be provided to the smartphone 500.

The camera section 541, under control of the main controller 501, converts image data obtained by image capture into, for example, compressed image data such as joint photographic coding experts group (JPEG). Then the image data obtained by conversion can be stored in the storage section 550, and output through the external input-output section 560 and the wireless communication section 510. In the smartphone 500 illustrated in FIG. 27, the camera section 541 is installed to the same face as the display and input section 520; however the installation position of the camera section 541 is not limited thereto, and installation may be made to the back face of the display and input section 520, or plural of the camera sections 541 may be installed. In cases in which plural of the camera sections 541 are installed, image capture may be performed independently by switching the camera section 541 with image capture, or image capture may be performed using plural of the camera sections 541 at the same time.

The camera section 541 may also be utilized by various functions of the smartphone 500. For example, images acquired with the camera section 541 may be displayed on the display panel 521, and an image of the camera section 541 may be utilized as an operation input to the operating panel 522. During position detection by the GPS receiver section 570, the position may be detected with reference to an image from the camera section 541. Moreover, the optical axis direction of the camera section 541 of the smartphone 500 may be determined and the present usage environment may be determined by reference to an image from the camera section 541, either without using the triaxial acceleration sensor, or in combination with using the triaxial acceleration sensor. Obviously the image from the camera section 541 may be utilized in application software.

It is also possible for various data to be added to the image data of still images or video images and stored in the storage section 550, and output through the external input-output section 560 and the wireless communication section 510. Reference here to "various data" is, for example, positional data acquired by the GPS receiver section 570, and voice data acquired by the microphone 532 (which may be speech converted to text data arising from text conversion performed by the main controller or the like) for adding to image data of still images or video images. It may moreover be orientation data acquired by the motion sensor 580, and so on.

In each of the above exemplary embodiments, an example is given in which the image pick-up device 20 includes the first to third pixel groups, however the present invention is not limited thereto, and an image pick-up device configured from only a first pixel group and a second pixel group may be employed. A digital camera including such a type of image pick-up device is capable of generating a three dimensional image (3D image) based on the first image output from the first pixel group and the second image output from the second pixel group, and is also capable of generating a two dimensional image (2D image). In such cases, generation of the two dimensional image is, for example, performed by interpolation processing between pixels of the same color in each of the first image and the second image. The first image or the second image may also be employed as the two dimensional image without performing interpolation processing.

In each of the above exemplary embodiments examples have been explained in which the split-image 300 is displayed within the display region of the normal image 301, however the present invention is not limited thereto, and the split-image 300 may be displayed without displaying the normal image 301 on the display device. Moreover, although in each of the exemplary embodiments the split-image 300 is displayed on a portion of the display region of the display device, there is no limitation thereto, and the split-image 300 may be displayed on the entire display region of the display device. In this manner, the present invention is not limited to modes in which the normal image 301 and the split-image 300 are both displayed on the same screen of the display device at the same time. For example, the present invention may be configured such that the display controller 36 performs control so as to display the split-image 300 on the display device without displaying the normal image 301 in cases in which a display instruction for the normal image 301 is removed in a state in which display of the split-image 300 is being instructed.

The invention claimed is:

1. An image processing device comprising:
   a generation section that generates a first display image, based on an image signal that is output from an image pick-up device that includes first and second pixel groups on which respective images are formed by a pupil-divided subject-image that has passed through first and second regions of an imaging lens, and that generates a second display image for use in focus verification from first and second images based on an image signal that is output from the first and second pixel groups;
   a display section that displays images;
   a display controller that performs control to display the first display image that is generated by the generation section on the display section, and to display the second display image that is generated by the generation section on the display section within a display region of the first display image;
   an automatic focus section that, in a case in which a predetermined instruction has been input, performs automatic focusing in a focus region that has at least a portion that overlaps with at least a portion of a display region of the second display image;
   a receiving section that receives input of position data representing a position of the focus region, wherein the automatic focus section moves the position of the focus region based on the position data that is received by the receiving section and performs automatic focusing; and
   an extraction section that extracts, as a subject-image region, at least a portion of a region corresponding to a main subject-image within the second display image,
   wherein the automatic focus section performs automatic focusing using, as the focus region, the subject-image region that has been extracted by the extraction section, wherein
   only in a case in which at least a portion of the focus region after moving based on the position data overlaps with at least a portion of the display region of the second display image, the automatic focus section performs the movement and performs automatic focusing.

2. An image processing device comprising:
   a generation section that generates a first display image, based on an image signal that is output from an image pick-up device that includes first and second pixel groups on which respective images are formed by a pupil-divided subject-image that has passed through first and second regions of an imaging lens, and that generates a second display image for use in focus verification from first and second images based on an image signal that is output from the first and second pixel groups;
   a display section that displays images;
   a display controller that performs control to display the first display image that is generated by the generation section on the display section, and to display the second display image that is generated by the generation section on the display section within a display region of the first display image;
   an automatic focus section that, in a case in which a predetermined instruction has been input, performs automatic focusing in a focus region that has at least a portion that overlaps with at least a portion of a display region of the second display image;

a receiving section that receives input of position data representing a position of the focus region, wherein the automatic focus section moves the position of the focus region based on the position data that is received by the receiving section and performs automatic focusing; and an extraction section that extracts, as a subject-image region, at least a portion of a region corresponding to a main subject-image within the second display image, wherein the automatic focus section performs automatic focusing using, as the focus region, the subject-image region that has been extracted by the extraction section, wherein the display controller performs control to halt display of the second display image in a case in which the focus region after moving based on the position data falls outside the display region of the second display image.

3. The image processing device of claim 2, wherein:

the receiving section receives input of the position data again, after being controlled by the display controller to halt display of the second display image, and in a case in which the position data has been received again by the receiving section, the display controller performs control so as to restart display of the second display image in a case in which at least a portion of the focus region after moving based on the position data overlaps with at least a portion of the display region of the second display image.

4. An image processing device comprising:

a generation section that generates a first display image, based on an image signal that is output from an image pick-up device that includes first and second pixel groups on which respective images are formed by a pupil-divided subject-image that has passed through first and second regions of an imaging lens, and that generates a second display image for use in focus verification from first and second images based on an image signal that is output from the first and second pixel groups;

a display section that displays images;

a display controller that performs control to display the first display image that is generated by the generation section on the display section, and to display the second display image that is generated by the generation section on the display section within a display region of the first display image;

an automatic focus section that, in a case in which a predetermined instruction has been input, performs automatic focusing in a focus region that has at least a portion that overlaps with at least a portion of a display region of the second display image;

an extraction section that extracts, as a subject-image region, at least a portion of a region corresponding to a main subject-image within the second display image, wherein the automatic focus section performs automatic focusing using, as the focus region, the subject-image region that has been extracted by the extraction section, and a second extraction section that extracts, as a second subject-image region, at least a portion of a region corresponding to a main subject-image within the first display image, wherein, in a case in which the second subject-image region that is extracted by the second extraction section falls outside the display region of the second display image, the automatic focus section performs automatic focusing using, as the focus region, a region within the display region that has a predetermined size and that has a shortest distance from the second subject-image region.

5. An image processing device comprising:

a generation section that generates a first display image, based on an image signal that is output from an image pick-up device that includes first and second pixel groups on which respective images are formed by a pupil-divided subject-image that has passed through first and second regions of an imaging lens, and that generates a second display image for use in focus verification from first and second images based on an image signal that is output from the first and second pixel groups;

a display section that displays images;

a display controller that performs control to display the first display image that is generated by the generation section on the display section, and to display the second display image that is generated by the generation section on the display section within a display region of the first display image;

an automatic focus section that, in a case in which a predetermined instruction has been input, performs automatic focusing in a focus region that has at least a portion that overlaps with at least a portion of a display region of the second display image;

an extraction section that extracts, as a subject-image region, at least a portion of a region corresponding to a main subject-image within the second display image, wherein the automatic focus section performs automatic focusing using, as the focus region, the subject-image region that has been extracted by the extraction section, and a second receiving section that receives input of expansion instruction data for instructing expansion of the second display image, and wherein:

the display controller performs control to expand and display the second display image in a case in which input of the expansion instruction data is received by the second receiving section; and in a case in which control has been performed by the display controller to expand and display the second display image, the automatic focus section expands the focus region by an expansion ratio of an expansion ratio of the second display image or less and performs automatic focusing.

6. The image processing device of claim 5, wherein in a case in which a size of the focus region after expansion is larger than a predetermined second threshold value, the automatic focus section performs automatic focusing using the focus region as a size of the second threshold value.

* * * * *